US008245180B2

(12) United States Patent
Smayling et al.

(10) Patent No.: US 8,245,180 B2
(45) Date of Patent: Aug. 14, 2012

(54) METHODS FOR DEFINING AND USING CO-OPTIMIZED NANOPATTERNS FOR INTEGRATED CIRCUIT DESIGN AND APPARATUS IMPLEMENTING SAME

(75) Inventors: Michael C. Smayling, Fremont, CA (US); Scott T. Becker, Scotts Valley, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 432 days.

(21) Appl. No.: 12/484,130

(22) Filed: Jun. 12, 2009

(65) Prior Publication Data

US 2009/0294981 A1    Dec. 3, 2009

Related U.S. Application Data

(63) Continuation-in-part of application No. 12/013,342, filed on Jan. 11, 2008, now Pat. No. 7,917,879, which is a continuation-in-part of application No. 12/212,562, filed on Sep. 17, 2008, now Pat. No. 7,842,975, which is a continuation of application No. 11/683,402, filed on Mar. 7, 2007, now Pat. No. 7,446,352.

(60) Provisional application No. 61/075,711, filed on Jun. 25, 2008, provisional application No. 60/972,394, filed on Sep. 14, 2007, provisional application No. 60/963,364, filed on Aug. 2, 2007, provisional application No. 60/781,288, filed on Mar. 9, 2006.

(51) Int. Cl.
G06F 17/50    (2006.01)

(52) U.S. Cl. ............. 716/138; 716/53; 716/54; 716/132

(58) Field of Classification Search .................. None
See application file for complete search history.

(56) References Cited

U.S. PATENT DOCUMENTS 4,197,555 A    4/1980 Uehara et al.
4,417,161 A    11/1983 Uya
(Continued)

FOREIGN PATENT DOCUMENTS

EP    1394858    3/2004
(Continued)

OTHER PUBLICATIONS

Firedberg et al., "Modeling Within-Field Gate Length Spatial Variation for Process-Design Co-Optimization," 2005 Proc. of SPIE vol. 5756, pp. 178-188.*

(Continued)

*Primary Examiner* — Leigh Garbowski
(74) *Attorney, Agent, or Firm* — Martine Penilla Group, LLP

(57) ABSTRACT

A set of layout nanopatterns is defined. Each layout nanopattern is defined by relative placements of a particular type of layout feature within a lithographic window of influence. A design space is defined as a set of layout parameters and corresponding value ranges that affect manufacturability of a layout. Layouts are created for the set of layout nanopatterns such that the created layouts cover the design space. The layouts for the set of layout nanopatterns are then optimized for manufacturability. A point in the design space is selected where the set of layout nanopatterns are co-optimized for manufacturability. A circuit layout is created based on the selected point in design space using the corresponding set of co-optimized layout nanopatterns. The optimized layouts for the set of layout nanopatterns and the associated circuit layout can be recorded in a digital format on a computer readable storage medium.

37 Claims, 29 Drawing Sheets

U.S. PATENT DOCUMENTS

| | | |
|---|---|---|
| 4,424,460 A | 1/1984 | Best |
| 4,682,202 A | 7/1987 | Tanizawa |
| 4,801,986 A | 1/1989 | Chang et al. |
| 5,097,422 A | 3/1992 | Corbin et al. |
| 5,121,186 A | 6/1992 | Wong et al. |
| 5,208,765 A | 5/1993 | Turnbull |
| 5,224,057 A | 6/1993 | Igarashi et al. |
| 5,242,770 A | 9/1993 | Chen et al. |
| 5,378,649 A | 1/1995 | Huang |
| 5,471,403 A | 11/1995 | Fujimaga |
| 5,497,334 A | 3/1996 | Russell et al. |
| 5,497,337 A | 3/1996 | Ponnapalli et al. |
| 5,545,904 A | 8/1996 | Orbach |
| 5,581,098 A | 12/1996 | Chang |
| 5,636,002 A | 6/1997 | Garofalo |
| 5,682,323 A | 10/1997 | Pasch et al. |
| 5,684,311 A | 11/1997 | Shaw |
| 5,684,733 A | 11/1997 | Wu et al. |
| 5,705,301 A | 1/1998 | Garza et al. |
| 5,723,883 A | 3/1998 | Gheewalla |
| 5,740,068 A | 4/1998 | Liebmann et al. |
| 5,745,374 A | 4/1998 | Matsumoto |
| 5,774,367 A | 6/1998 | Reyes et al. |
| 5,790,417 A | 8/1998 | Chao et al. |
| 5,796,624 A | 8/1998 | Sridhar et al. |
| 5,825,203 A | 10/1998 | Kusunoki et al. |
| 5,838,594 A | 11/1998 | Kojima |
| 5,841,663 A | 11/1998 | Sharma et al. |
| 5,847,421 A | 12/1998 | Yamaguchi |
| 5,852,562 A | 12/1998 | Shinomiya et al. |
| 5,858,580 A | 1/1999 | Wang et al. |
| 5,898,194 A | 4/1999 | Gheewala |
| 5,900,340 A | 5/1999 | Reich et al. |
| 5,908,827 A | 6/1999 | Sirna |
| 5,923,059 A | 7/1999 | Gheewala |
| 5,929,469 A | 7/1999 | Mimoto et al. |
| 5,935,763 A | 8/1999 | Caterer et al. |
| 5,973,507 A | 10/1999 | Yamazaki |
| 5,977,305 A | 11/1999 | Wigler et al. |
| 6,009,251 A | 12/1999 | Ho et al. |
| 6,026,223 A | 2/2000 | Scepanovic et al. |
| 6,037,617 A | 3/2000 | Kumagai |
| 6,044,007 A | 3/2000 | Capodieci |
| 6,063,132 A | 5/2000 | DeCamp et al. |
| 6,084,437 A | 7/2000 | Sako |
| 6,091,845 A | 7/2000 | Pierrat et al. |
| 6,099,584 A | 8/2000 | Arnold et al. |
| 6,100,025 A | 8/2000 | Wigler et al. |
| 6,114,071 A | 9/2000 | Chen et al. |
| 6,166,415 A | 12/2000 | Sakemi et al. |
| 6,174,742 B1 | 1/2001 | Sudhindranath et al. |
| 6,182,272 B1 | 1/2001 | Andreev et al. |
| 6,194,104 B1 | 2/2001 | Hsu |
| 6,194,252 B1 | 2/2001 | Yamaguchi |
| 6,194,912 B1 | 2/2001 | Or-Bach |
| 6,209,123 B1 | 3/2001 | Maziasz et al. |
| 6,230,299 B1 | 5/2001 | McSherry et al. |
| 6,232,173 B1 | 5/2001 | Hsu et al. |
| 6,240,542 B1 | 5/2001 | Kapur |
| 6,249,902 B1 | 6/2001 | Igusa et al. |
| 6,255,600 B1 | 7/2001 | Schaper |
| 6,262,487 B1 | 7/2001 | Igarashi et al. |
| 6,269,472 B1 | 7/2001 | Garza et al. |
| 6,275,973 B1 | 8/2001 | Wein |
| 6,282,696 B1 | 8/2001 | Garza et al. |
| 6,303,252 B1 | 10/2001 | Lin |
| 6,331,733 B1 | 12/2001 | Or-Bach et al. |
| 6,335,250 B1 | 1/2002 | Egi |
| 6,338,972 B1 | 1/2002 | Sudhindranath et al. |
| 6,356,112 B1 | 3/2002 | Tran et al. |
| 6,370,679 B1 | 4/2002 | Chang et al. |
| 6,378,110 B1 | 4/2002 | Ho |
| 6,388,296 B1 | 5/2002 | Hsu |
| 6,393,601 B1 | 5/2002 | Tanaka et al. |
| 6,415,421 B2 | 7/2002 | Anderson et al. |
| 6,416,907 B1 | 7/2002 | Winder et al. |
| 6,421,820 B1 | 7/2002 | Mansfield et al. |
| 6,425,112 B1 | 7/2002 | Bula et al. |
| 6,425,117 B1 | 7/2002 | Pasch et al. |
| 6,426,269 B1 | 7/2002 | Haffner et al. |
| 6,436,805 B1 | 8/2002 | Trivedi |
| 6,445,065 B1 | 9/2002 | Gheewala et al. |
| 6,469,328 B2 | 10/2002 | Yanai et al. |
| 6,470,489 B1 | 10/2002 | Chang et al. |
| 6,476,493 B2 | 11/2002 | Or-Bach et al. |
| 6,477,695 B1 | 11/2002 | Gandhi |
| 6,480,989 B2 | 11/2002 | Chan et al. |
| 6,492,066 B1 | 12/2002 | Capodieci et al. |
| 6,496,965 B1 | 12/2002 | van Ginneken et al. |
| 6,505,327 B2 | 1/2003 | Lin |
| 6,505,328 B1 | 1/2003 | van Ginneken et al. |
| 6,509,952 B1 | 1/2003 | Govil et al. |
| 6,514,849 B1 | 2/2003 | Hui et al. |
| 6,516,459 B1 | 2/2003 | Sahouria |
| 6,523,156 B2 | 2/2003 | Cirit |
| 6,525,350 B1 | 2/2003 | Kinoshita et al. |
| 6,536,028 B1 | 3/2003 | Katsioulas et al. |
| 6,543,039 B1 | 4/2003 | Watanabe |
| 6,553,544 B2 | 4/2003 | Tanaka et al. |
| 6,553,559 B2 | 4/2003 | Liebmann et al. |
| 6,553,562 B2 | 4/2003 | Capodieci et al. |
| 6,571,140 B1 | 5/2003 | Wewalaarachchi |
| 6,571,379 B2 | 5/2003 | Takayama |
| 6,578,190 B2 | 6/2003 | Ferguson et al. |
| 6,588,005 B1 | 7/2003 | Kobayashi et al. |
| 6,590,289 B2 | 7/2003 | Shively |
| 6,591,207 B2 | 7/2003 | Naya et al. |
| 6,609,235 B2 | 8/2003 | Ramaswamy et al. |
| 6,610,607 B1 | 8/2003 | Armbrust et al. |
| 6,617,621 B1 | 9/2003 | Gheewala et al. |
| 6,620,561 B2 | 9/2003 | Winder et al. |
| 6,633,182 B2 | 10/2003 | Pileggi et al. |
| 6,635,935 B2 | 10/2003 | Makino |
| 6,643,831 B2 | 11/2003 | Chang et al. |
| 6,650,014 B2 | 11/2003 | Kariyazaki |
| 6,661,041 B2 | 12/2003 | Keeth |
| 6,662,350 B2 | 12/2003 | Fried et al. |
| 6,673,638 B1 | 1/2004 | Bendik et al. |
| 6,687,895 B2 | 2/2004 | Zhang |
| 6,691,297 B1 | 2/2004 | Misaka et al. |
| 6,700,405 B1 | 3/2004 | Hirairi |
| 6,703,170 B1 | 3/2004 | Pindo |
| 6,714,903 B1 | 3/2004 | Chu et al. |
| 6,732,338 B2 | 5/2004 | Crouse et al. |
| 6,737,199 B1 | 5/2004 | Hsieh |
| 6,737,347 B1 | 5/2004 | Houston et al. |
| 6,745,372 B2 | 6/2004 | Cote et al. |
| 6,745,380 B2 | 6/2004 | Bodendorf et al. |
| 6,749,972 B2 | 6/2004 | Yu |
| 6,760,269 B2 | 7/2004 | Nakase et al. |
| 6,765,245 B2 | 7/2004 | Bansal |
| 6,777,138 B2 | 8/2004 | Pierrat et al. |
| 6,777,146 B1 | 8/2004 | Samuels |
| 6,789,244 B1 | 9/2004 | Dasasathyan et al. |
| 6,789,246 B1 | 9/2004 | Mohan et al. |
| 6,792,593 B2 | 9/2004 | Takashima et al. |
| 6,794,914 B2 | 9/2004 | Sani et al. |
| 6,795,952 B1 | 9/2004 | Stine et al. |
| 6,795,953 B2 | 9/2004 | Bakarian et al. |
| 6,807,663 B2 | 10/2004 | Cote et al. |
| 6,819,136 B2 | 11/2004 | Or-Bach |
| 6,826,738 B2 | 11/2004 | Cadouri |
| 6,834,375 B1 | 12/2004 | Stine et al. |
| 6,841,880 B2 | 1/2005 | Matsumoto et al. |
| 6,850,854 B2 | 2/2005 | Naya et al. |
| 6,854,096 B2 | 2/2005 | Eaton et al. |
| 6,854,100 B1 | 2/2005 | Chuang et al. |
| 6,877,144 B1 | 4/2005 | Rittman et al. |
| 6,884,712 B2 | 4/2005 | Yelehanka et al. |
| 6,898,770 B2 | 5/2005 | Boluki et al. |
| 6,904,582 B1 | 6/2005 | Rittman et al. |
| 6,918,104 B2 | 7/2005 | Pierrat et al. |
| 6,920,079 B2 | 7/2005 | Shibayama |
| 6,928,635 B2 | 8/2005 | Pramanik et al. |
| 6,931,617 B2 | 8/2005 | Sanie et al. |
| 6,953,956 B2 | 10/2005 | Or-Bach et al. |
| 6,954,918 B2 | 10/2005 | Houston |

| | | |
|---|---|---|
| 6,957,402 B2 | 10/2005 | Templeton et al. |
| 6,968,527 B2 | 11/2005 | Pierrat |
| 6,978,436 B2 | 12/2005 | Cote et al. |
| 6,978,437 B1 | 12/2005 | Rittman et al. |
| 6,992,394 B2 | 1/2006 | Park |
| 6,992,925 B2 | 1/2006 | Peng |
| 6,993,741 B2 | 1/2006 | Liebmann et al. |
| 6,994,939 B1 | 2/2006 | Ghandehari et al. |
| 7,016,214 B2 | 3/2006 | Kawamata |
| 7,028,285 B2 | 4/2006 | Cote et al. |
| 7,041,568 B2 | 5/2006 | Goldbach et al. |
| 7,052,972 B2 | 5/2006 | Sandhu et al. |
| 7,063,920 B2 | 6/2006 | Baba-Ali |
| 7,064,068 B2 | 6/2006 | Chou et al. |
| 7,065,731 B2 | 6/2006 | Jacques et al. |
| 7,079,989 B2 | 7/2006 | Wimer |
| 7,093,208 B2 | 8/2006 | Williams et al. |
| 7,093,228 B2 | 8/2006 | Andreev et al. |
| 7,103,870 B2 | 9/2006 | Misaka et al. |
| 7,105,871 B2 | 9/2006 | Or-Bach et al. |
| 7,107,551 B1 | 9/2006 | de Dood et al. |
| 7,115,343 B2 | 10/2006 | Gordon et al. |
| 7,115,920 B2 | 10/2006 | Bernstein et al. |
| 7,120,882 B2 | 10/2006 | Kotani et al. |
| 7,124,386 B2 | 10/2006 | Smith et al. |
| 7,132,203 B2 | 11/2006 | Pierrat |
| 7,137,092 B2 | 11/2006 | Maeda |
| 7,149,999 B2 | 12/2006 | Kahng et al. |
| 7,152,215 B2 | 12/2006 | Smith et al. |
| 7,155,685 B2 | 12/2006 | Mori et al. |
| 7,155,689 B2 | 12/2006 | Pierrat |
| 7,159,197 B2 | 1/2007 | Falbo et al. |
| 7,174,520 B2 | 2/2007 | White et al. |
| 7,175,940 B2 | 2/2007 | Laidig et al. |
| 7,185,294 B2 | 2/2007 | Zhang |
| 7,188,322 B2 | 3/2007 | Cohn et al. |
| 7,194,712 B2 | 3/2007 | Wu |
| 7,200,835 B2 | 4/2007 | Zhang et al. |
| 7,202,517 B2 | 4/2007 | Dixit et al. |
| 7,219,326 B2 | 5/2007 | Reed et al. |
| 7,225,423 B2 | 5/2007 | Bhattacharya et al. |
| 7,227,183 B2 | 6/2007 | Donze et al. |
| 7,231,628 B2 | 6/2007 | Pack et al. |
| 7,235,424 B2 | 6/2007 | Chen et al. |
| 7,243,316 B2 | 7/2007 | White et al. |
| 7,252,909 B2 | 8/2007 | Shin et al. |
| 7,264,990 B2 | 9/2007 | Rueckes et al. |
| 7,278,118 B2 | 10/2007 | Pileggi et al. |
| 7,287,320 B2 | 10/2007 | Wang et al. |
| 7,294,534 B2 | 11/2007 | Iwaki |
| 7,302,651 B2 | 11/2007 | Allen et al. |
| 7,308,669 B2 | 12/2007 | Buehler et al. |
| 7,335,966 B2 | 2/2008 | Ihme et al. |
| 7,337,421 B2 * | 2/2008 | Kamat ............... 716/53 |
| 7,338,896 B2 | 3/2008 | Vanhaelemeersch et al. |
| 7,346,885 B2 | 3/2008 | Semmler |
| 7,350,183 B2 | 3/2008 | Cui et al. |
| 7,353,492 B2 | 4/2008 | Gupta et al. |
| 7,360,179 B2 | 4/2008 | Smith et al. |
| 7,360,198 B2 | 4/2008 | Rana et al. |
| 7,366,997 B1 | 4/2008 | Rahmat et al. |
| 7,367,008 B2 | 4/2008 | White et al. |
| 7,376,931 B2 | 5/2008 | Kokubun |
| 7,383,521 B2 | 6/2008 | Smith et al. |
| 7,397,260 B2 | 7/2008 | Chanda et al. |
| 7,400,627 B2 | 7/2008 | Wu et al. |
| 7,402,848 B2 | 7/2008 | Chang et al. |
| 7,404,173 B2 | 7/2008 | Wu et al. |
| 7,411,252 B2 | 8/2008 | Anderson et al. |
| 7,421,678 B2 | 9/2008 | Barnes et al. |
| 7,423,298 B2 | 9/2008 | Mariyama et al. |
| 7,424,694 B2 | 9/2008 | Ikeda |
| 7,426,710 B2 | 9/2008 | Zhang et al. |
| 7,434,185 B2 | 10/2008 | Dooling et al. |
| 7,441,211 B1 | 10/2008 | Gupta et al. |
| 7,444,609 B2 | 10/2008 | Charlebois et al. |
| 7,446,352 B2 | 11/2008 | Becker et al. |
| 7,449,371 B2 | 11/2008 | Kemerling et al. |
| 7,458,045 B2 | 11/2008 | Cote et al. |
| 7,459,792 B2 | 12/2008 | Chen |
| 7,465,973 B2 | 12/2008 | Chang et al. |
| 7,466,607 B2 | 12/2008 | Hollis et al. |
| 7,480,880 B2 | 1/2009 | Visweswariah et al. |
| 7,480,891 B2 | 1/2009 | Sezginer |
| 7,484,197 B2 | 1/2009 | Allen et al. |
| 7,487,475 B1 | 2/2009 | Kriplani et al. |
| 7,506,300 B2 | 3/2009 | Sezginer et al. |
| 7,509,621 B2 | 3/2009 | Melvin, III |
| 7,509,622 B2 | 3/2009 | Sinha et al. |
| 7,512,921 B2 | 3/2009 | Shibuya |
| 7,514,959 B2 | 4/2009 | Or-Bach et al. |
| 7,523,429 B2 | 4/2009 | Kroyan et al. |
| 7,527,900 B2 | 5/2009 | Zhou et al. |
| 7,563,701 B2 | 7/2009 | Chang et al. |
| 7,568,174 B2 | 7/2009 | Sezginer et al. |
| 7,569,310 B2 | 8/2009 | Wallace et al. |
| 7,614,030 B2 | 11/2009 | Hsu |
| 7,632,610 B2 | 12/2009 | Wallace et al. |
| 7,665,051 B2 | 2/2010 | Ludwig et al. |
| 7,712,056 B2 | 5/2010 | White et al. |
| 7,755,110 B2 | 7/2010 | Gliese et al. |
| 7,770,144 B2 | 8/2010 | Dellinger |
| 7,802,219 B2 | 9/2010 | Tomar et al. |
| 7,825,437 B2 | 11/2010 | Pillarisetty et al. |
| 7,842,975 B2 | 11/2010 | Becker et al. |
| 7,882,456 B2 * | 2/2011 | Zach ............... 716/55 |
| 7,888,705 B2 | 2/2011 | Becker et al. |
| 7,898,040 B2 | 3/2011 | Nawaz |
| 7,908,578 B2 | 3/2011 | Becker et al. |
| 7,910,958 B2 | 3/2011 | Becker et al. |
| 7,917,877 B2 | 3/2011 | Singh et al. |
| 7,917,879 B2 | 3/2011 | Becker et al. |
| 7,923,266 B2 | 4/2011 | Thijs et al. |
| 7,923,337 B2 | 4/2011 | Chang et al. |
| 7,932,545 B2 | 4/2011 | Becker et al. |
| 7,962,867 B2 | 6/2011 | White et al. |
| 7,964,267 B1 * | 6/2011 | Lyons et al. ............... 428/156 |
| 7,971,160 B2 | 6/2011 | Osawa et al. |
| 7,992,122 B1 | 8/2011 | Burstein et al. |
| 7,994,583 B2 | 8/2011 | Inaba |
| 8,004,042 B2 | 8/2011 | Yang et al. |
| 8,058,671 B2 | 11/2011 | Becker et al. |
| 2002/0015899 A1 | 2/2002 | Chen et al. |
| 2002/0079927 A1 | 6/2002 | Katoh et al. |
| 2002/0166107 A1 | 11/2002 | Capodieci et al. |
| 2003/0042930 A1 | 3/2003 | Pileggi et al. |
| 2003/0046653 A1 | 3/2003 | Liu |
| 2003/0061592 A1 | 3/2003 | Agrawal et al. |
| 2003/0088839 A1 | 5/2003 | Watanabe |
| 2003/0088842 A1 | 5/2003 | Cirit |
| 2003/0106037 A1 | 6/2003 | Moniwa et al. |
| 2003/0145299 A1 | 7/2003 | Fried et al. |
| 2003/0177465 A1 | 9/2003 | MacLean et al. |
| 2003/0229868 A1 | 12/2003 | White et al. |
| 2003/0229875 A1 | 12/2003 | Smith et al. |
| 2004/0049754 A1 | 3/2004 | Liao et al. |
| 2004/0063038 A1 | 4/2004 | Shin et al. |
| 2004/0115539 A1 | 6/2004 | Broeke et al. |
| 2004/0139412 A1 | 7/2004 | Ito et al. |
| 2004/0145028 A1 | 7/2004 | Matsumoto et al. |
| 2004/0153979 A1 | 8/2004 | Chang |
| 2004/0161878 A1 | 8/2004 | Or-Bach et al. |
| 2004/0229135 A1 | 11/2004 | Wang et al. |
| 2004/0243966 A1 | 12/2004 | Dellinger |
| 2005/0055828 A1 | 3/2005 | Wang et al. |
| 2005/0087806 A1 | 4/2005 | Hokazono |
| 2005/0093147 A1 | 5/2005 | Tu |
| 2005/0101112 A1 | 5/2005 | Rueckes et al. |
| 2005/0136340 A1 | 6/2005 | Baselmans et al. |
| 2005/0138598 A1 | 6/2005 | Kokubun |
| 2005/0185325 A1 | 8/2005 | Hur |
| 2005/0189614 A1 | 9/2005 | Ihme et al. |
| 2005/0196685 A1 | 9/2005 | Wang et al. |
| 2005/0224982 A1 | 10/2005 | Kemerling et al. |
| 2005/0229130 A1 | 10/2005 | Wu et al. |
| 2005/0251771 A1 * | 11/2005 | Robles ............... 716/5 |
| 2005/0268256 A1 | 12/2005 | Tsai et al. |
| 2006/0063334 A1 | 3/2006 | Donze et al. |

| | | |
|---|---|---|
| 2006/0070018 A1 | 3/2006 | Semmler |
| 2006/0084261 A1 | 4/2006 | Iwaki |
| 2006/0101370 A1 | 5/2006 | Cui et al. |
| 2006/0112355 A1 | 5/2006 | Pileggi et al. |
| 2006/0113567 A1 | 6/2006 | Ohmori et al. |
| 2006/0121715 A1 | 6/2006 | Chang et al. |
| 2006/0125024 A1 | 6/2006 | Ishigaki |
| 2006/0131609 A1 | 6/2006 | Kinoshita et al. |
| 2006/0151810 A1 | 7/2006 | Ohshige |
| 2006/0158270 A1 | 7/2006 | Gibet et al. |
| 2006/0177744 A1 | 8/2006 | Bodendorf et al. |
| 2006/0181310 A1 | 8/2006 | Rhee |
| 2006/0197557 A1 | 9/2006 | Chung |
| 2006/0206854 A1 | 9/2006 | Barnes et al. |
| 2006/0223302 A1 | 10/2006 | Chang et al. |
| 2006/0248495 A1 | 11/2006 | Sezginer |
| 2007/0038973 A1 | 2/2007 | Li et al. |
| 2007/0074145 A1 | 3/2007 | Tanaka |
| 2007/0094634 A1 | 4/2007 | Seizginer et al. |
| 2007/0101305 A1 | 5/2007 | Smith et al. |
| 2007/0105023 A1 | 5/2007 | Zhou et al. |
| 2007/0106971 A1 | 5/2007 | Lien et al. |
| 2007/0113216 A1 | 5/2007 | Zhang |
| 2007/0196958 A1 | 8/2007 | Bhattacharya et al. |
| 2007/0209029 A1 | 9/2007 | Ivonin et al. |
| 2007/0210391 A1 | 9/2007 | Becker |
| 2007/0234252 A1 | 10/2007 | Visweswariah et al. |
| 2007/0256039 A1 | 11/2007 | White |
| 2007/0274140 A1 | 11/2007 | Joshi et al. |
| 2007/0290361 A1 | 12/2007 | Chen |
| 2007/0294652 A1 | 12/2007 | Bowen |
| 2008/0005712 A1 | 1/2008 | Charlebois et al. |
| 2008/0046846 A1 | 2/2008 | Chew et al. |
| 2008/0082952 A1 | 4/2008 | O'Brien |
| 2008/0086712 A1 | 4/2008 | Fujimoto |
| 2008/0097641 A1 | 4/2008 | Miyashita et al. |
| 2008/0098334 A1 | 4/2008 | Pileggi et al. |
| 2008/0099795 A1 | 5/2008 | Bernstein et al. |
| 2008/0127029 A1 | 5/2008 | Graur et al. |
| 2008/0134128 A1 | 6/2008 | Blatchford et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0216207 A1 | 9/2008 | Tsai |
| 2008/0244494 A1 | 10/2008 | McCullen |
| 2008/0276105 A1 | 11/2008 | Hoberman et al. |
| 2008/0283910 A1 | 11/2008 | Dreeskornfeld et al. |
| 2008/0308848 A1 | 12/2008 | Inaba |
| 2008/0315258 A1 | 12/2008 | Masuda et al. |
| 2009/0014811 A1 | 1/2009 | Becker |
| 2009/0024974 A1 | 1/2009 | Yamada |
| 2009/0031261 A1 | 1/2009 | Smith et al. |
| 2009/0032898 A1 | 2/2009 | Becker |
| 2009/0032967 A1 | 2/2009 | Becker |
| 2009/0037864 A1 | 2/2009 | Becker |
| 2009/0077524 A1 | 3/2009 | Nagamura |
| 2009/0085067 A1 | 4/2009 | Hayashi et al. |
| 2009/0101940 A1 | 4/2009 | Barrows et al. |
| 2009/0106714 A1 | 4/2009 | Culp et al. |
| 2009/0155990 A1 | 6/2009 | Yanagidaira et al. |
| 2009/0181314 A1 | 7/2009 | Shyu et al. |
| 2009/0187871 A1 | 7/2009 | Cork |
| 2009/0224408 A1 | 9/2009 | Fox |
| 2009/0228853 A1 | 9/2009 | Hong et al. |
| 2009/0280582 A1 | 11/2009 | Thijs et al. |
| 2009/0302372 A1 | 12/2009 | Chang et al. |
| 2010/0001321 A1 | 1/2010 | Becker |
| 2010/0006897 A1 | 1/2010 | Becker |
| 2010/0006898 A1 | 1/2010 | Becker |
| 2010/0006899 A1 | 1/2010 | Becker |
| 2010/0006900 A1 | 1/2010 | Becker |
| 2010/0006901 A1 | 1/2010 | Becker |
| 2010/0006902 A1 | 1/2010 | Becker |
| 2010/0006903 A1 | 1/2010 | Becker |
| 2010/0006947 A1 | 1/2010 | Becker |
| 2010/0006948 A1 | 1/2010 | Becker |
| 2010/0006950 A1 | 1/2010 | Becker |
| 2010/0006951 A1 | 1/2010 | Becker |
| 2010/0006986 A1 | 1/2010 | Becker |
| 2010/0011327 A1 | 1/2010 | Becker |
| 2010/0011328 A1 | 1/2010 | Becker |
| 2010/0011329 A1 | 1/2010 | Becker |
| 2010/0011330 A1 | 1/2010 | Becker |
| 2010/0011331 A1 | 1/2010 | Becker |
| 2010/0011332 A1 | 1/2010 | Becker |
| 2010/0011333 A1 | 1/2010 | Becker |
| 2010/0012981 A1 | 1/2010 | Becker |
| 2010/0012982 A1 | 1/2010 | Becker |
| 2010/0012983 A1 | 1/2010 | Becker |
| 2010/0012984 A1 | 1/2010 | Becker |
| 2010/0012985 A1 | 1/2010 | Becker |
| 2010/0012986 A1 | 1/2010 | Becker |
| 2010/0017766 A1 | 1/2010 | Becker |
| 2010/0017767 A1 | 1/2010 | Becker |
| 2010/0017768 A1 | 1/2010 | Becker |
| 2010/0017769 A1 | 1/2010 | Becker |
| 2010/0017770 A1 | 1/2010 | Becker |
| 2010/0017771 A1 | 1/2010 | Becker |
| 2010/0017772 A1 | 1/2010 | Becker |
| 2010/0019280 A1 | 1/2010 | Becker |
| 2010/0019281 A1 | 1/2010 | Becker |
| 2010/0019282 A1 | 1/2010 | Becker |
| 2010/0019283 A1 | 1/2010 | Becker |
| 2010/0019284 A1 | 1/2010 | Becker |
| 2010/0019285 A1 | 1/2010 | Becker |
| 2010/0019286 A1 | 1/2010 | Becker |
| 2010/0019287 A1 | 1/2010 | Becker |
| 2010/0019288 A1 | 1/2010 | Becker |
| 2010/0019308 A1 | 1/2010 | Chan et al. |
| 2010/0023906 A1 | 1/2010 | Becker |
| 2010/0023907 A1 | 1/2010 | Becker |
| 2010/0023908 A1 | 1/2010 | Becker |
| 2010/0023911 A1 | 1/2010 | Becker |
| 2010/0025731 A1 | 2/2010 | Becker |
| 2010/0025732 A1 | 2/2010 | Becker |
| 2010/0025733 A1 | 2/2010 | Becker |
| 2010/0025734 A1 | 2/2010 | Becker |
| 2010/0025735 A1 | 2/2010 | Becker |
| 2010/0025736 A1 | 2/2010 | Becker |
| 2010/0032721 A1 | 2/2010 | Becker |
| 2010/0032722 A1 | 2/2010 | Becker |
| 2010/0032723 A1 | 2/2010 | Becker |
| 2010/0032724 A1 | 2/2010 | Becker |
| 2010/0032726 A1 | 2/2010 | Becker |
| 2010/0037194 A1 | 2/2010 | Becker |
| 2010/0037195 A1 | 2/2010 | Becker |
| 2010/0096671 A1 | 4/2010 | Becker |
| 2010/0203689 A1 | 8/2010 | Bernstein et al. |
| 2010/0232212 A1 | 9/2010 | Anderson et al. |
| 2010/0264468 A1 | 10/2010 | Xu |
| 2010/0287518 A1 | 11/2010 | Becker |
| 2011/0108890 A1 | 5/2011 | Becker et al. |
| 2011/0108891 A1 | 5/2011 | Becker et al. |
| 2011/0154281 A1 | 6/2011 | Zach |
| 2011/0207298 A1 | 8/2011 | Anderson et al. |
| 2011/0260253 A1 | 10/2011 | Inaba |
| 2012/0012932 A1 | 1/2012 | Perng et al. |

FOREIGN PATENT DOCUMENTS

| | | |
|---|---|---|
| EP | 1670062 | 6/2006 |
| FR | 2860920 | 4/2005 |
| JP | 10-116911 | 5/1998 |
| JP | 2002-258463 | 9/2002 |
| JP | 2005-259913 | 9/2005 |
| KR | 10-1999-0057943 A | 7/1999 |
| KR | 10-2000-0028830 A | 5/2000 |
| KR | 10-2005-0030347 A | 3/2005 |
| WO | WO 2005/104356 | 11/2005 |
| WO | WO 2006/014849 | 2/2006 |
| WO | WO 2006/052738 | 5/2006 |
| WO | WO 2007/103587 | 9/2007 |

OTHER PUBLICATIONS

Hakko et al., "Extension of the 2D-TCC technique to optimize mask pattern layouts," 2008 Proc. of SPIE vol. 7028, 11 pages.*

Kawashima et al., "Mask optimization for arbitrary patterns with 2D-TCC resolution enhancement technique," 2008 Proc. of SPIE vol. 6924, 12 pages.*

Rosenbluth et al., "Optimum Mask and Source Patterns to Print a Given Shape," 2001 Proc. of SPIE vol. 4346, pp. 486-502.*

Socha et al., "Simultanesou Source Mask Optimization (SMO)", 2005 Proc. of SPIE vol. 5853, pp. 180-193.*

Wong, "Resolution Enhancement Techniques and Design for Manufacturability: Containing and Accounting for Variabilities in Integrated Circuit Creation," J. Micro/Nanolith. MEMS MOEMS, Jul.-Sep. 2007, vol. 6(3), 2 pages.*

Yamazoe et al., "Resolution enhancement by aerial image approximation with 2D-TCC," 2007 Proc. of SPIE vol. 6730, 12 pages.*

Yu et al., "True process variation aware optical proximity correction with variational lithography modeling and model calibration," J. Micro/Nanolith. MEMS MOEMS, Jul.-Sep. 2007, vol. 6(3), 16 pages.*

U.S. Appl. No. 60/625,342, filed May 25, 2006, Pileggi et al.

Acar, et al., "A Linear-Centric Simulation Framework for Parametric Fluctuations", 2002, IEEE, Carnegie Mellon University USA, pp. 1-8.

Amazawa, et al., "Fully Planarized Four-Level Interconnection with Stacked VLAS Using CMP of Selective CVD-A1 and Insulator and its Application to Quarter Micron Gate Array LSIs", 1995, IEEE, Japan, pp. 473-476.

Axelrad et al. "Efficient Full-Chip Yield Analysis Methodology for OPC-Corrected VLSI Design", 2000, International Symposium on Quality Electronic Design (ISQED).

Balasinski et al. "Impact of Subwavelength CD Tolerance on Device Performance", 2002, SPIE.

Burkhardt, et al., "Dark Field Double Dipole Lithography (DDL) for Back-End-of-Line Processes", 2007, SPIE Proceeding Series, vol. 6520; 65200K.

Capetti, et al., "Sub k1 = 0.25 Lithography with Double Patterning Technique for 45nm Technology Node Flash Memory Devices at λ= 193nm", 2007, SPIE Proceeding Series, vol. 6520; 65202K.

Chandra, et al., "An Interconnect Channel Design Methodology for High Performance Integrated Circuits", 2004, IEEE, Carnegie Mellon University, pp. 1-6.

Cheng, et al., "Feasibility Study of Splitting Pitch Technology on 45nm Contact Patterning with 0.93 NA", 2007, SPIE Proceeding Series, vol. 6520; 65202N.

Chow, et al., "The Design of a SRAM-Based Field-Programmable Gate Array—Part II: Circuit Design and Layout", 1999, IEEE, vol. 7 # 3 pp. 321-330.

Clark et al. "Managing Standby and Active Mode Leakage Power in Deep Sub-Micron Design", Aug. 9-11, 2004, ACM.

Cobb et al. "Using OPC to Optimize for Image Slope and Improve Process Window", 2003, SPIE.

Devgan "Leakage Issues in IC Design: Part 3", 2003, CCAD.

DeVor, et al., "Statistical Quality Design and Control", 1992, Macmillan Publishing Company, pp. 264-267.

Dusa, et al. "Pitch Doubling Through Dual Patterning Lithography Challenges in Integration and Litho Budgets", 2007, SPIE Proceeding Series, vol. 6520; 65200G.

El-Gamal, "Fast, Cheap and Under Control: The Next Implementation Fabric", Jun. 2-6, 2003, ACM Press, pp. 354-355.

Frankel, "Quantum State Control Interference Lithography and Trim Double Patterning for 32-16nm Lithography", 2007, SPIE Proceeding Series, vol. 6520; 65202L.

Garg, et al. "Lithography Driven Layout Design", 2005, IEEE.

Grobman et al. "Reticle Enhancement Technology Trends: Resource and Manufacturability Implications for the Implementation of Physical Designs" Apr. 1-4, 2001, ACM.

Grobman et al. "Reticle Enhancement Technology: Implications and Challenges for Physical Design" Jun. 18-22, 2001, ACM.

Gupta et al. "Enhanced Resist and Etch CD Control by Design Perturbation", Oct. 4-7, 2006, Society of Photo-Optical Instrumentation Engineers.

Gupta et al. "A Practical Transistor-Level Dual Threshold Voltage Assignment Methodology", 2005, Sixth International Symposium on Quality Electronic Design (ISQED).

Gupta et al. "Detailed Placement for Improved Depth of Focus and CD Control", 2005, ACM.

Gupta et al. "Joining the Design and Mask Flows for Better and Cheaper Masks", Oct. 14-17, 2004, Society of Photo-Optical Instrumentation Engineers.

Gupta et al. "Selective Gate-Length Biasing for Cost-Effective Runtime Leakage Control", Jun. 7-11, 2004, ACM.

Gupta et al. "Wafer Topography-Aware Optical Proximity Correction for Better DOF Margin and CD Control", Apr. 13-15, 2005, SPIE.

Hayashida, et al., "Manufacturable Local Interconnect technology Fully Compatible with Titanium Salicide Process", Jun. 11-12, 1991, VMIC Conference.

Heng, et al., "A VLSI Artwork Legalization Technique Base on a New Criterion of Minimum Layout Perturbation", 1997, ACM Press, pp. 116-121.

Heng, et al., "Toward Through-Process Layout Quality Metrics", Mar. 3-4, 2005, Society of Photo-Optical Instrumentation Engineers.

Hu, et al., "Synthesis and Placement Flow for Gain-Based Programmable Regular Fabrics", Apr. 6-9, 2003, ACM Press, pp. 197-203.

Hutton, et al., "A Methodology for FPGA to Structured-ASIC Synthesis and Verification", 2006, EDAA, pp. 64-69.

Intel Core Microarchitecture White Paper "Introducing the 45 nm Next-Generation Intel Core Microarchitecture," 2007, Intel Corporation.

Jayakumar, et al., "A Metal and VIA Maskset Programmable VLSI Design Methodology using PLAs", 2004, IEEE, pp. 590-594.

Jhaveri, T. et al., Maximization of Layout Printability/Manufacturability by Extreme Layout Regularity, Proc. of the SPIE, Apr. 2006.

Kang, S.M., Metal-Metal Matrix (M3) for High-Speed MOS VLSI Layout, IEEE Trans. on CAD, vol. CAD-6, No. 5, Sep. 1987.

Kheterpal, et al., "Design Methodology for IC Manufacturability Based on Regular Logic-Bricks", DAC, Jun. 13-17, 2005, IEEE/AMC, vol. 6520.

Kheterpal, et al., "Routing Architecture Exploration for Regular Fabrics", DAC, Jun. 7-11, 2004, ACM Press, pp. 204-207.

Kim, et al., "Double Exposure Using 193nm Negative Tone Photoresist", 2007, SPIE Proceeding Series, vol. 6520; 65202M.

Kim, et al., "Issues and Challenges of Double Patterning Lithography in DRAM", 2007, SPIE Proceeding Series, vol. 6520; 65200H.

Koorapaty, et al., "Exploring Logic Block Granularity for Regular Fabrics", 2004, IEEE, pp. 1-6.

Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 2003, Springer-Verlag, vol. 2778, pp. 426-436.

Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2002, Springer-Verlag, vol. 2438 pp. 132-141.

Lavin et al. "Backend DAC Flows for "Restrictive Design Rules"", 2004, IEEE.

Li, et al., "A Linear-Centric Modeling Approach to Harmonic Balance Analysis", 2002, IEEE, pp. 1-6.

Li, et al., "Nonlinear Distortion Analysis Via Linear-Centric Models", 2003, IEEE, pp. 897-903.

Liebmann et al., "Integrating DfM Components Into a Cohesive Design-to-Silicon Solution", IBM Systems and Technology Group, b IBM Research, pp. 1-12.

Liebmann, et al., "High-Performance Circuit Design for the RET-Enabled 65nm Technology Node", Feb. 26-27, 2004, SPIE Proceeding Series, vol. 5379 pp. 20-29.

Liebmann, L. W., Layout Impact of Resolution Enhancement Techniques: Impediment or Opportunity?, International Symposium on Physical Design, 2003.

Liu, et al., "Double Patterning with Multilayer Hard Mask Shrinkage for Sub-0.25 k1 Lithography", 200, SPIE Proceeding Series, vol. 6520; 65202J.

Miller, "Manufacturing-Aware Design Helps Boost IC Yield", Sep. 9, 2004, http://www.eetimes.com/showArticle. jhtml?articleID=47102054

Mo, et al., "Checkerboard: A Regular Structure and its Synthesis, International Workshop on Logic and Synthesis", 2003, Department of Electrical Engineering and Computer Sciences, UC Berkeley, California, pp. 1-7.

Mo, et al., "PLA-Based Regular Structures and Their Synthesis", 2003, Department of Electrical Engineering and Computer Sciences, IEEE, pp. 723-729.

Mo, et al., "Regular Fabrics in Deep Sub-Micron Integrated-Circuit Design", 2004, Kluwer Academic Publishers, Entire Book.

Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive.

Mutoh et al. "1-V Power Supply High-Speed Digital Circuit Technology with Multithreshold-Voltage CMOS", 1995, IEEE.

Op de Beek, et al., "Manufacturability issues with Double Patterning for 50nm half pitch damascene applications, using RELACS® shrink and corresponding OPC", 2007, SPIE Proceeding Series, vol. 6520; 65200I.

Or-Bach, "Programmable Circuit Fabrics", Sep. 18, 2001, e-ASIC, pp. 1-36.

Otten, et al., "Planning for Performance", DAC 1998, ACM Inc., pp. 122-127.

Pack et al. "Physical & Timing Verification of Subwavelength-Scale Designs-Part I: Lithography Impact on MOSFETs", 2003, SPIE.

Pandini, et al., "Congestion-Aware Logic Synthesis", 2002, IEEE, pp. 1-8.

Pandini, et al., "Understanding and Addressing the Impact of Wiring Congestion During Technology Mapping", ISPD Apr. 7-10, 2002, ACM Press, pp. 131-136.

Patel, et al., "An Architectural Exploration of Via Patterned Gate Arrays, ISPD 2003", Apr. 6, 2003, pp. 184-189.

Pileggi, et al., "Exploring Regular Fabrics to Optimize the Performance-Cost Trade-Offs, Proceedings of the 40th ACM/IEEE Design Automation Conference (DAC) 2003", Jun. 2003, ACM Press, pp. 782-787.

Poonawala, et al., "ILT for Double Exposure Lithography with Conventional and Novel Materials", 2007, SPIE Proceeding Series, vol. 6520; 65202Q.

Qian et al. "Advanced Physical Models for Mask Data Verification and Impacts on Physical Layout Synthesis" 2003. IEEE.

Ran, et al., "An Integrated Design Flow for a Via-Configurable Gate Array", 2004, IEEE, pp. 582-589.

Ran, et al., "Designing a Via-Configurable Regular Fabric", Custom Integrated Circuits Conference (CICC). Proceedings of the IEEE, Oct. 2004, Oct. 1, 2004, pp. 423-426.

Ran, et al., "On Designing Via-Configurable Cell Blocks for Regular Fabrics" Proceedings of the Design Automation Conference (DAC) 2004, Jun. 2004, ACM Press, s 198-203.

Ran, et al., "The Magic of a Via-Configurable Regular Fabric", Proceedings of the IEEE International Conference on Computer Design (ICCD) Oct. 2004.

Ran, et al., "Via-Configurable Routing Architectures and Fast Design Mappability Estimation for Regular Fabrics", 2005, IEEE, pp. 25-32.

Reis, et al., "Physical Design Methodologies for Performance Predictability and Manufacturability", Apr. 14-16, 2004, ACM Press, pp. 390-397.

Robertson, et al., "The Modeling of Double Patterning Lithographic Processes", 2007, SPIE Proceeding Series, vol. 6520; 65200J.

Rovner, "Design for Manufacturability in Via Programmable Gate Arrays", May 2003, Graduate School of Carnegie Mellon University.

Sengupta, "An Integrated CAD Framework Linking VLSI Layout Editors and Process Simulators", 1998, Thesis for Rice University, pp. 1-101.

Sengupta, et al., "An Integrated CAD Framework Linking VLSI Layout Editors and Process Simulators", 1996, SPIE Proceeding Series, vol. 2726; pp. 244-252.

Sherlekar, "Design Considerations for Regular Fabrics", Apr. 18-21, 2004, ACM Press, pp. 97-102.

Sreedhar et al. "Statistical Yield Modeling for Sub-Wavelength Lithography", 2008, IEEE.

Stapper, "Modeling of Defects in Integrated Circuit Photolithographic Patterns", Jul. 1, 1984, IBM, vol. 28 # 4, pp. 461-475.

Taylor, et al., "Enabling Energy Efficiency in Via-Patterned Gate Array Devices", Jun. 7-11, 2004, ACM Press, pp. 874-877.

Tian et al. "Model-Based Dummy Feature Placement for Oxide Chemical_Mechanical Polishing Manufacturability" 2000, ACM.

Tong, et al., "Regular Logic Fabrics for a Via Patterned Gate Array (VPGA), Custom Integrated Circuits Conference", Sep. 2003, Proceedings of the IEEE, pp. 53-56.

Vanleenhove, et al., "A Litho-Only Approach to Double Patterning", 2007, SPIE Proceeding Series, vol. 6520; 65202F.

Wang, et al., "Performance Optimization for Gridded-Layout Standard Cells", 2004, vol. 5567 SPIE.

Wang, J. et al., Standard Cell Layout with Regular Contact Placement, IEEE Trans. on Semicon. Mfg., vol. 17, No. 3, Aug. 2004.

Webb, Clair, "Layout Rule Trends and Affect upon CPU Design", 2006, vol. 6156 SPIE.

Webb, Clair, "45nm Design for Manufacturing," Intel Technology Journal, vol. 12, Issue 2, Jun. 17, 2008, ISSN 1535-864X, pp. 121-130.

Wenren, et al., "The Improvement of Photolithographic Fidelity of Two-dimensional Structures Though Double Exposure Method", 2007, SPIE Proceeding Series, vol. 6520; 65202I.

Wilcox, et al., "Design for Manufacturability: A Key to Semiconductor Manufacturing Excellence", 1998, IEEE, pp. 308-313.

Wu, et al., "A Study of Process Window Capabilities for Two-dimensional Structures under Double Exposure Condition", 2007, SPIE Proceeding Series, vol. 6520; 65202O.

Xiong, et al., "The Constrained Via Minimization Problem for PCB and VLSI Design", 1988, ACM Press/IEEE, pp. 573-578.

Yamamaoto, et al., "New Double Exposure Technique without Alternating Phase Shift Mask", 2007, SPIE Proceeding Series, vol. 6520; 652052P.

Yang, et al., "Interconnection Driven VLSI Module Placement Based on Quadratic Programming and Considering Congestion Using LFF Principles", 2004, IEEE, pp. 1243-1247.

Yao, et al., "Multilevel Routing With Redundant Via Insertion", Oct. 2006, IEEE, pp. 1148-1152.

Zheng, et al."Modeling and Analysis of Regular Symmetrically Structured Power/Ground Distribution Networks", DAC, Jun. 10-14, 2002, ACM Press, pp. 395-398.

Zhu, et al., "A Stochastic Integral Equation Method for Modeling the Rough Surface Effect on Interconnect Capacitance", 2004, IEEE.

Zhu, et al., "A Study of Double Exposure Process Design with Balanced Performance Parameters for Line/Space Applications", 2007, SPIE Proceeding Series, vol. 6520; 65202H.

Zuchowski, et al., "A Hybrid ASIC and FPGA Architecture", 2003, IEEE, pp. 187-194.

Capodieci, L., et al., "Toward a Methodology for Manufacturability-Driven Design Rule Exploration," DAC 2004, Jun. 7-11, 2004, San Diego, CA.

Dictionary.com, "channel," in Collins English Dictionary—Complete & Unabridged 10th Edition. Source location: HarperCollins Publishers. http://dictionary.reference.com/browse/channel. Available: http://dictionary.reference.com.

Gupta et al. "Manufacturing-Aware Physical Design", 2003, ACM.

Gupta, Puneet, et al., "Manufacturing-aware Design Methodology for Assist Feature Correctness." 2005.

Ha et al., "Reduction in the Mask Error Factor by Optimizing the Diffraction Order of a Scattering Bar in Lithography," Journal of the Korean Physical Society, vol. 46, No. 5, May 2005, pp. 1213-1217.

Halpin et al., "Detailed Placement with Net Length Constraints," Publication Year 2003, Proceedings of the 3rd IEEE International Workshop on System-on-Chip for Real-Time Applications, pp. 22-27.

Hur et al., "Mongrel: Hybrid Techniques for Standard Cell Placement," Publication Year 2000, IEEE/ACM International Conference on Computer Aided Design, ICCAD-2000, pp. 165-170.

Kuh et al., "Recent Advances in VLSI Layout," Publication Year 1990, Proceedings of the IEEE, vol. 78, Issue 2, pp. 237-263.

Liebmann et al., "Optimizing Style Options for Sub-Resolution Assist Features," Proc. of SPIE vol. 4346, 2001, pp. 141-152.

Mansfield et al., "Lithographic Comparison of Assist Feature Design Strategies," Proc. of SPIE vol. 4000, 2000, pp. 63-76.

Mishra, P., et al., "FinFET Circuit Design," Nanoelectronic Circuit Design, pp. 23-54, 2011.

Pham, D., et al., "FINFET Device Junction Formation Challenges," 2006 International Workshop on Junction Technology, pp. 73-77, Aug. 2006.

Shi et al., "Understanding the Forbidden Pitch and Assist Feature Placement," Proc. of SPIE vol. 4562, 2002, pp. 968-979.

Smayling et al., "APF Pitch Halving for 22 nm Logic Cells Using Gridded Design Rules," Proceedings of SPIE, USA, vol. 6925, Jan. 1, 2008, pp. 69251E-1-69251E-7.

* cited by examiner

| Normalized Pitch | | | | | | | |
|---|---|---|---|---|---|---|---|
| 1.1 | 3 | 2 | 1 | 0 | 0 | 0 | 0 |
| 1.05 | 2 | 1 | 0 | 0 | 0 | 0 | 0 |
| 1.0 | 2 | 1 | 0 | 0 | 0 | 0 | 0 |
| 0.95 | 3 | 1 | 0 | 0 | 0 | 0 | 0 |
| 0.9 | 4 | 2 | 0 | 0 | 0 | 0 | 1 |
| 0.85 | 5 | 4 | 2 | 2 | 1 | 1 | 2 |
| 0.8 | 8 | 5 | 4 | 3 | 2 | 2 | 4 |
|  | 0.8 | 0.85 | 0.9 | 0.95 | 1.0 | 1.05 | 1.1 |

Normalized LES

Fig. 11A

| Normalized Pitch | | | | | | | |
|---|---|---|---|---|---|---|---|
| 1.1 | 1 | 0 | 0 | 0 | 0 | 0 | 0 |
| 1.05 | 1 | 0 | 0 | 0 | 0 | 0 | 0 |
| 1.0 | 1 | 0 | 0 | 0 | 0 | 0 | 0 |
| 0.95 | 1 | 0 | 0 | 0 | 0 | 0 | 0 |
| 0.9 | 2 | 0 | 0 | 0 | 0 | 0 | 0 |
| 0.85 | 2 | 1 | 0 | 0 | 0 | 0 | 1 |
| 0.8 | 3 | 2 | 1 | 1 | 1 | 1 | 2 |
|  | 0.8 | 0.85 | 0.9 | 0.95 | 1.0 | 1.05 | 1.1 |

Normalized LES

Fig. 11B

METHODS FOR DEFINING AND USING CO-OPTIMIZED NANOPATTERNS FOR INTEGRATED CIRCUIT DESIGN AND APPARATUS IMPLEMENTING SAME

CLAIM OF PRIORITY

This application claims priority under 35 U.S.C. 119(e) to U.S. Provisional Patent Application No. 61/075,711, filed Jun. 25, 2008, entitled "Methods for Defining and Using Co-Optimized Nanopatterns for Integrated Circuit Design and Apparatus Implementing the Same."

This application is a continuation-in-part application under 35 U.S.C. 120 of prior U.S. application Ser. No. 12/013,342, filed Jan. 11, 2008, now U.S. Pat. No. 7,917,879 entitled "Semiconductor Device with Dynamic Array Section," which claims priority under 35 U.S.C. 119(e) to both U.S. Provisional Patent Application No. 60/963,364, filed Aug. 2, 2007, and to prior U.S. Provisional Patent Application No. 60/972,394, filed Sep. 14, 2007.

This application is also a continuation-in-part application under 35 U.S.C. 120 of prior U.S. application Ser. No. 12/212,562, filed Sep. 17, 2008, now U.S. Pat. No. 7,842,975 entitled "Dynamic Array Architecture," which is a continuation application under 35 U.S.C. 120 of prior U.S. application Ser. No. 11/683,402, filed Mar. 7, 2007, now U.S. Pat. No. 7,446,352 which claims priority under 35 U.S.C. 119(e) to U.S. Provisional Patent Application No. 60/781,288, filed Mar. 9, 2006.

The disclosure of each above-identified patent application is incorporated herein by reference in its entirety.

BACKGROUND

A push for higher performance and smaller die size drives the semiconductor industry to reduce circuit chip area by approximately 50% every two years. The chip area reduction provides an economic benefit for migrating to newer technologies. The 50% chip area reduction is achieved by reducing the feature sizes between 25% and 30%. The reduction in feature size is enabled by improvements in manufacturing equipment and materials. For example, improvement in the lithographic process has enabled smaller feature sizes to be achieved, while improvement in chemical mechanical polishing (CMP) has in-part enabled a higher number of interconnect layers.

In the evolution of lithography, as the minimum feature size approached the wavelength of the light source used to expose the feature shapes, unintended interactions occurred between neighboring features. Today minimum feature sizes are being reduced below 45 nm (nanometers), while the wavelength of the light source used in the photolithography process remains at 193 nm. The difference between the minimum feature size and the wavelength of light used in the photolithography process is defined as the lithographic gap. As the lithographic gap grows, the resolution capability of the lithographic process decreases.

An interference pattern occurs as each shape on the mask interacts with the light. The interference patterns from neighboring shapes can create constructive or destructive interference. In the case of constructive interference, unwanted shapes may be inadvertently created. In the case of destructive interference, desired shapes may be inadvertently removed. In either case, a particular shape is printed in a different manner than intended, possibly causing a device failure. Correction methodologies, such as optical proximity correction (OPC), attempt to predict the impact from neighboring shapes and modify the mask such that the printed shape is fabricated as desired. The quality of the light interaction prediction is declining as process geometries shrink and as the light interactions become more complex.

Reduction of integrated circuit feature size is facing an end with regard to conventional lithography, as conventional lithography equipment is no longer able to improve the ratio of wavelength ($\lambda$) to numerical aperture (NA). Therefore, the traditional design approach that allows for 1) an unconstrained topology (i.e., where layout shapes are allowed to have any two-dimensionally varying shape), and 2) open-ended design rules, does not work with low fidelity (low $k_1$) lithography. A design approach is needed which allows for making full use of the lithography capability to create the desired circuit functions.

SUMMARY

In one embodiment, a method is disclosed for defining a set of layout feature nanopatterns. The method includes identifying a layout portion of interest for a given chip level. A lithographic window of influence is defined for a given layout feature nanopattern. The lithographic window of influence is scanned over the identified layout portion of interest. The method further includes identifying each layout feature nanopattern within the lithographic window of influence as the lithographic window of influence is scanned over the identified layout portion of interest. Each identified layout feature nanopattern is added to the set of layout feature nanopatterns when not already present within the set of layout feature nanopatterns. The method also includes recording the set of layout feature nanopatterns in a digital format on a computer readable storage medium.

In one embodiment, a method is disclosed for creating a library of optimized nanopatterns. The method includes defining a set of layout feature nanopatterns. A given layout feature nanopattern is defined by relative placements of a particular type of layout feature within a lithographic window of influence. The method also includes defining a design space as a set of layout parameters and corresponding value ranges that affect manufacturability of a layout. Layouts for the set of nanopatterns are then created such that the layouts cover the design space. The method further includes optimizing the layouts for the set of nanopatterns. The optimized layouts for the set of nanopatterns are recorded in a digital format on a computer readable storage medium.

In one embodiment, a method is disclosed for performing nanopattern co-optimization. A set of nanopattern layouts is obtained for a chip level. Stepper settings are adjusted. Optical proximity correction is performed on each nanopattern layout in the set of nanopattern layouts. An as-fabricated aerial image of each nanopattern layout is simulated across a process window. A simulated as-fabricated aerial image of each nanopattern layout is compared to its corresponding as-drawn nanopattern layout to determine whether or not a resulting optical pattern error satisfies an acceptance criteria. If the resulting optical pattern error satisfies the acceptance criteria, then a contour for the simulated as-fabricated aerial image of each nanopattern layout is calculated. A determination is made as to whether or not the calculated contour for the simulated as-fabricated aerial image of each nanopattern layout satisfies a contour acceptance criteria. If the calculated contour for the simulated as-fabricated aerial image of each nanopattern layout satisfies the contour acceptance criteria, then the adjusted stepper settings and optical proximity corrections for each nanopattern layout in the set of nanopattern layouts are recorded in a digital format on a computer readable storage medium.

In one embodiment, a method is disclosed for evaluating a nanopattern design space. The method includes an operation for defining a design space for a number of chip levels. Each of the number of chip levels is characterized by a corresponding set of nanopattern layouts the method also includes performing chip level-by-chip level nanopattern layout co-optimization across the design space for the number of chip levels. The method also includes identifying a passing region in the design space for the set of nanopattern layouts for each of the number of chip levels. Final design points in the design space are selected from the passing region for each of the number of chip levels. The method further includes defining a circuit layout using the sets of nanopattern layouts at the selected final design points for the number of chip levels. The defined circuit layout is recorded in a digital format on a computer readable storage medium.

Other aspects and advantages of the invention will become more apparent from the following detailed description, taken in conjunction with the accompanying drawings, illustrating by way of example the present invention.

BRIEF DESCRIPTION OF THE DRAWINGS

FIGS. 4K-1 and 4K-2 show a library of hole nanopatterns, in accordance with one embodiment of the present invention;

FIG. 11A shows an exemplary set of results generated by performing the method of FIG. 10 on a set of nanopatterns for a given chip level for each of a number of points in design space, in accordance with one embodiment of the present invention;

FIG. 11B shows the design space table of FIG. 11A for the same chip level and set of nanopatterns, but based on different process settings, in accordance with one embodiment of the present invention;

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

A method of chip design presented herein uses a small number of nanopatterns to implement circuit functions. More specifically, a small number of nanopatterns drawn using the Dynamic Array Architecture, as described further below, can be used to implement circuit functions such as Boolean logic, memory cells, memory peripheries, analog, and input/output, among others. These nanopatterns are co-optimized with photolithography, mask making, and semiconductor fabrication processes to give an optimized trade-off between pattern fidelity, pattern density, and compatibility between chip layers. For example, these nanopatterns can be co-optimized with regard to PCT (process compensation techniques) such as OPC (optical proximity correction), EPC (etch proximity correction), FPC (fill pattern correction), RPPC (removal-process pattern correction, such as etch or CMP), or a combination thereof, among others.

Figure 1:
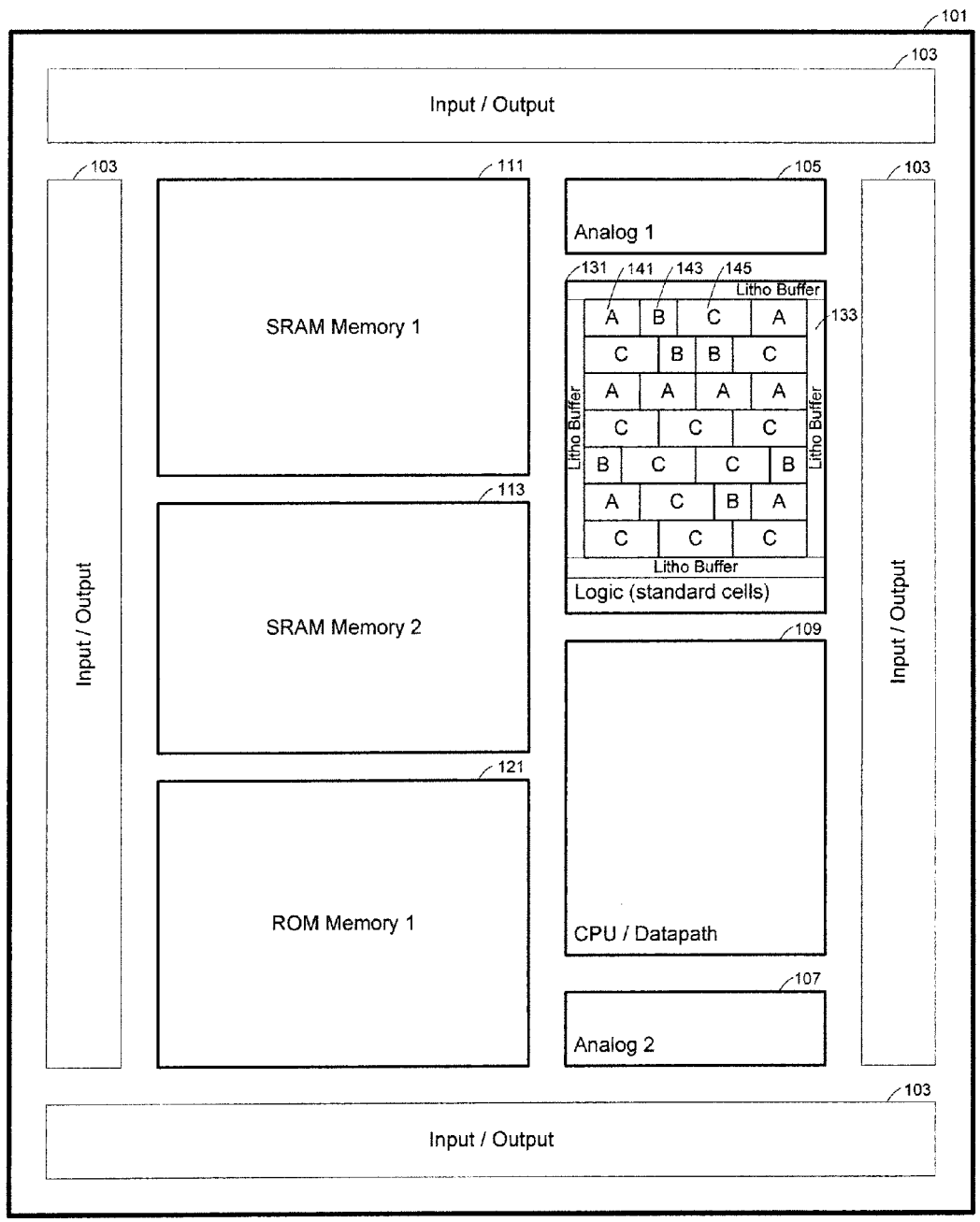
FIG. 1 shows an exemplary plan view of a system-on-chip integrated circuit including several different functional blocks, in accordance with one embodiment of the present invention.

FIG. 1 shows an exemplary plan view of a system-on-chip (SOC) 101 integrated circuit including several different functional blocks, in accordance with one embodiment of the present invention. The SOC 101 includes a number of input/output blocks 103, SRAM memories 111 and 113, a ROM memory 121, analog blocks 105 and 107, CPU/datapath block 109, and a logic block 131. In one embodiment, the logic block 131 is defined as an arrangement of standard cells A 141, B 143, C 145, surrounded by a litho buffer 133. It should be understood that the SOC 101 of FIG. 1 represents an exemplary context within which the principles of the present invention may be utilized, and in no way whatsoever represents a restriction or limitation on the context in which the principles of the present invention may be utilized. Moreover, it should be understood that the present invention as disclosed herein can be practiced in conjunction with any type of circuit layout that utilizes a regular architecture, such as the Dynamic Array Architecture.

In one embodiment, each of standard cells A 141, B 143, C 145 (i.e., cells) represents an abstraction of a logic function, and encapsulates lower-level integrated circuit layouts for implementing the logic function. It should be understood that a given logic function can be represented by multiple cell variations, wherein the cell variations may be differentiated by feature size, performance, and process compensation technique (PCT) processing. For example, multiple cell variations for a given logic function may be differentiated by power consumption, signal timing, current leakage, chip area, OPC (Optical Proximity Correction), RET (Reticle Enhancement Technology), etc. It should also be understood that each cell description includes the layouts for the cell in each level of a chip, as required to implement the logic function of the cell. More specifically, a cell description includes layouts for the cell in each level of the chip extending from the substrate level up through a particular interconnect level that is necessary to implement the functionality of the cell. Different cells may include layouts for different chip levels.

In one embodiment, one or more of cells A 141, B 143, C 145 is defined in accordance with the Dynamic Array Architecture. A layout for a given chip level of a cell defined in accordance with the Dynamic Array Architecture may include a number of linear-shaped layout features placed in a parallel orientation with respect to each other. Linear-shaped layout features that are adjacently placed on a common line of extent across the chip level have respective ends that face each other and that are separated from each other by a line-end-spacing (LES). The LES is defined by a distance extending perpendicularly between the facing ends of the linear-shaped layout features that are placed on the common line of extent across the chip level.

Figure 2A:
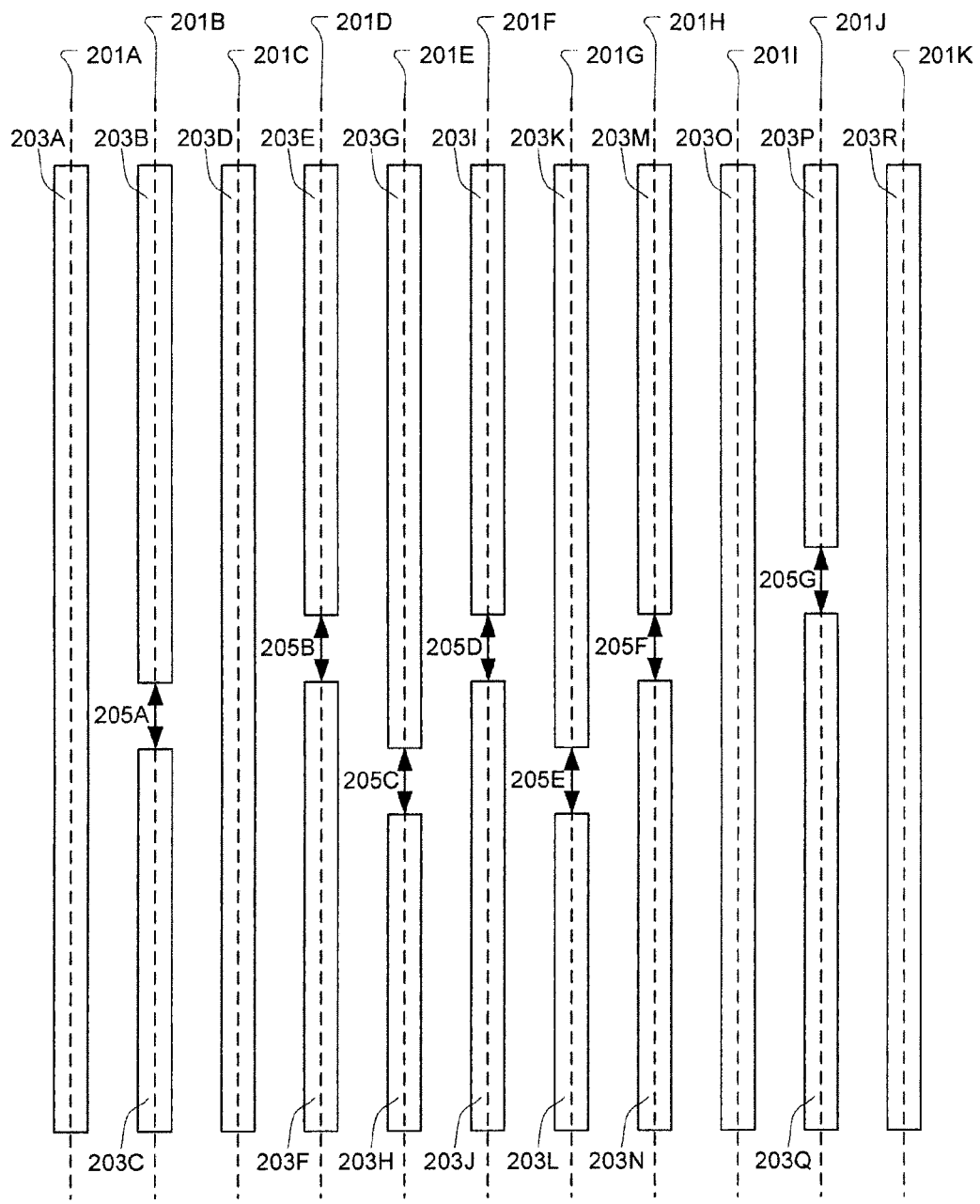
FIG. 2A is an illustration showing a portion of an exemplary layout for a given chip level of a cell defined in accordance with the Dynamic Array Architecture, in accordance with one embodiment of the present invention.

FIG. 2A is an illustration showing a portion of an exemplary layout for a given chip level of a cell defined in accordance with the Dynamic Array Architecture, in accordance with one embodiment of the present invention. A number of linear-shaped layout features 203A-203R are placed in a parallel orientation with respect to each other. Also, each of the linear-shaped layout features 203A-203R are placed in accordance with one of a number of parallel virtual lines 201A-201K that define a virtual grate. Thus, the virtual line upon which a given linear-shaped layout feature is placed represents the line of extent of the given linear-shaped layout feature. Linear-shaped layout features 203I and 203J are adjacently placed on a common line of extent (virtual line 201F) and have respective ends that face each other and that are separated from each other by LES 205D. Similarly, linear-shaped layout feature pairs 203B/203C, 203E/203F, 203G/203H, 203K/203L, 203M/203N, 203P/203Q are each adjacently placed on a respective common line of extent (virtual lines 201B, 201D, 201E, 201G, 201H, 201J, respectively) and have ends that face each other and that are separated from each other by LES 205A, 205B, 205C, 205E, 205F, 205G, respectively.

Figure 2B:
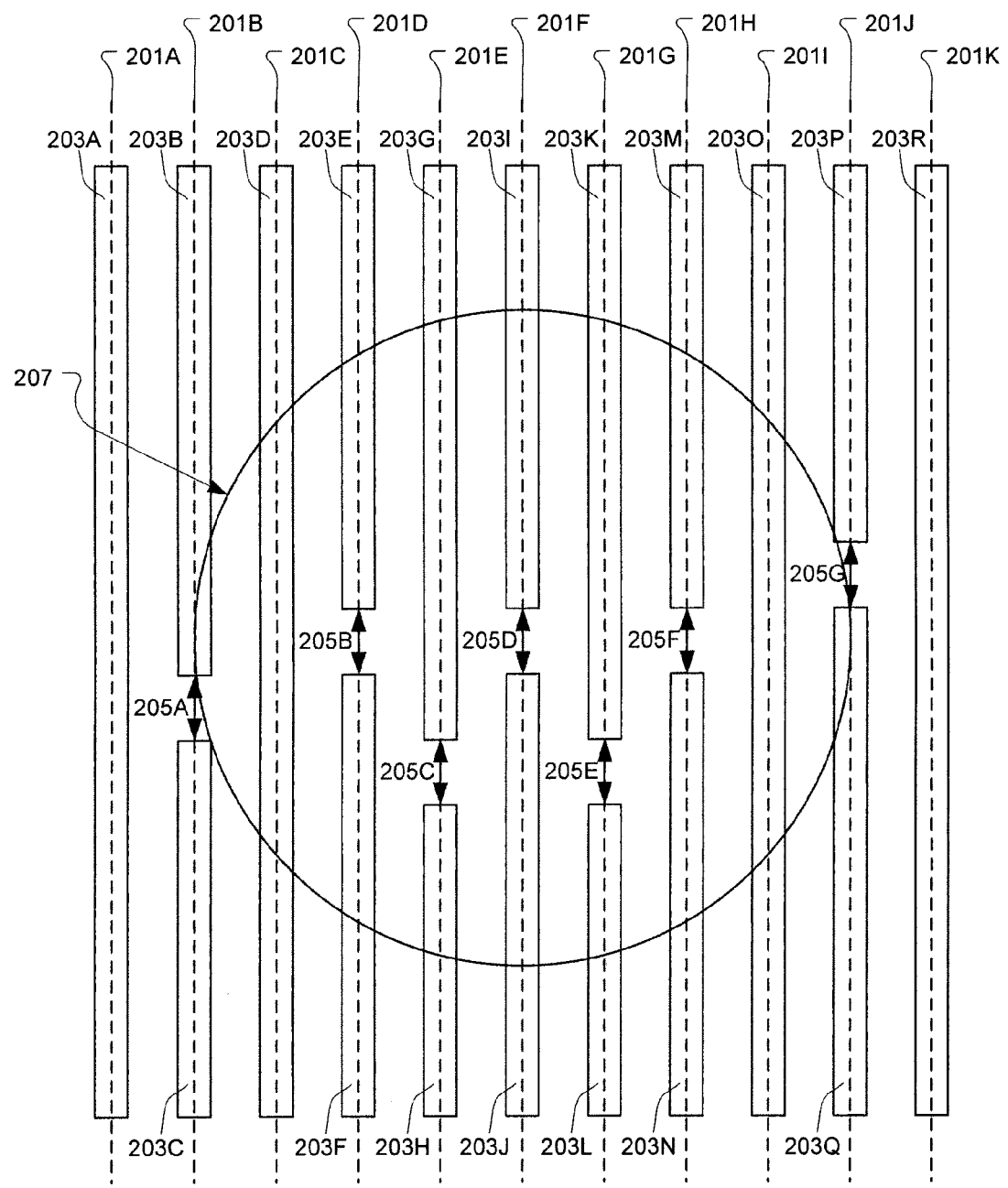
FIG. 2B shows the exemplary layout of FIG. 2A with a window of lithographic influence identified thereover, in accordance with one embodiment of the present invention.

Within a layout defined in accordance with a regular architecture, such as the Dynamic Array Architecture, a unique LES arrangement within a window of lithographic influence represents an LES nanopattern. For example, FIG. 2B shows the exemplary layout of FIG. 2A with a window of lithographic influence 207 identified thereover, in accordance with one embodiment of the present invention. A window of lithographic influence is also referred to as a litho window. Therefore, the window of lithographic influence 207 is also referred to as the litho window 207. The litho window 207 corresponds to LES 205D, and is therefore centered about LES 205D. Generally speaking, a litho window represents a layout area within which lithographic activity can potentially influence lithographic resolution of a layout shape positioned substantially near the center of the litho window. More specifically, light waves used to lithographically pattern layout shapes within the litho window can potentially interact with light waves used to lithographically pattern a layout shape positioned near the center of the litho window. Therefore, lithographic optimization of a given layout shape may need to consider lithographic influences from other layout shapes within the litho window defined about the given layout shape.

A size and shape of the litho window is dependent at least in part upon the lithographic process settings, including the wavelength of the light source used and the numerical aperture of the lens system, among other parameters. In one embodiment, the litho window is considered to have a circular shape defined by a radius of lithographic influence. In one embodiment the radius of lithographic influence is set at two to three times the wavelength of the light source used in the lithography process. However, it should be understood that the radius of lithographic influence can be set at essentially any suitable value. For example, FIG. 2B shows a circular-shaped litho window 207. It should be understood that a litho window can be defined about a particular layout shape (such as a layout shape corresponding to a physical structure, e.g., contact) and/or about a particular layout feature (such as a spacing between layout shapes, e.g., LES).

A litho window corresponding to a particular LES may have its extent from the particular LES in a given direction truncated by an interposed layout shape, where the interposed layout shape acts as a lithographic break. For example, FIG.

2C shows the layout of FIG. 2B with a truncated litho window 207A. The truncated litho window 207A represents the litho window as shown in FIG. 2B having its extent from the LES 205D in a given direction truncated by an interposed layout shape, such as layout shapes 203G and 203K.

Figure 2C:
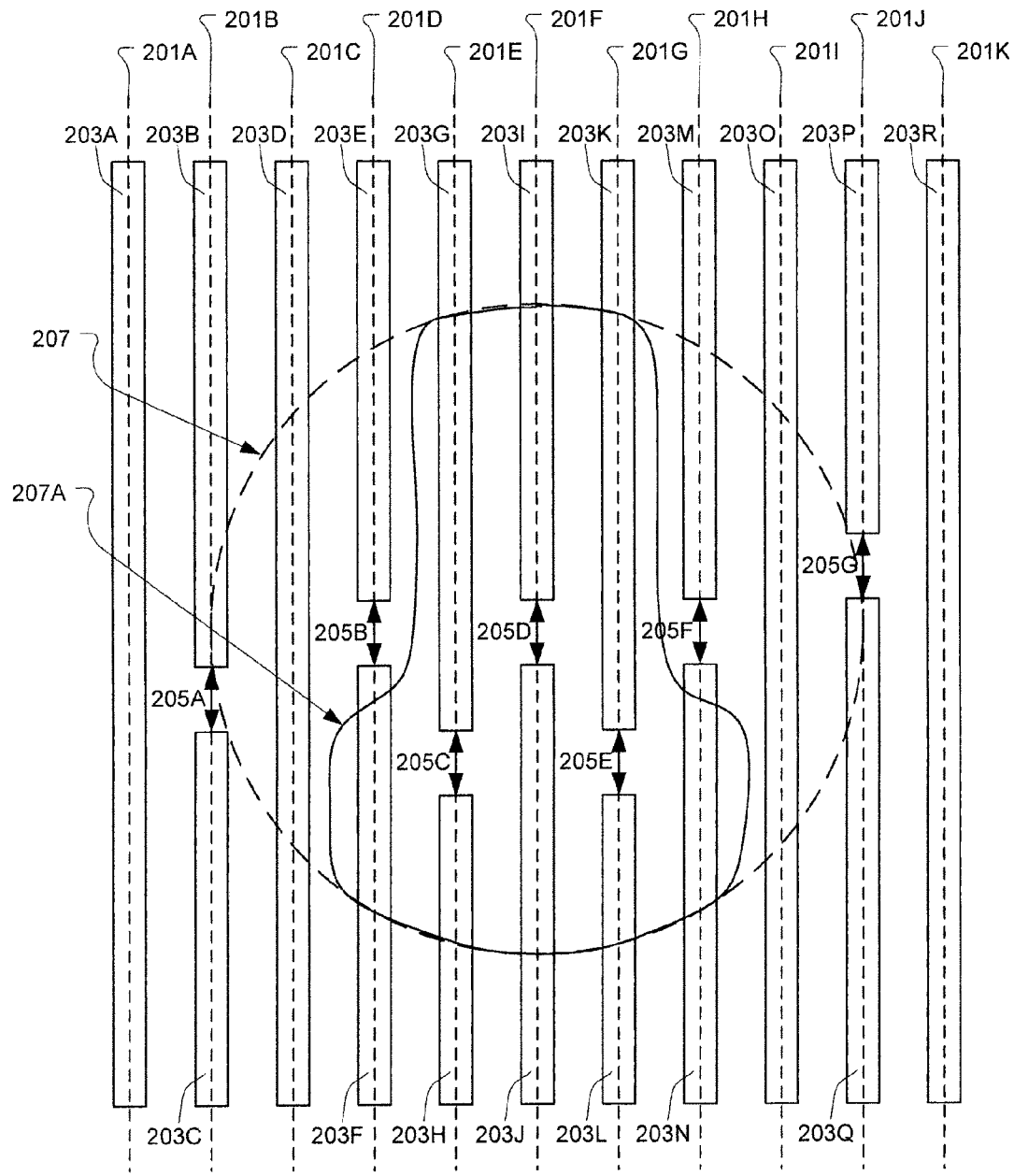
FIG. 2C shows the layout of FIG. 2B with a truncated litho window, in accordance with one embodiment of the present invention.

A pattern of LES features within a given litho window represents an LES nanopattern, where the LES nanopattern is defined by the number and relative placements of the LES features within the litho window. It should be understood that in different embodiments, the litho window may refer to a full-size litho window (such as shown in FIG. 2B) or a truncated litho window (such as shown in FIG. 2C). Placement of a litho window around each LES within a layout will define a corresponding LES nanopattern. It should be understood that if no other LES features are located within the litho window defined about a given LES, the given LES itself defines the corresponding LES nanopattern. By considering an LES content within a litho window when placed about each LES in a layout, it is possible to identify each unique LES nanopattern that occurs within the extent of the litho window within the layout. Therefore, it is possible to define a finite set of LES nanopatterns that occur within a given layout. Once the finite set of LES nanopatterns are defined for a given layout, it is possible to optimize the layout and/or manufacturing process with respect to each unique LES nanopattern, thereby enabling generation of a layout that is pre-optimized for manufacturability.

Figure 3A:
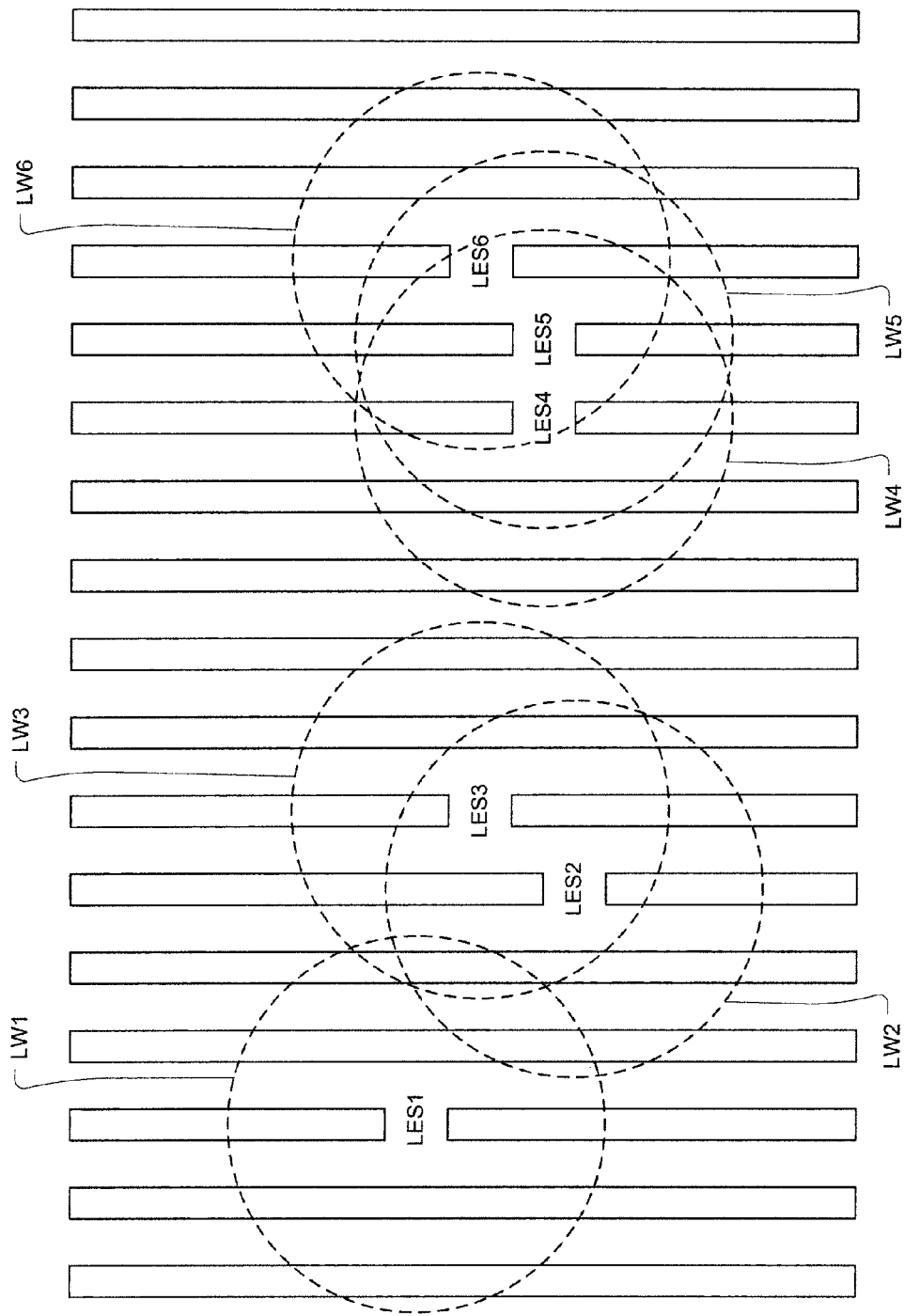
FIG. 3A shows an exemplary layout including a number of LES features LES1-LES6, each defined between a respective pair of linear-shaped layout features that are adjacently placed on a common line of extent across the chip level, in accordance with one embodiment of the present invention.
Figure 3D:
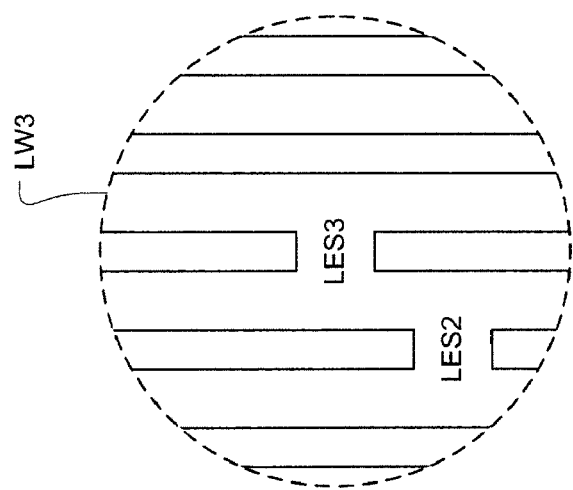
FIGS. 3B-3G respectively show each of LES1-LES6 and a content of its corresponding litho window LW1-LW6, in accordance with one embodiment of the present invention.
Figure 3C:
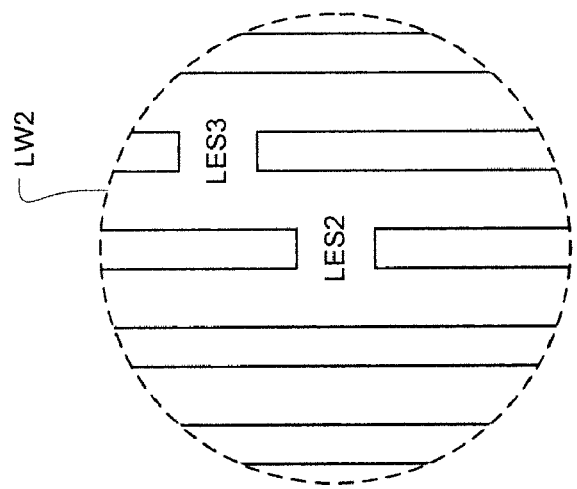
Figure 3B:
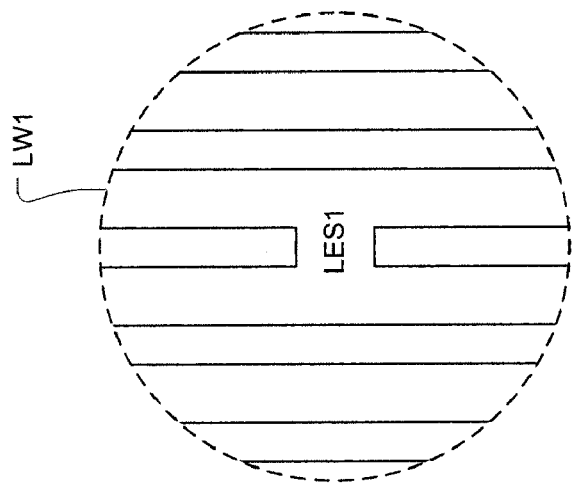
Figure 3G:
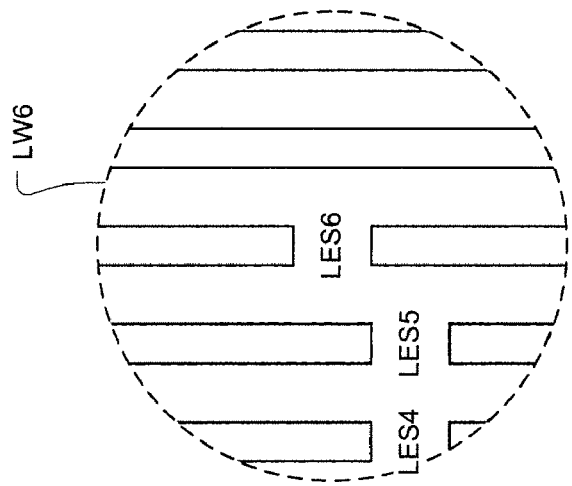
Figure 3F:
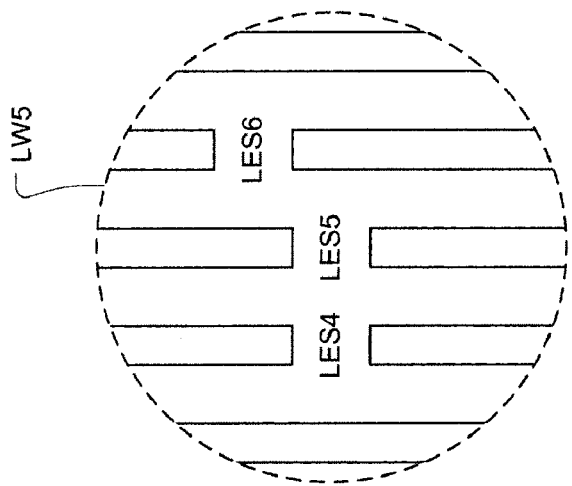
Figure 3E:
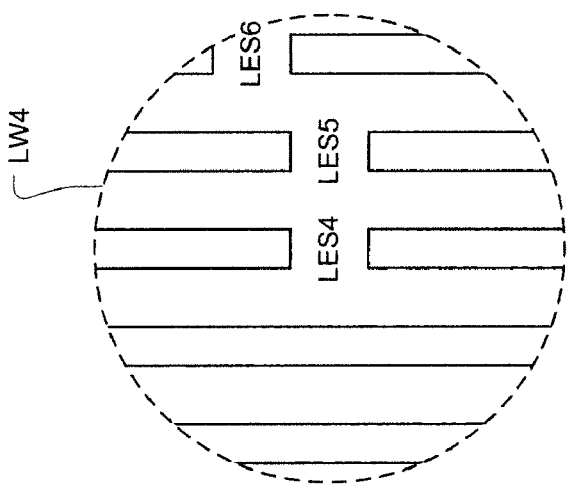

FIG. 3A shows an exemplary layout including a number of LES features LES1-LES6, each defined between a respective pair of linear-shaped layout features that are adjacently placed on a common line of extent across the chip level. FIG. 3A also shows litho windows LW1-LW6 corresponding to the LES features LES1-LES6, respectively. Each of litho windows LW1-LW6 is substantially centered about its corresponding layout feature LES1-LES6, respectively. The litho windows LW1-LW6 are sized in accordance with the lithographic and manufacturing process settings. It should be appreciated that the litho windows LES1-LES6 of FIG. 3A, and their sizes relative to the displayed layout shapes and LES features, are provided as examples to facilitate description, and should not be construed in any way to represent a limitation or preference with regard to litho window size relative to layout shapes and LES features.

Figure 3J:
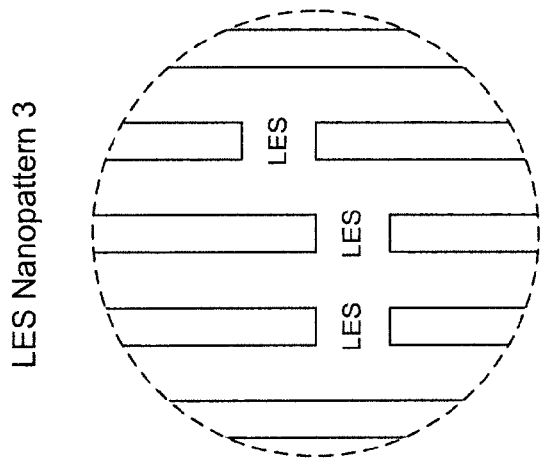
FIG. 3J shows LES Nanopattern 3 which appears in litho windows LW4, LW5, and LW6, in accordance with one embodiment of the present invention.
Figure 3I:
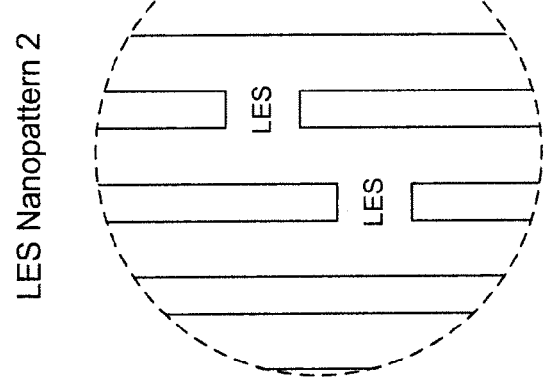
FIG. 3I shows LES Nanopattern 2 which appears in litho windows LW2 and LW3, in accordance with one embodiment of the present invention.
Figure 3H:
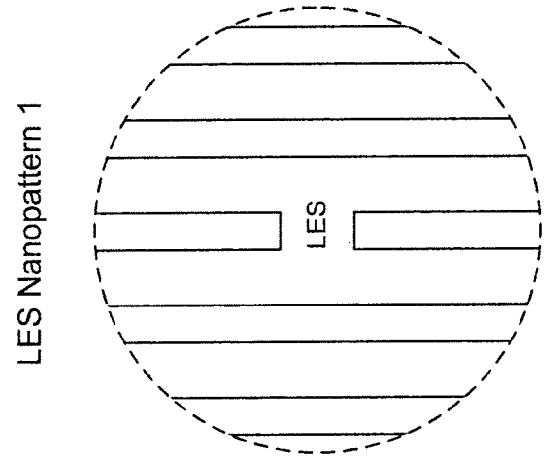
FIG. 3H shows LES Nanopattern 1 which appears in litho window LW1, in accordance with one embodiment of the present invention.

FIGS. 3B-3G respectively show each of LES1-LES6 and a content of its corresponding litho window LW1-LW6. The number of LES features and their relative placements with respect to each other in the each of the litho windows LW1-LW6 represents an LES nanopattern. A given LES nanopattern may occur any number of times in a layout. Each unique LES nanopattern that occurs within a given layout can be identified and stored in an LES nanopattern library. Litho window LW1 about LES1 includes a unique LES nanopattern (LES Nanopattern 1) as shown in FIG. 3H. The identified LES Nanopattern 1 of FIG. 3H may be stored in an LES nanopattern library. Litho window LW2 about LES2 includes a unique LES nanopattern (LES Nanopattern 2) as shown in FIG. 3I. The identified LES Nanopattern 2 of FIG. 3I may also be stored in the LES nanopattern library. Litho window LW3 about LES3 includes LES Nanopattern 2 of FIG. 3I, which is already stored in the LES nanopattern library. Litho window LW4 about LES4 includes a unique LES nanopattern (LES Nanopattern 3) as shown in FIG. 3J. The identified LES Nanopattern 3 of FIG. 3J may also be stored in the LES nanopattern library. Both of litho windows LW5 and LW6 about LES5 and LES6, respectively, include LES Nanopattern 3 of FIG. 3J, which is already stored in the LES nanopattern library.

It should be understood that an LES nanopattern is not restricted by linear layout shape pitch, linear layout shape width, or LES size. Also, an LES nanopattern can be represented "symbolically" with specific dimensional characteristics of the layout (linear layout shape pitch, linear layout shape width, and/or LES size) addressed in a design space evaluation of the symbolic LES nanopattern. As previously mentioned with regard to FIG. 2C, in one embodiment, a solid layout shape sidewardly adjacent to an LES feature may represent an LES nanopattern boundary, as the lithographic influence of neighboring shapes on a given LES feature may be substantially blocked by a solid layout shape. In this embodiment, a nanopattern can be identified by examining an LES pattern within a litho window that is truncated by a solid layout shape in the direction perpendicular to the routing direction on one or both sides of the litho window. More specifically, the radius of the litho window can be used for identifying LES nanopattern boundaries in the routing direction. LES nanopattern boundaries perpendicular to the routing direction can be identified by either the radius of the litho window or by the presence of a solid layout shape sidewardly adjacent to LES features about which the litho window is centered.

In a manner similar to that described above for LES nanopatterns, hole nanopatterns can be identified for contact and/or via layouts. More specifically, placement of a litho window around each contact/via within a layout will define a corresponding hole nanopattern. It should be understood that if no other contact/via features are located within the litho window defined about a given contact/via, the given contact/via itself defines the corresponding hole nanopattern. By considering a contact/via content within a litho window when placed about each contact/via in a layout, it is possible to identify each unique hole nanopattern that occurs within the extent of the litho window within the layout. Therefore, it is possible to define a finite set of hole nanopatterns that occur within a given layout. Once the finite set of hole nanopatterns are defined for a given layout, it is possible to optimize the layout and/or manufacturing process with respect to each unique hole nanopattern, thereby enabling generation of a layout that is pre-optimized for manufacturability.

Figure 4A:
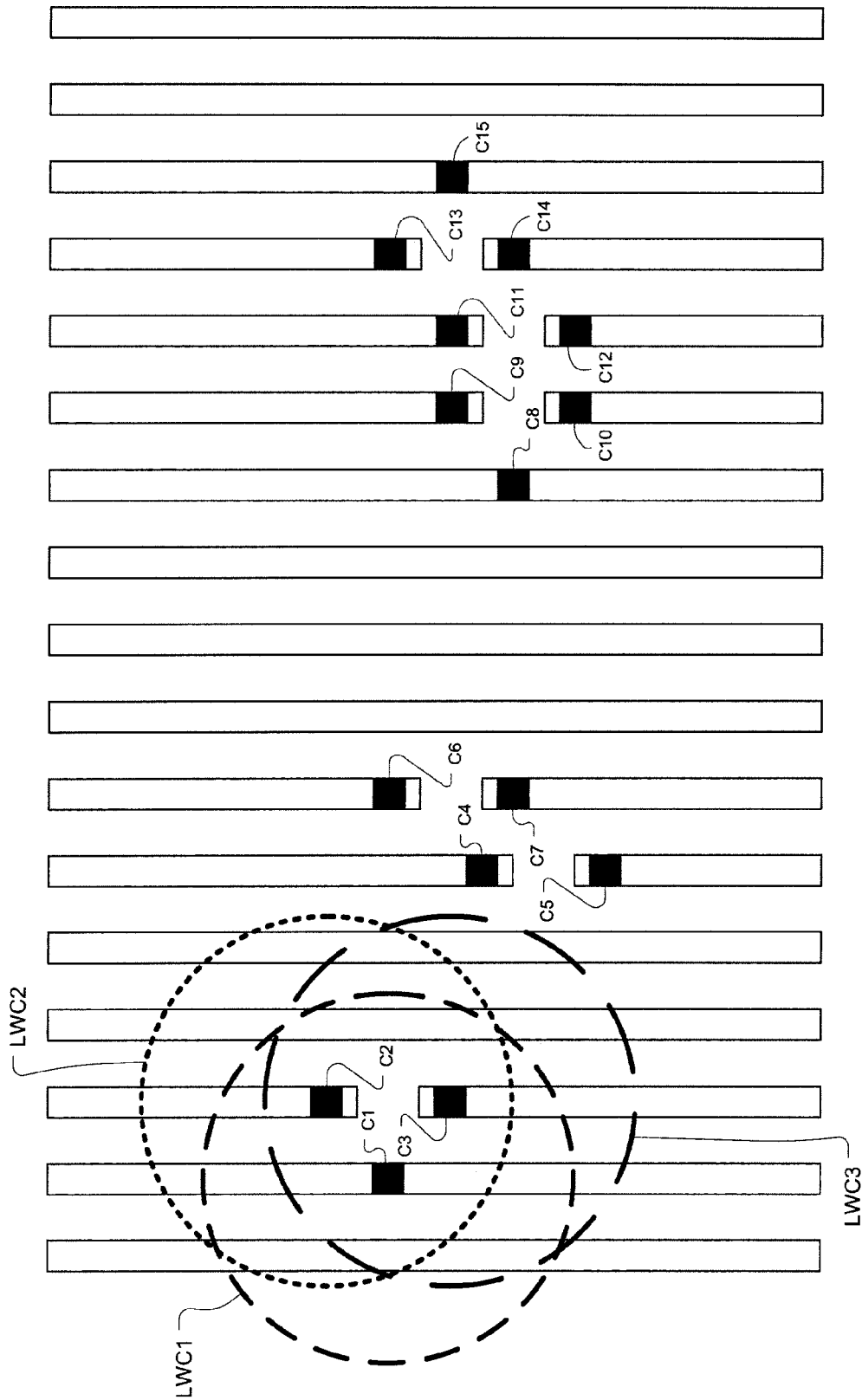
FIG. 4A shows an exemplary gate contact layout in which gate contacts C1-C15 are shown positioned over linear-shaped layout features, in accordance with one embodiment of the present invention.

FIG. 4A shows an exemplary gate contact layout in which gate contacts C1-C15 are shown positioned over linear-shaped layout features. It should be understood that the layout including the gate contacts C1-C15 does not include the linear-shaped layout features. The linear shaped layout features are patterned using a separate layout. Therefore, lithographic influences within the gate contact layout of FIG. 4A are limited to those influences caused by gate contacts C1-C15. Similar to the LES nanopattern identification process, the hole nanopatterns can be identified by placing a litho window around each hole, e.g., each gate contact C1-C15. FIG. 4A shows litho windows LWC1-LWC3 placed around gate contacts C1-C3, respectively. The hole nanopatterns defined within LWC1-LWC3 include each of the gate contacts C1-C3, and are therefore the same. The unique hole nanopattern associated with litho windows LWC1-LWC3 is shown as Hole Nanopattern 1 in a library of hole nanopatterns shown in FIG. 4K-1.

Figure 4B:
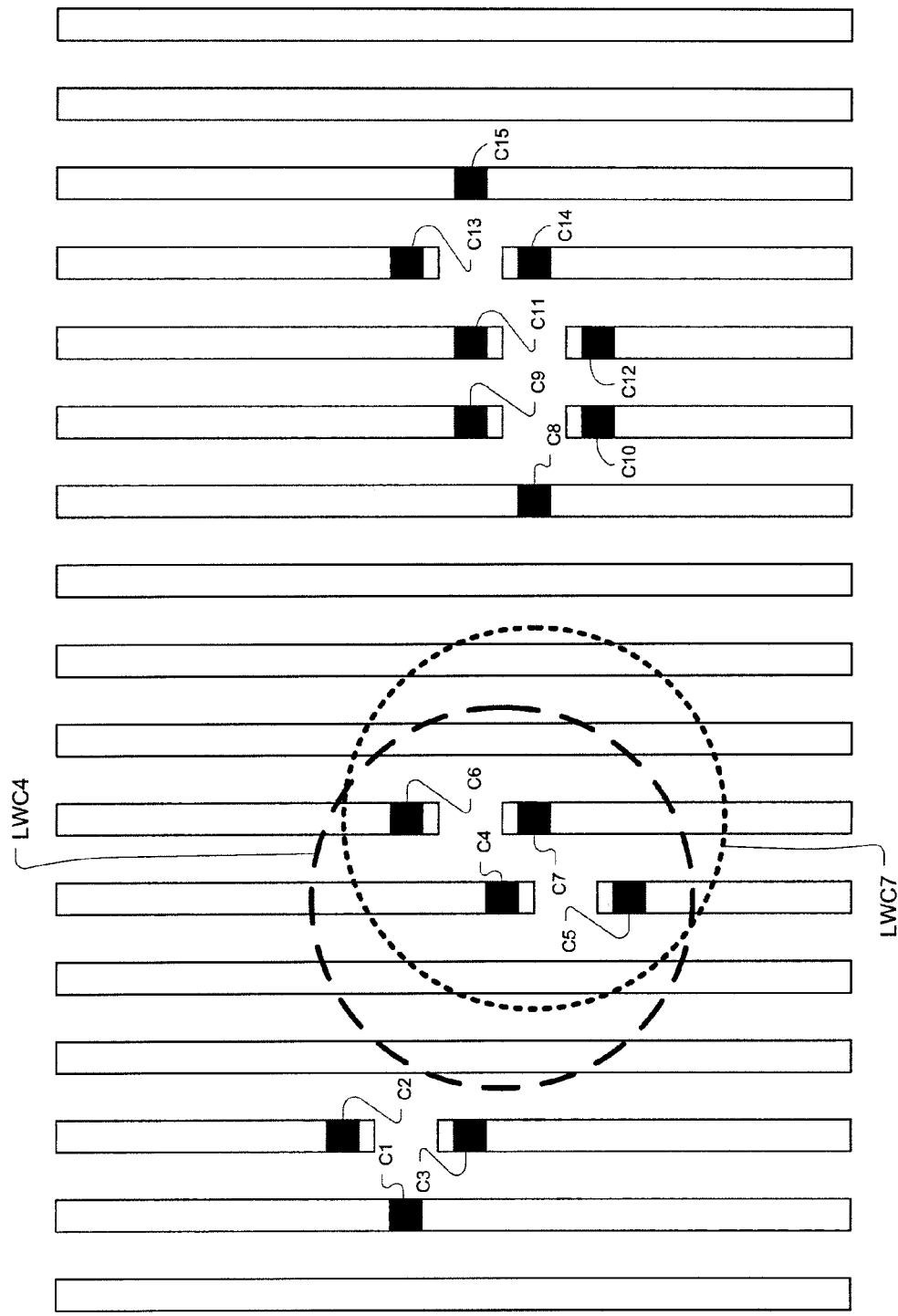
FIG. 4B shows the layout of FIG. 4A with litho windows LWC4 and LWC7 defined about gate contacts C4 and C7, respectively, in accordance with one embodiment of the present invention.

FIG. 4B shows the layout of FIG. 4A with litho windows LWC4 and LWC7 defined about gate contacts C4 and C7, respectively. The hole nanopatterns defined within LWC4 and LWC7 include each of the gate contacts C4-C7, and are therefore the same. The unique hole nanopattern associated with litho windows LWC4 and LWC7 is shown as Hole Nanopattern 2 in the library of hole nanopatterns shown in FIG. 4K-1.

Figure 4C:
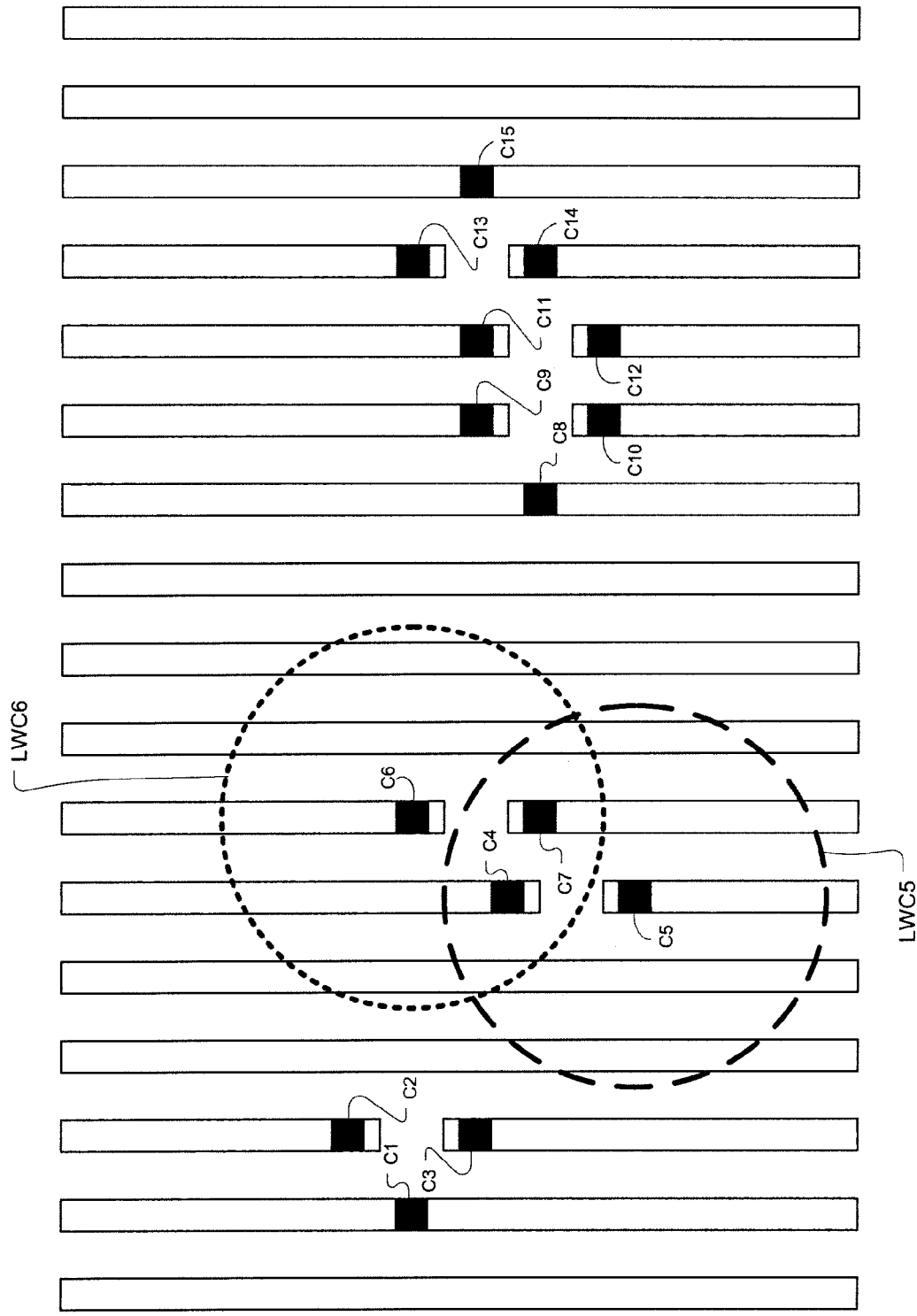
FIG. 4C shows the layout of FIG. 4A with litho windows LWC5 and LWC6 defined about gate contacts C5 and C6, respectively, in accordance with one embodiment of the present invention.

FIG. 4C shows the layout of FIG. 4A with litho windows LWC5 and LWC6 defined about gate contacts C5 and C6, respectively. The hole nanopatterns defined within LWC5 and LWC6 include different gate contacts and different gate contact positional relationships. The hole nanopattern defined within LWC5 includes gate contacts C4, C5, and C7, and represents a unique hole nanopattern identified as Hole Nanopattern 3 in the library of hole nanopatterns shown in FIG. 4K-1. The hole nanopattern defined within LWC6 includes gate contacts C4, C6, and C7, and represents a unique hole nanopattern identified as Hole Nanopattern 4 in the library of hole nanopatterns shown in FIG. 4K-1.

Figure 4D:
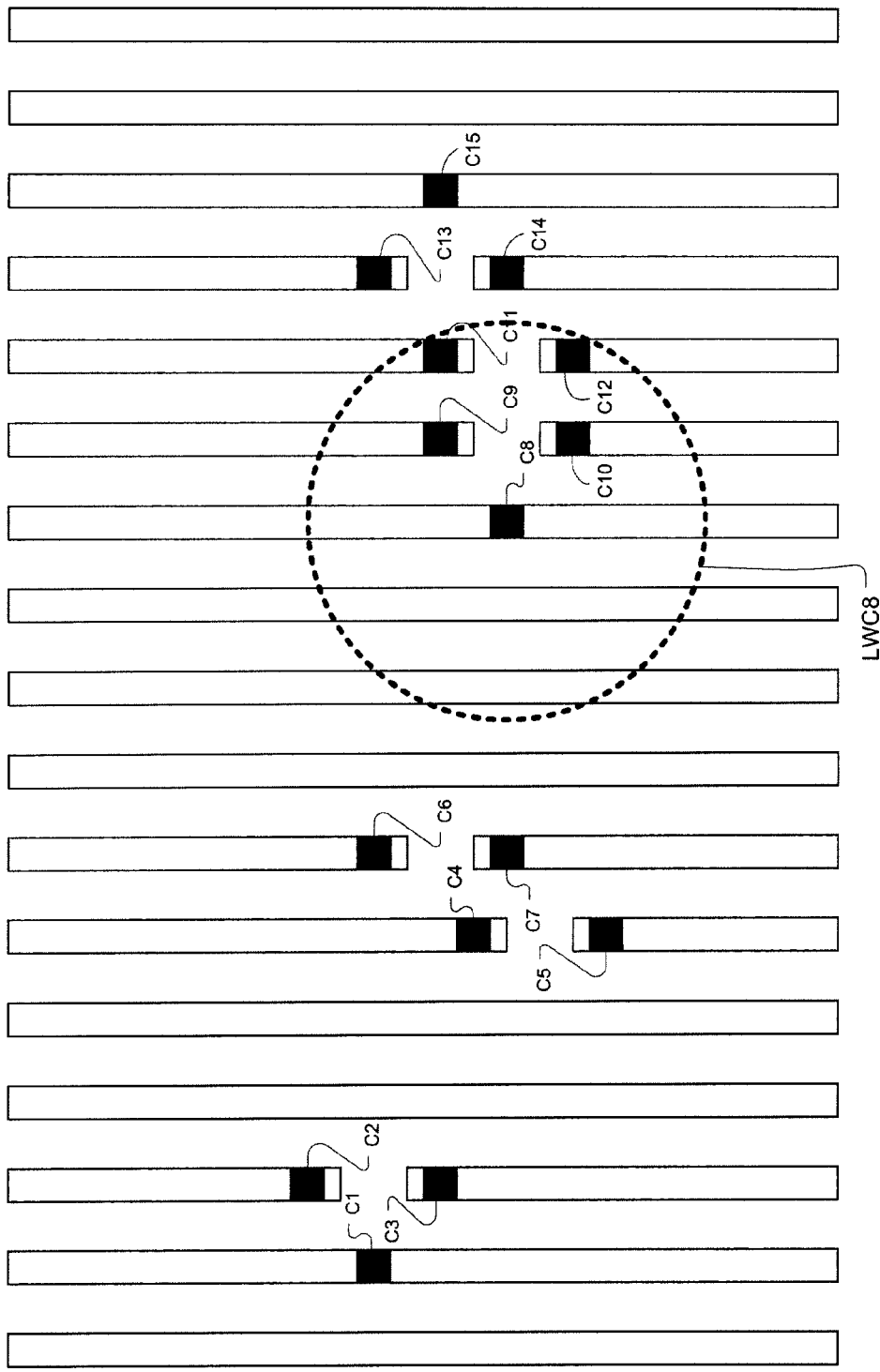
FIG. 4D shows the layout of FIG. 4A with litho window LWC8 defined about gate contacts C8, in accordance with one embodiment of the present invention.

FIG. 4D shows the layout of FIG. 4A with litho window LWC8 defined about gate contacts C8. The hole nanopattern defined within LWC8 includes gate contacts C8-C12, and represents a unique hole nanopattern identified as Hole Nanopattern 5 in the library of hole nanopatterns shown in FIG. 4K-1.

Figure 4E:
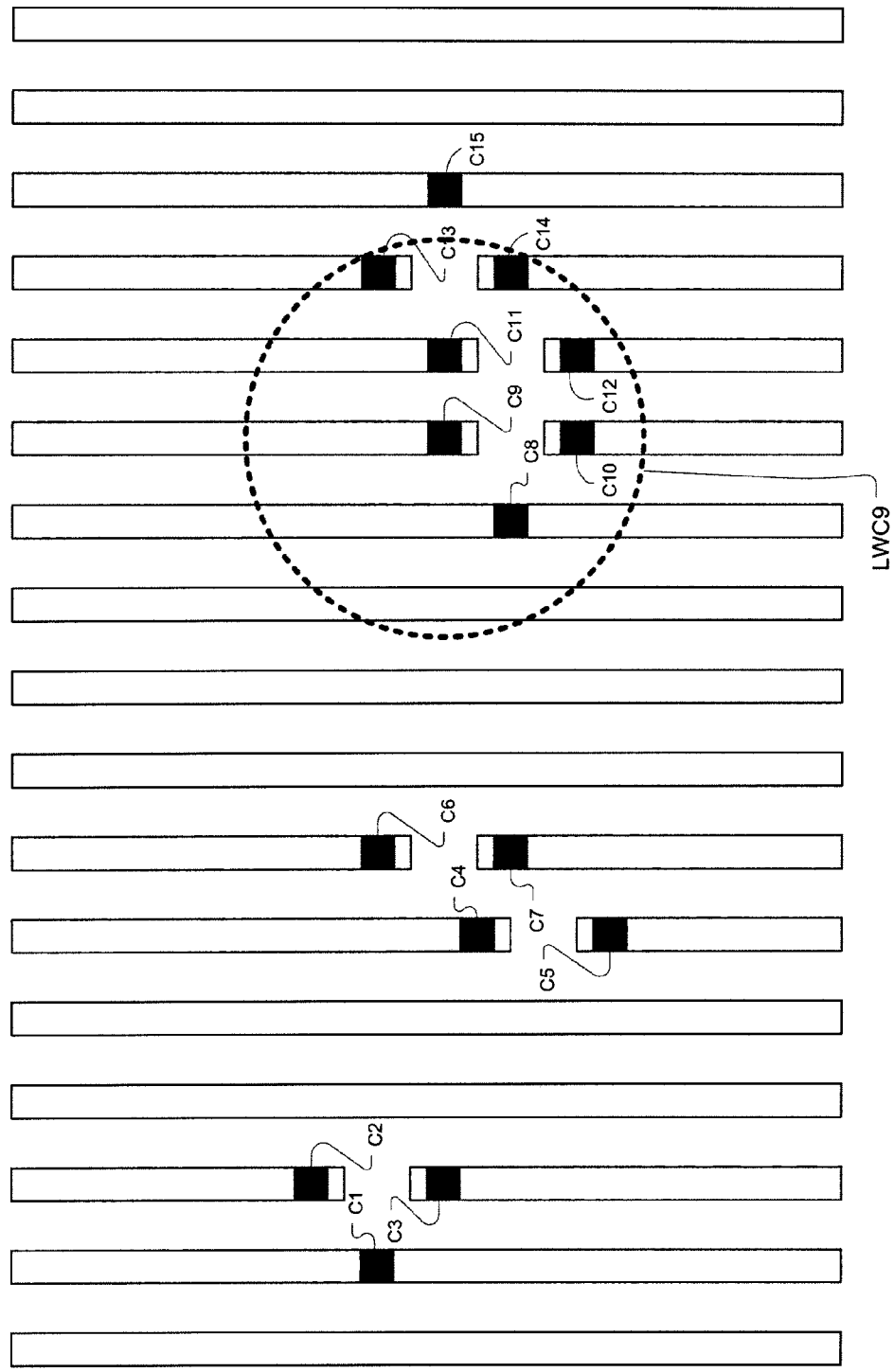
FIG. 4E shows the layout of FIG. 4A with litho window LWC9 defined about gate contacts C9, in accordance with one embodiment of the present invention.

FIG. 4E shows the layout of FIG. 4A with litho window LWC9 defined about gate contacts C9. The hole nanopattern defined within LWC9 includes gate contacts C8-C14, and represents a unique hole nanopattern identified as Hole Nanopattern 6 in the library of hole nanopatterns shown in FIG. 4K-1.

Figure 4F:
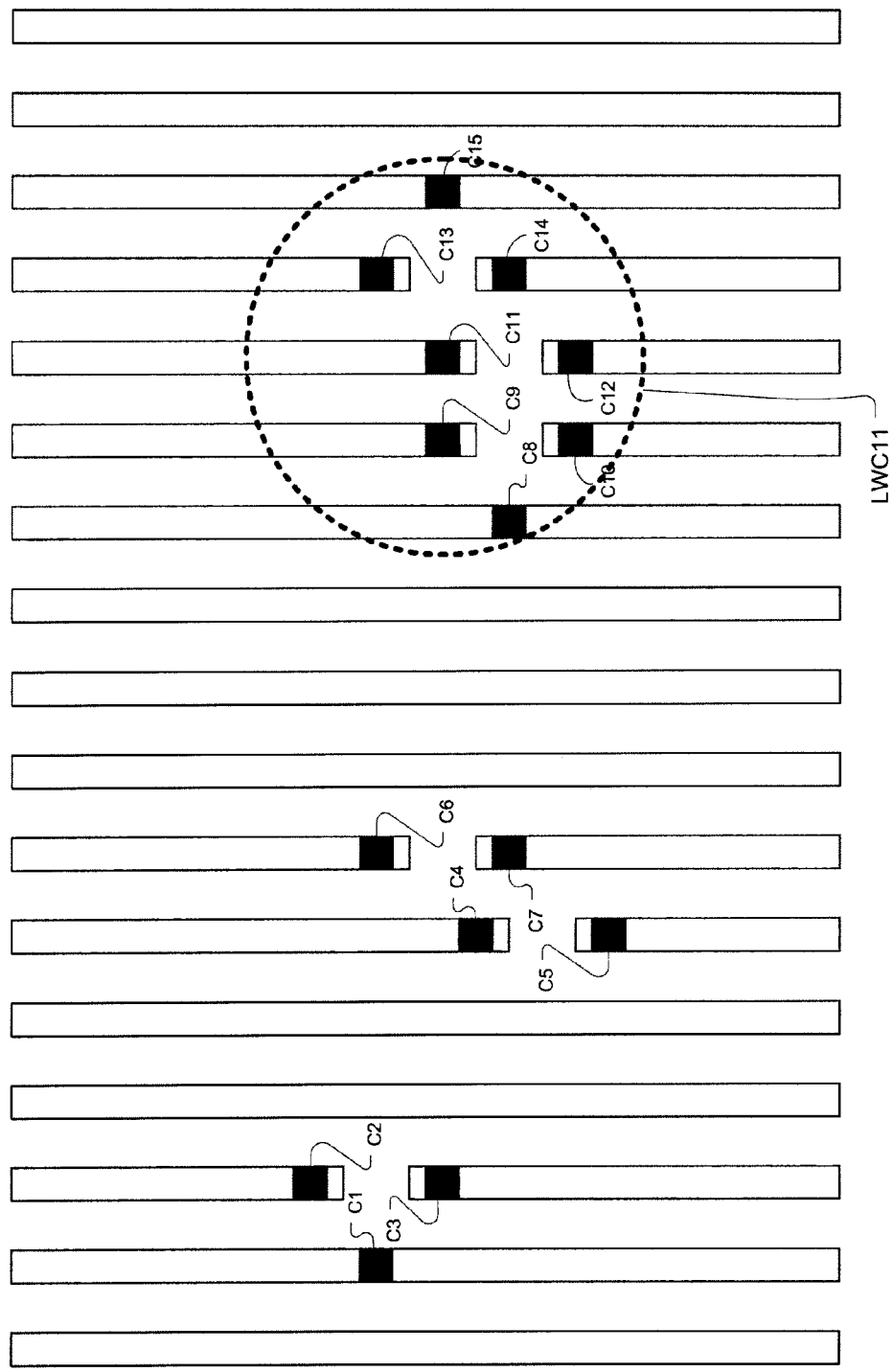
FIG. 4F shows the layout of FIG. 4A with litho window LWC11 defined about gate contacts C11, in accordance with one embodiment of the present invention.

FIG. 4F shows the layout of FIG. 4A with litho window LWC11 defined about gate contacts C11. The hole nanopattern defined within LWC11 includes gate contacts C8-C 15, and represents a unique hole nanopattern identified as Hole Nanopattern 7 in the library of hole nanopatterns shown in FIG. 4K-2.

Figure 4G:
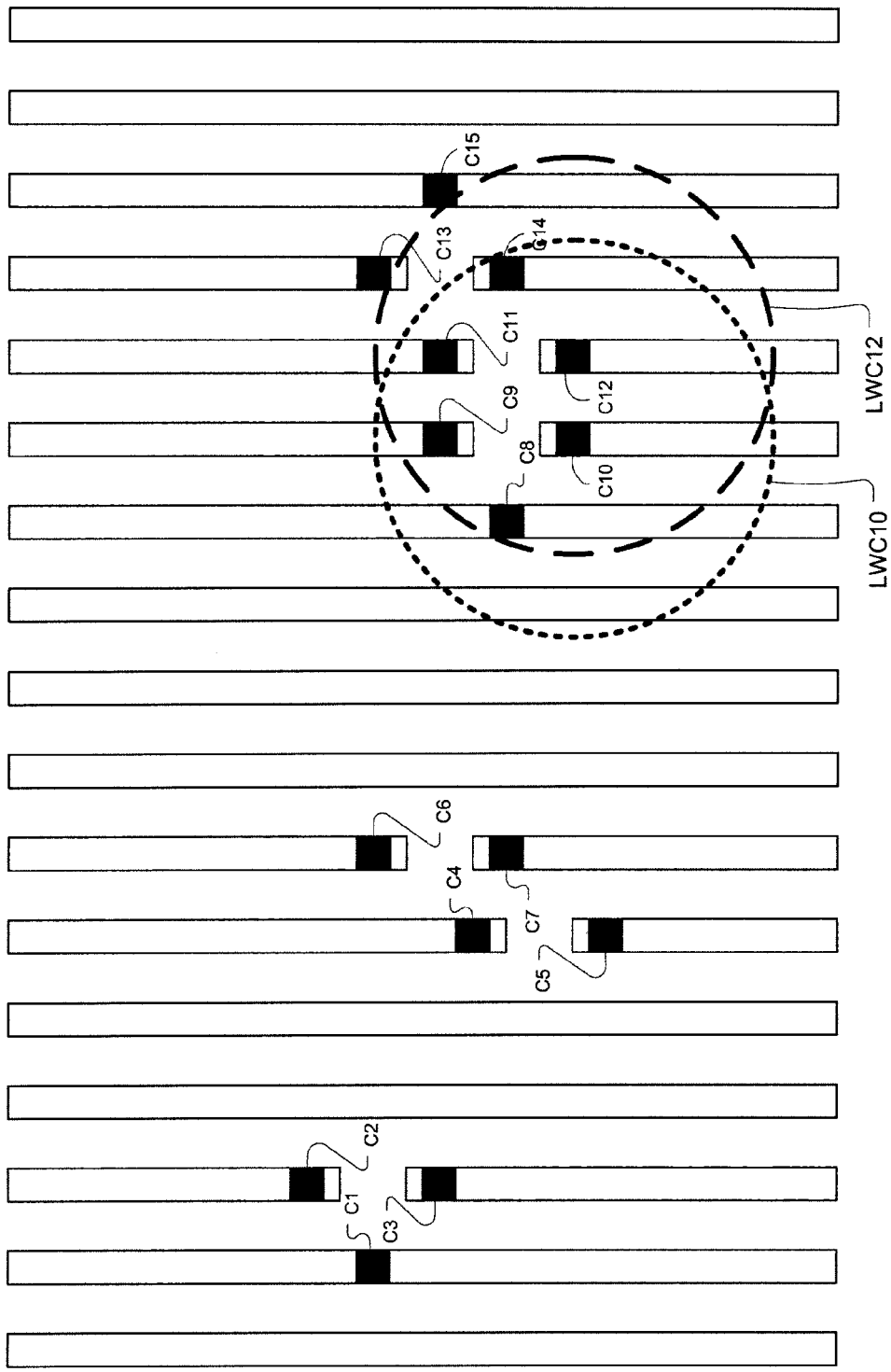
FIG. 4G shows the layout of FIG. 4A with litho windows LWC10 and LWC 12 defined about gate contacts C10 and C12, respectively, in accordance with one embodiment of the present invention.

FIG. 4G shows the layout of FIG. 4A with litho windows LWC10 and LWC 12 defined about gate contacts C10 and C12, respectively. The hole nanopatterns defined within LWC10 and LWC12 include each of the gate contacts C8-C12 and C14, and are therefore the same. The unique hole nanopattern associated with litho windows LWC10 and LWC12 is shown as Hole Nanopattern 8 in the library of hole nanopatterns shown in FIG. 4K-2.

Figure 4H:
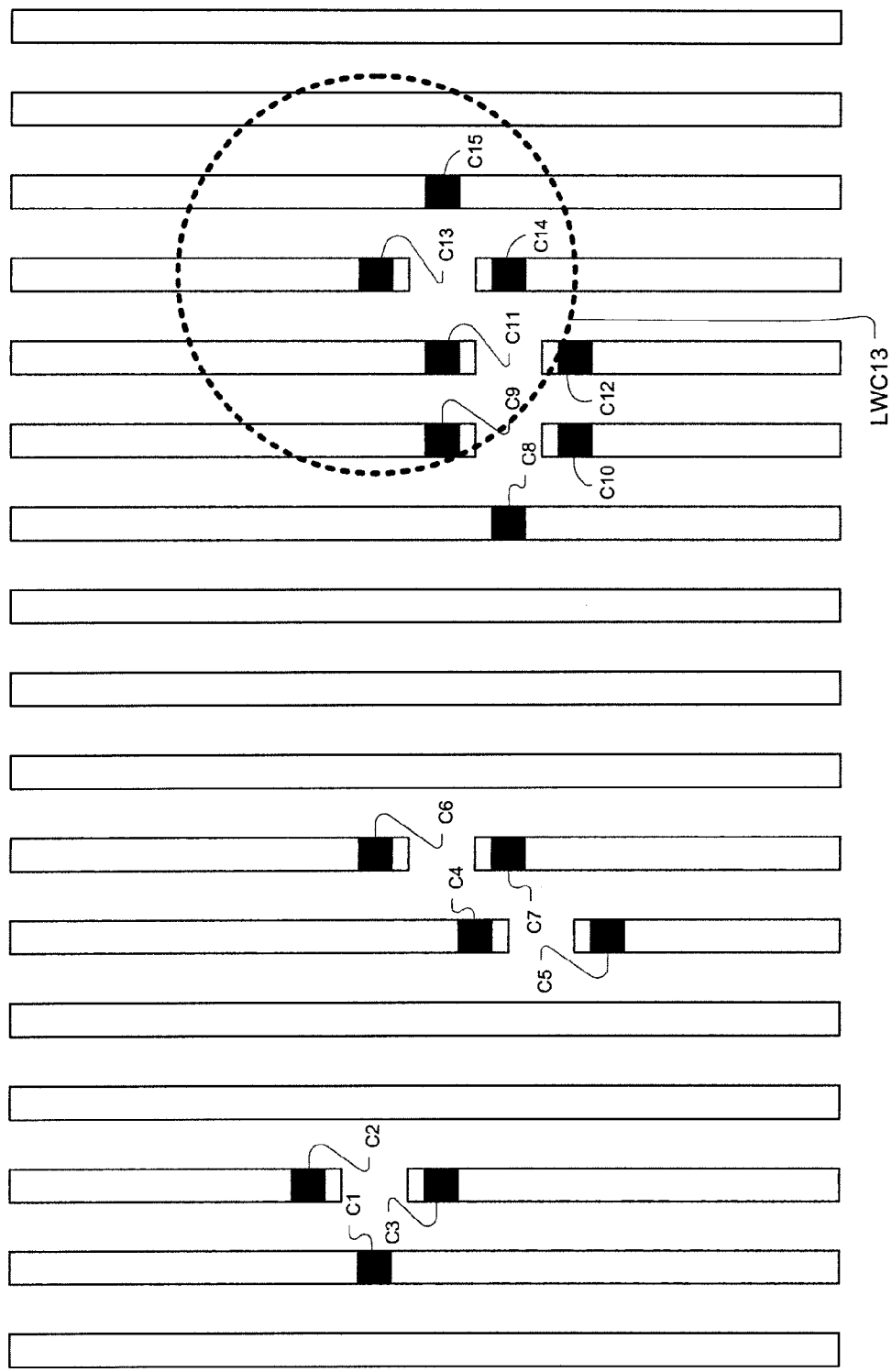
FIG. 4H shows the layout of FIG. 4A with litho window LWC13 defined about gate contacts C13, in accordance with one embodiment of the present invention.

FIG. 4H shows the layout of FIG. 4A with litho window LWC13 defined about gate contacts C13. The hole nanopattern defined within LWC13 includes gate contacts C9, C11, and C13-C15, and represents a unique hole nanopattern identified as Hole Nanopattern 9 in the library of hole nanopatterns shown in FIG. 4K-2.

Figure 4I:
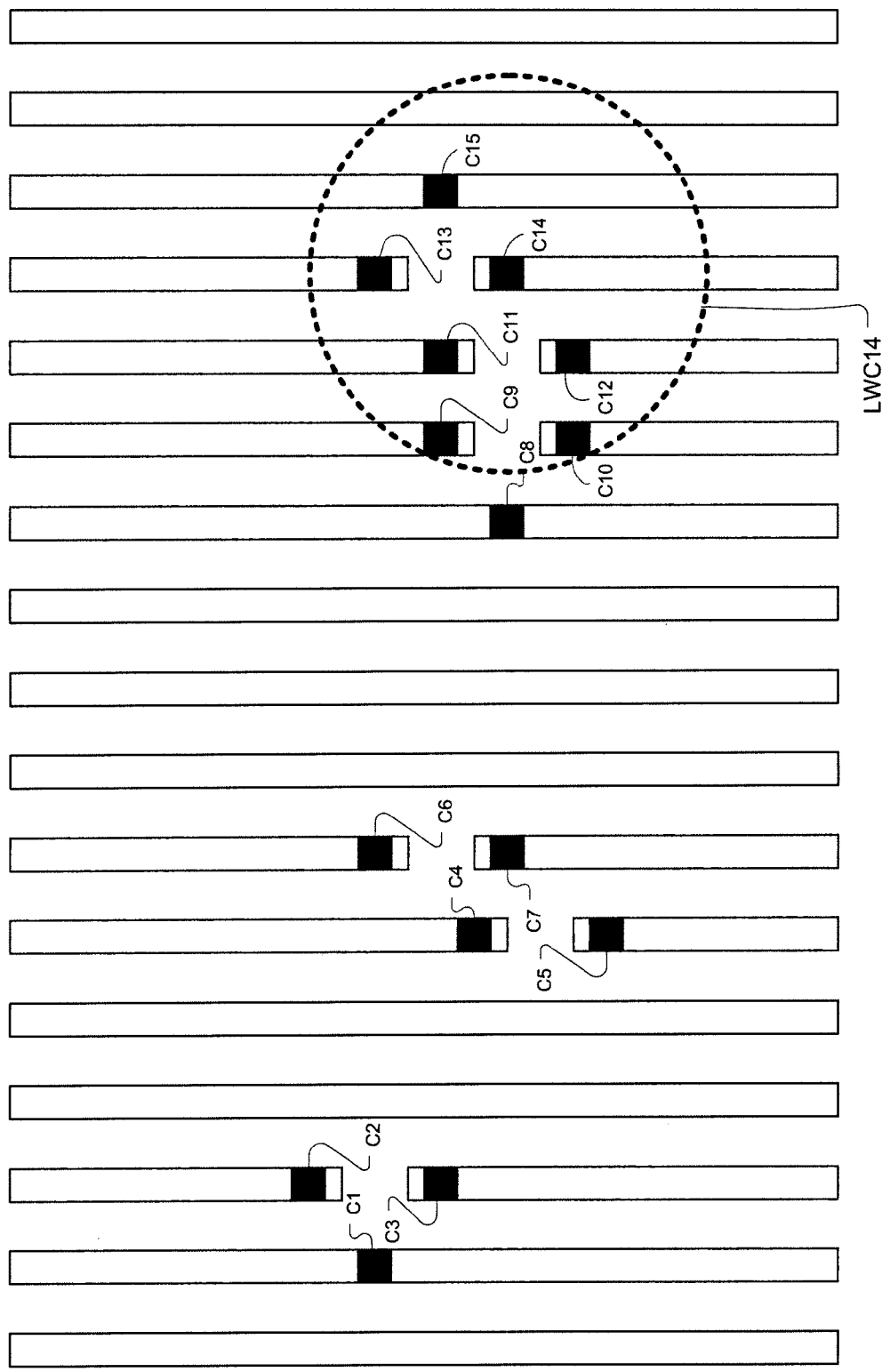
FIG. 4I shows the layout of FIG. 4A with litho window LWC14 defined about gate contacts C14, in accordance with one embodiment of the present invention.

FIG. 4I shows the layout of FIG. 4A with litho window LWC14 defined about gate contacts C14. The hole nanopattern defined within LWC14 includes gate contacts C9-C15, and represents a unique hole nanopattern identified as Hole Nanopattern 10 in the library of hole nanopatterns shown in FIG. 4K-2.

Figure 4J:
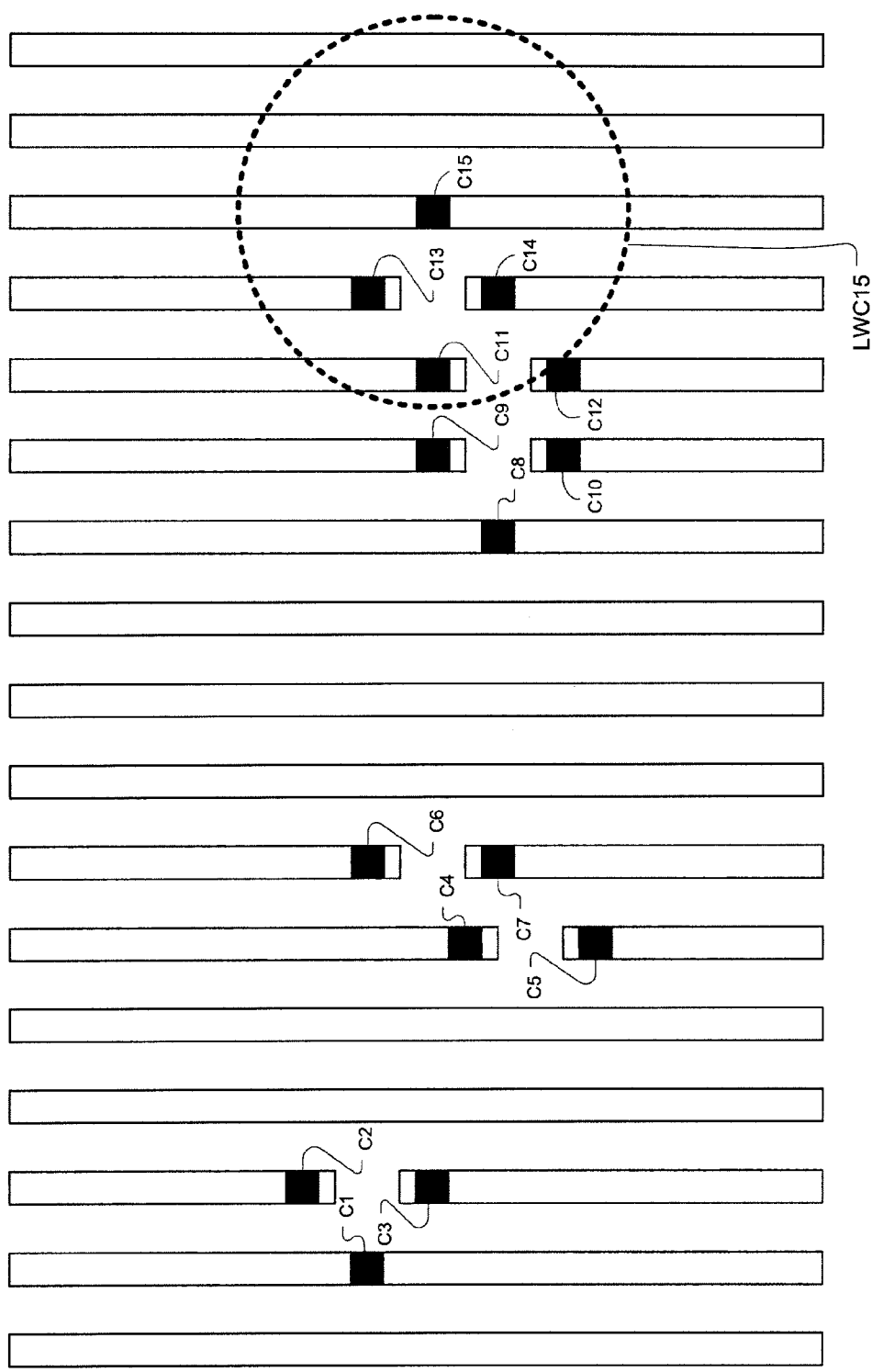
FIG. 4J shows the layout of FIG. 4A with litho window LWC15 defined about gate contacts C15, in accordance with one embodiment of the present invention.
Figures 1, 4K:
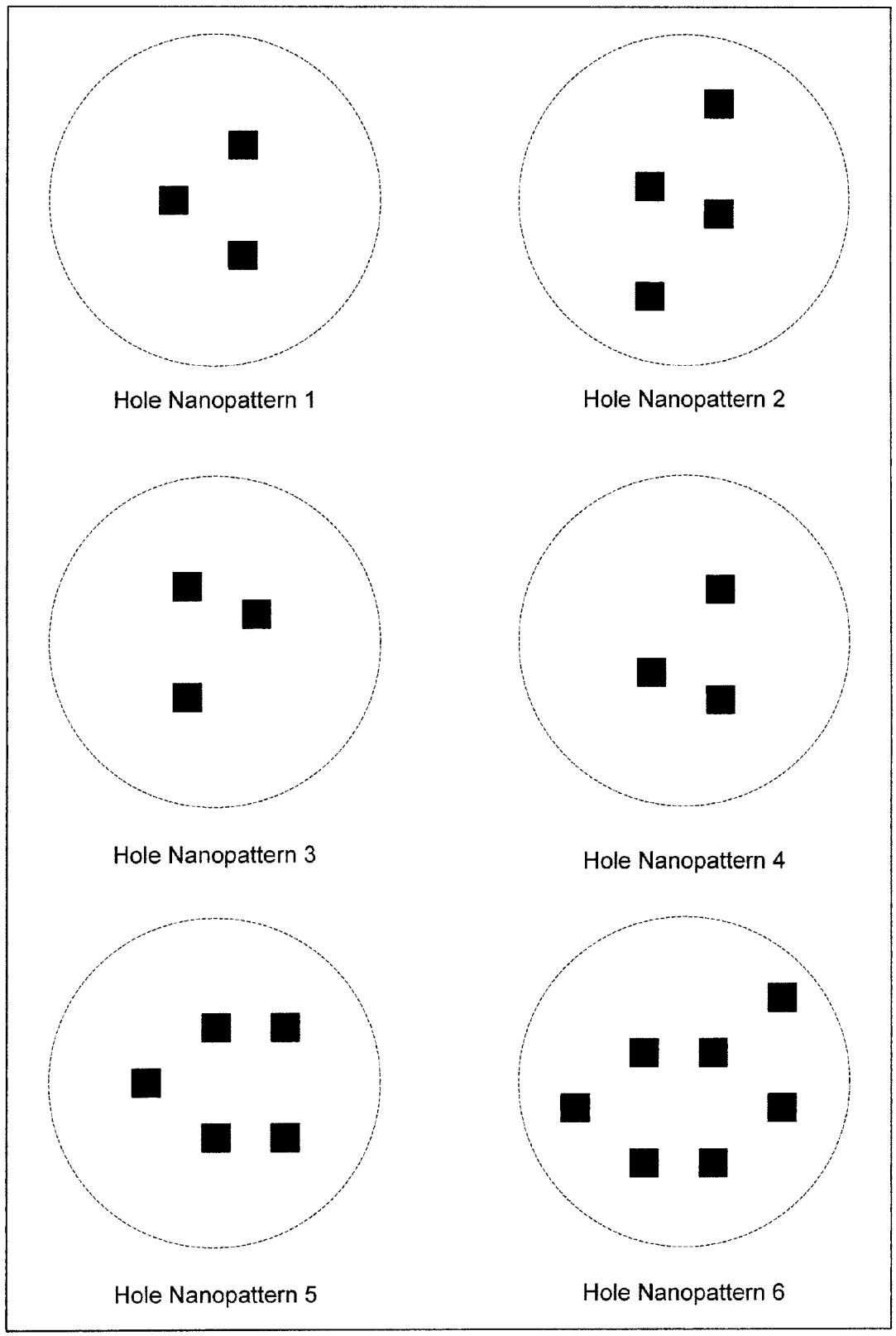
Figures 2, 4K:
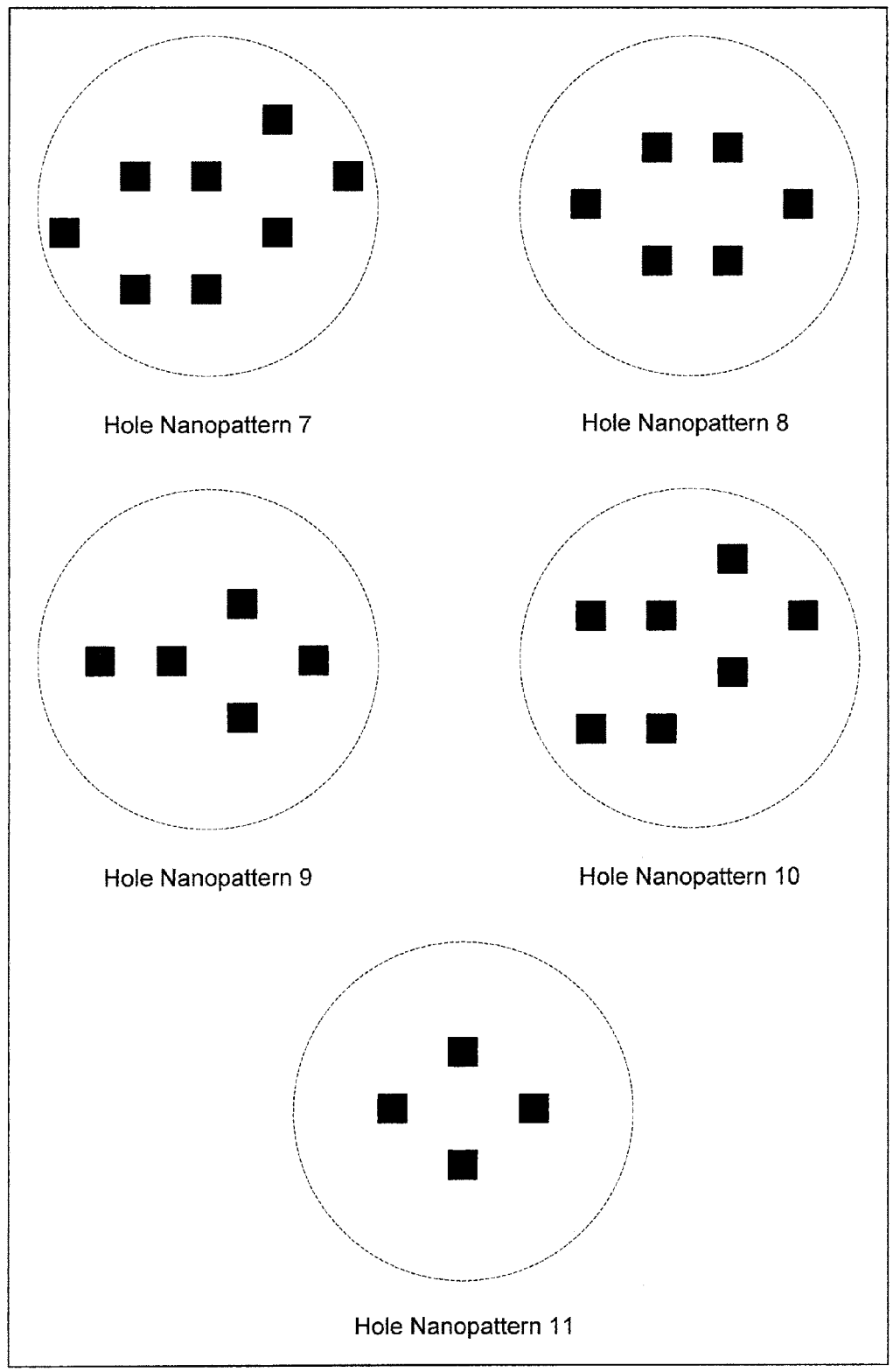

FIG. 4J shows the layout of FIG. 4A with litho window LWC15 defined about gate contacts C15. The hole nanopattern defined within LWC15 includes gate contacts C11 and C13-C15, and represents a unique hole nanopattern identified as Hole Nanopattern 11 in the library of hole nanopatterns shown in FIG. 4K-2.

Figure 5:
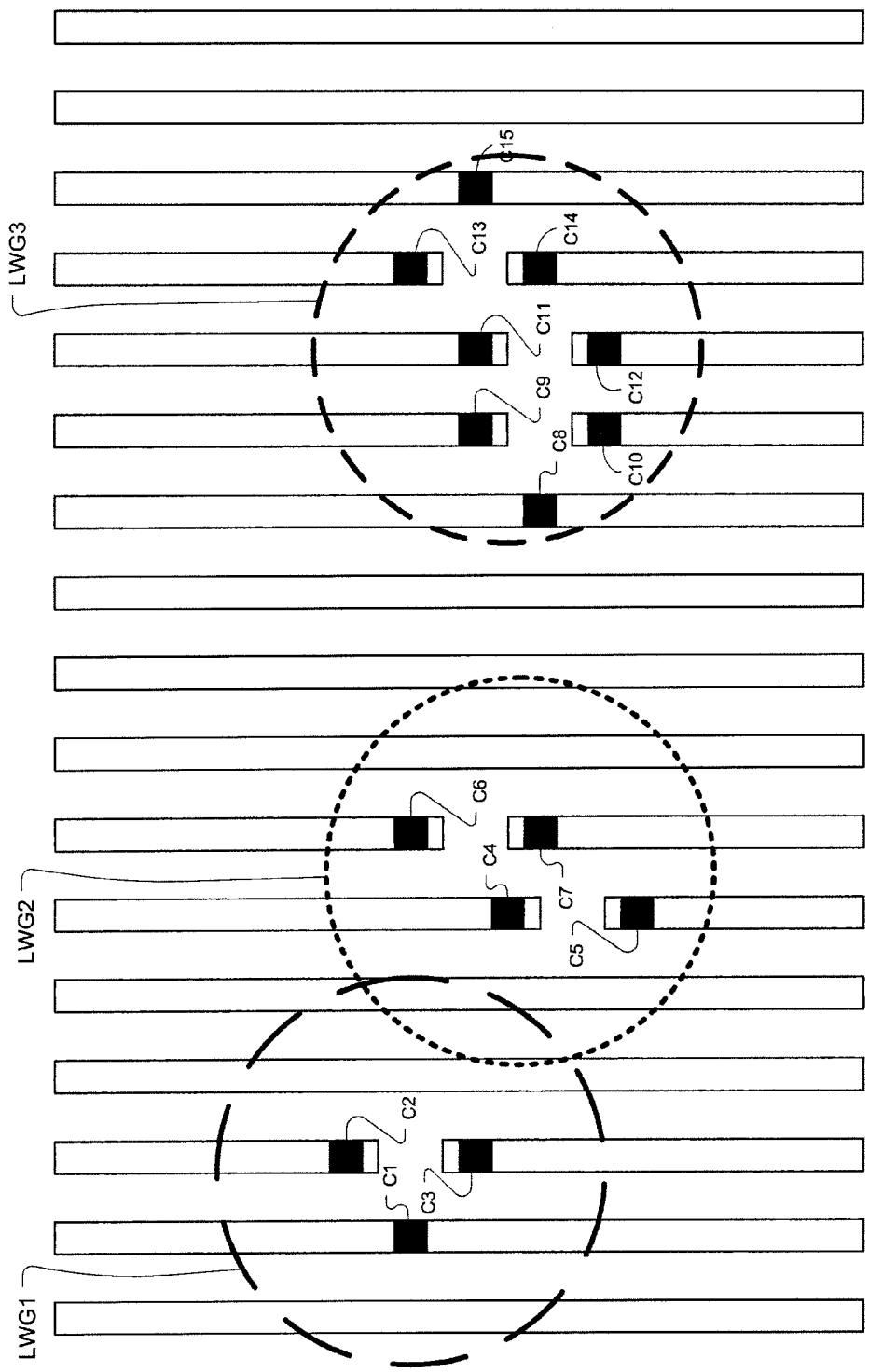
FIG. 5 shows identification of three hole nanopatterns within litho windows LWG1, LWG2, and LWG3, respectively, in accordance with one embodiment of the present invention.

It should be appreciated that the embodiment described with regard to FIGS. 4A-4K-2 for identifying hole nanopatterns is a rigorous method that involves placing the litho window in a centered manner about each hole (i.e., contact or via) within the layout to determine whether a unique hole nanopattern falls within the litho window. In another embodiment, hole nanopatterns within the contact/via layout can be identified by examining isolated groupings of contacts/vias. For example, FIG. 5 shows identification of three hole nanopatterns within litho windows LWG1, LWG2, and LWG3, respectively. Each of litho windows LWG1, LWG2, and LWG3, encloses an isolated grouping of holes (i.e., contacts or vias, depending on the layout under consideration). In one embodiment, an isolated grouping of holes in a contact/via layout is identified by a collection of holes which reside within a single litho window, where the collection of holes includes a number of peripheral holes, and wherein a distance between the peripheral holes and a nearest hole outside of the collection of holes is greater than one-half of the litho window diameter. For example, in FIG. 5, the collection of holes in litho window LWG3 includes peripheral hole C8 which is separated from the nearest hole C7 outside of the collection of holes by a distance that is greater than one-half of the diameter of the litho window LWG3.

Also, in one embodiment, a coordinate system is applied to the layout, such that layout shapes/features can be located by a set of coordinates. In this embodiment, distances between layout shapes/features can be calculated based on their respective coordinates. Therefore, in this embodiment, nanopatterns (LES or hole, as appropriate) can be identified through mathematical analysis of the coordinates of the layout shapes/features. More specifically, distances between layout shapes/features can be calculated and compared to an extent of the pertinent litho window to identify nanopatterns.

In one embodiment, sub-resolution shapes can be used to assist with manufacturing of contacts and/or vias. A sub-resolution shape represents a mask feature that allows for transfer of a controlled amount of light through the mask, where the controlled amount of light provides lithographic reinforcement to neighboring contact/vias without allowing the sub-resolution shape itself to be manufactured. In this embodiment, a number of sub-resolution contacts may be placed around one or more contacts/vias in the layout. In one embodiment, sub-resolution contacts are placed around every contact/via in the layout. In another embodiment, sub-resolution contact are placed around selected contacts/vias in the layout, depending on whether lithographic reinforcement of a given contact/via is necessary. In the lithography process, the presence of a sub-resolution feature or of a number of adjacently placed sub-resolution features next to a given contact/via may form a lithographic break. This lithographic break essentially blocks the lithographic influence on the given contact/via from other layout shapes positioned opposite the sub-resolution feature(s) from the given contact/via. Therefore, when identifying hole nanopatterns in a contact/via layout that utilizes sub-resolutions features, the sub-resolution features surrounding a given contact/via or surrounding a given group of contacts/vias may serve to truncate the litho window applicable to the given contact/via or group thereof.

Figure 6:
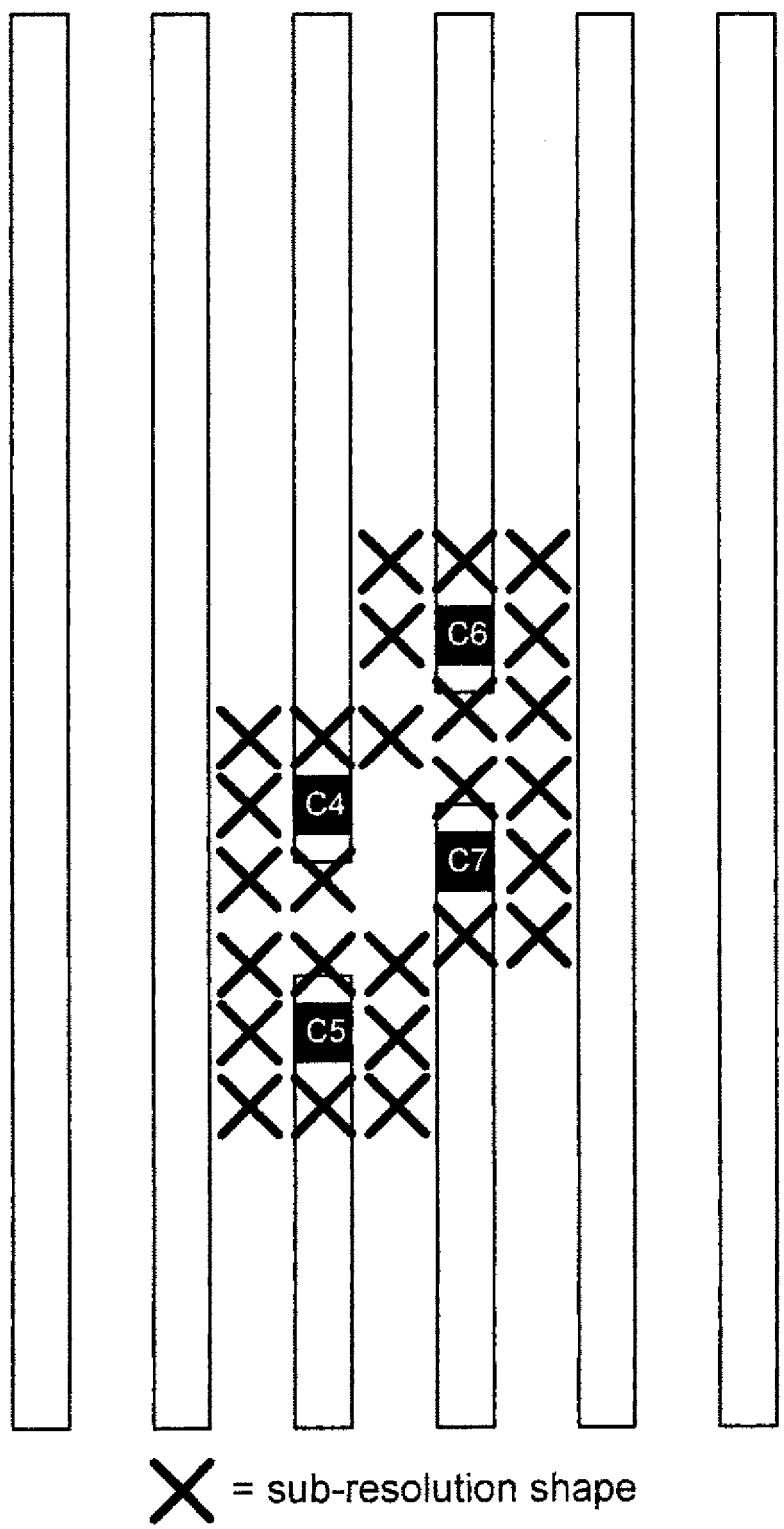
FIG. 6 shows a portion of the contact/via layout of FIG. 5 in which sub-resolution shapes (X) are placed around contacts/vias C4-C7, in accordance with one embodiment of the present invention.

FIG. 6 shows a portion of the contact/via layout of FIG. 5 in which sub-resolution shapes (X) are placed around contacts/vias C4-C7. In accordance with the above-described embodiment, the sub-resolution shapes (X) serve to truncate the litho window applicable to contacts/vias C4-C7. Therefore, each of contacts/vias C5 and C6 are lithographically isolated by the their surrounding sub-resolution shapes (X). Thus, a contact/via surrounded by sub-resolution shapes (X) represents one hole nanopattern identified within the layout of FIG. 6. Also, FIG. 6 shows that contacts/vias C4 and C7 are collectively surrounded by sub-resolution shapes (X), but remain in lithographic communication with each other, i.e., capable of lithographically influencing each other. Therefore, contacts/vias C4 and C7 collectively surrounded by sub-resolution shapes (X) represents another hole nanopattern. Also, in various embodiments, the sub-resolution shapes (X) may be placed on gridpoints associated with a fixed grid or may by placed in a free-form manner. The example of FIG. 6 shows the sub-resolution shapes (X) placed in a free-form manner.

In accordance with the foregoing, it should be understood that the present invention includes a number of different embodiments for identifying hole nanopatterns. One embodiment scans a litho window over the contact/via layout to identify hole nanopatterns, wherein the litho window is defined by a radius of lithographic influence (e.g., 2 to 3 wavelength radius). Another embodiment scans the litho window over the layout to identify hole nanopatterns, but considers the presence of sub-resolution shapes around a contact/via to represent a litho break, thereby effectively truncating the litho window at the sub-resolution shape. In yet another embodiment, a litho window is not used and hole nanopatterns are defined solely on the basis of sub-resolution features acting as litho breaks. This embodiment is particularly applicable to a contact/via layout that specifies regular placement of sub-resolution features around all contacts/vias. It should be understood that in different variations of the above-mentioned embodiments, either one, two, or any other number of sub-resolution shapes may be considered sufficient to represent a litho break around a given contact/via. Also, if phase shifting is used for contact/via lithography, each phase can be considered separately with regard to hole nanopattern identification. Additionally, if diffusion contacts and gate contacts are defined on separate masks, then each of the separate masks can be considered individually with regard to hole nanopattern identification.

In one embodiment, contact placements (for diffusion contacts and/or gate contacts) may be explicitly defined in a layout of a cell. In this embodiment, hole nanopatterns for the contacts can be identified by examining the explicitly defined cell layout. Also, in various embodiments, via placements may or may not be explicitly defined in a cell layout. If via placements are explicitly defined in the cell layout, then these via placements can be examined to identify hole nanopatterns for vias. Otherwise, if the via placements are not explicitly defined in the cell layout, then a simulated cell routing may be generated (by a routing tool) to obtain potential via placements for the cell that can be examined to identify hole nanopatterns for vias. Additionally, when hole nanopatterns are utilized in defining a layout, a router tool may be required to place contacts and vias so that their placements in the layout corresponds to at least one of a number of allowable hole nanopatterns.

Figure 7:
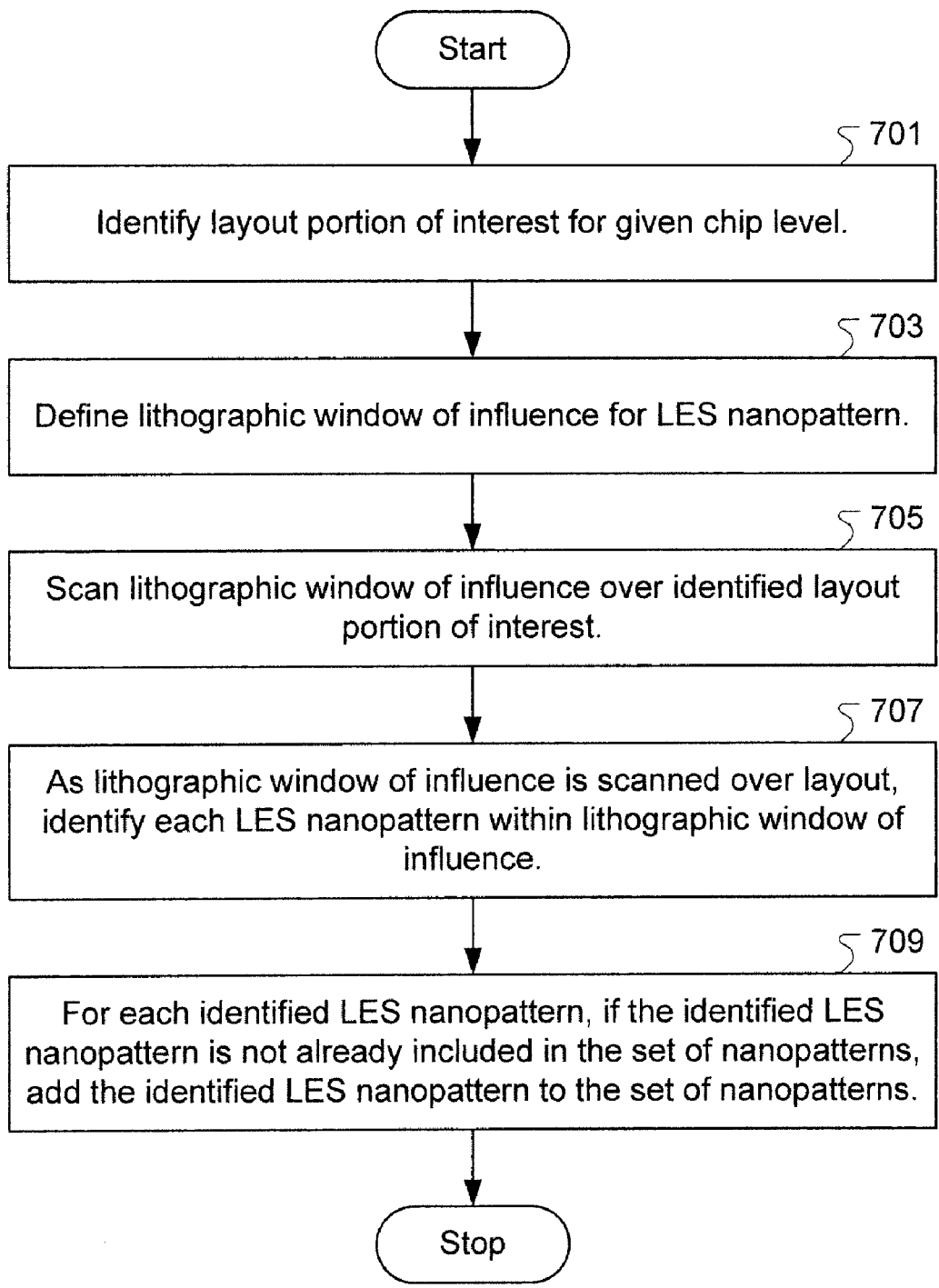
FIG. 7 shows a flowchart of a method for defining a set of LES nanopatterns, in accordance with one embodiment of the present invention.

FIG. 7 shows a flowchart of a method for defining a set of LES nanopatterns, in accordance with one embodiment of the present invention. The method includes an operation 701 for identifying a layout portion of interest for a given chip level. In one embodiment, the layout portion of interest may correspond to a particular chip level of standard cell. In another embodiment, the layout portion of interest may correspond to a particular chip level of a logic block to be defined on the chip. In another embodiment, the layout portion of interest may correspond to a particular chip level of a memory block to be defined on the chip. It should be appreciated that the layout portion of interest identified in operation 701 can represent a layout portion of essentially any chip level of essentially any circuit to be defined on the chip. The method continues with an operation 703 for defining a lithographic window of influence (litho window) applicable to each LES nanopattern present within the layout portion identified in operation 701.

From operation 703, the method proceeds with an operation 705 in which the litho window is scanned over the layout portion identified in operation 701. In one embodiment, scanning the litho window in operation 705 includes successively centering the litho window about each LES instance within the layout portion identified in operation 701. In accordance with an operation 707, as the litho window is scanned over the layout, each LES nanopattern that appears within the litho window is identified. A given LES nanopattern is defined by relative placements of LES instances within the litho window when the litho window is centered about any given LES instance. Then, in an operation 709, for each LES nanopattern identified in operation 707, if the identified LES nanopattern is unique and not already included in the set of LES nanopatterns, the identified LES nanopattern is added to the set of LES nanopatterns. Upon completion of the method of FIG. 7, the set of LES nanopatterns should include the unique LES nanopatterns present within the layout portion of interest as identified in operation 701. The set of LES nanopatterns can be recorded in a digital format on a computer readable storage medium. Also, in one embodiment, each LES nanopattern can be represented symbolically without regard to specific dimensional characteristics of the layout portion of interest.

Figure 8:
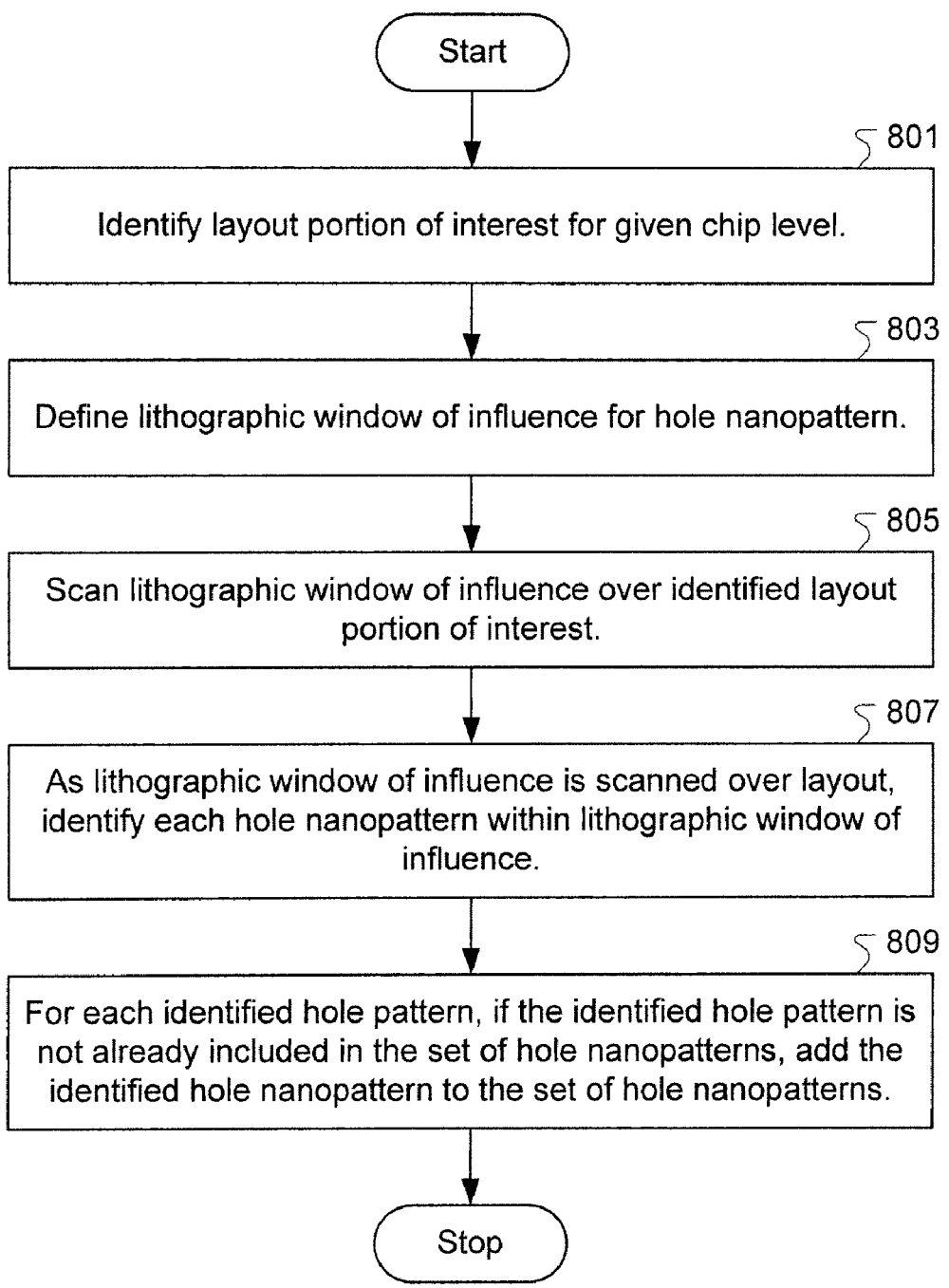
FIG. 8 shows a flowchart of a method for defining a set of hole nanopatterns, in accordance with one embodiment of the present invention.

FIG. 8 shows a flowchart of a method for defining a set of hole nanopatterns, in accordance with one embodiment of the present invention. The method includes an operation 801 for identifying a layout portion of interest for a given chip level. In one embodiment, the layout portion of interest may correspond to a particular chip level of standard cell. In another embodiment, the layout portion of interest may correspond to a particular chip level of a logic block to be defined on the chip. In another embodiment, the layout portion of interest may correspond to a particular chip level of a memory block to be defined on the chip. It should be appreciated that the layout portion of interest identified in operation 801 can represent a layout portion of essentially any contact or via chip level of essentially any circuit to be defined on the chip. The method continues with an operation 803 for defining a lithographic window of influence (litho window) applicable to each hole nanopattern present within the layout portion identified in operation 801.

From operation 803, the method proceeds with an operation 805 in which the litho window is scanned over the layout portion identified in operation 801. In one embodiment, scanning the litho window in operation 805 includes successively centering the litho window about each hole instance within the layout portion identified in operation 801. In accordance with an operation 807, as the litho window is scanned over the layout, each hole nanopattern that appears within the litho window is identified. A given hole nanopattern is defined by relative placements of hole instances within the litho window when the litho window is centered about any given hole instance. Then, in an operation 809, for each hole nanopattern identified in operation 807, if the identified hole nanopattern is unique and not already included in the set of hole nanopatterns, the identified hole nanopattern is added to the set of hole nanopatterns. Upon completion of the method of FIG. 8, the set of hole nanopatterns should include the unique hole nanopatterns present within the layout portion of interest as identified in operation 801. The set of hole nanopatterns can be recorded in a digital format on a computer readable storage medium. Also, in one embodiment, each hole nanopattern can be represented symbolically without regard to specific dimensional characteristics of the layout portion of interest.

As discussed above, FIGS. 7 and 8 describe methods for defining sets of LES and hole nanopatterns, respectively, based on identification and extraction of nanopatterns from an existing layout. In one embodiment, LES and/or hole nanopatterns are developed as needed during generation of a layout based on a set of nanopattern rules. As the LES and/or hole nanopatterns are developed, they are added to a listing of nanopatterns utilized in the layout. Then, when the layout is completed, the sets of LES and hole nanopatterns corresponding to the layout are also completed. Therefore, in this embodiment, the method of FIGS. 7 and 8 may not be required to define the sets of LES and hole nanopatterns, respectively.

Figure 9:
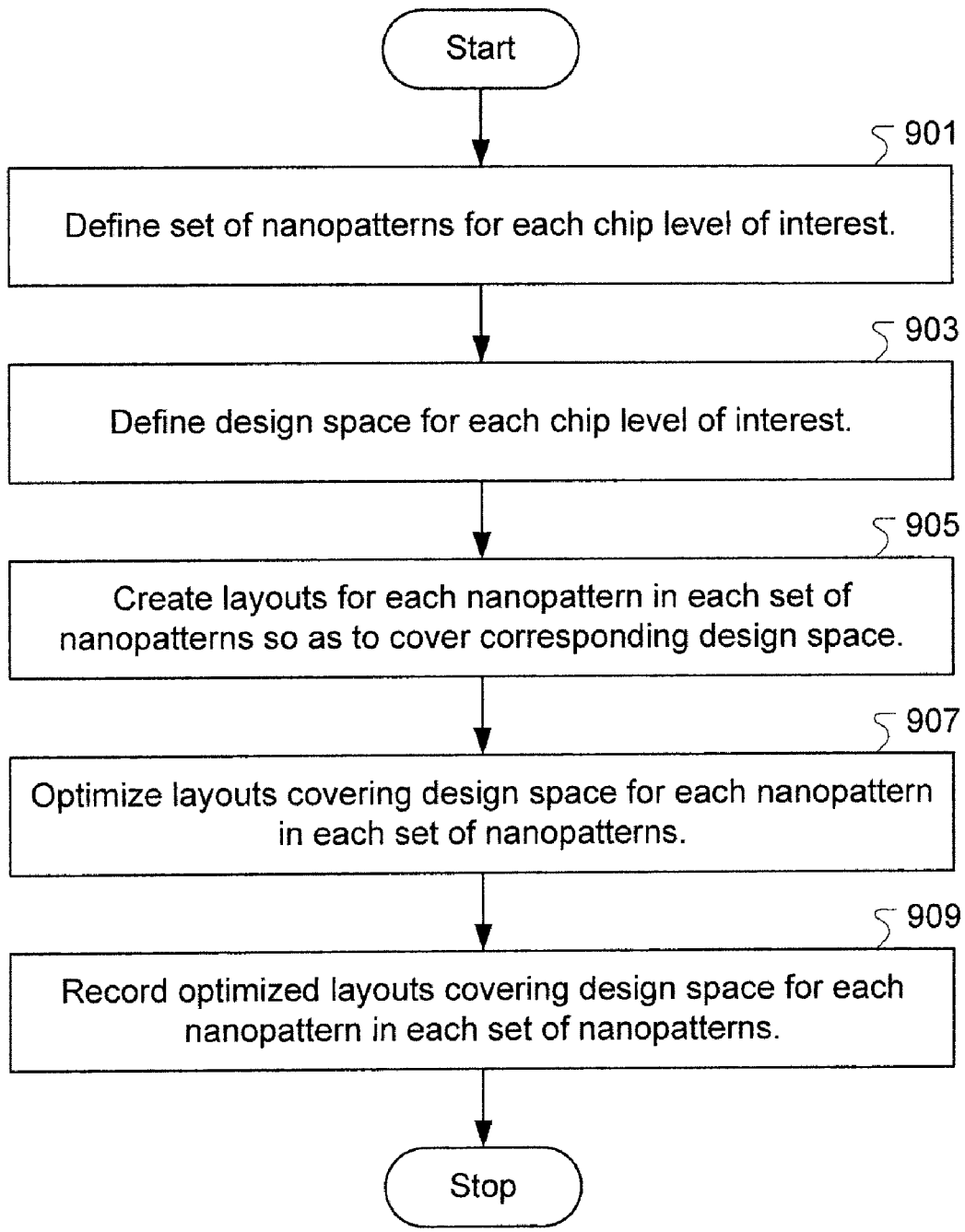
FIG. 9 shows a flowchart of a method for creating a library of optimized nanopatterns, in accordance with one embodiment of the present invention.

FIG. 9 shows a flowchart of a method for creating a library of optimized nanopatterns, in accordance with one embodiment of the present invention. The method includes an operation 901 in which a set of nanopatterns is defined for each chip level of interest. The chip levels of interest may include the chip levels that are considered critical for proper operation of the circuit, and/or may include the chip levels that have features sizes smaller than the lithographic capabilities of the manufacturing process. The LES nanopatterns in the set of nanopatterns of operation 901 can be defined in accordance with the method of FIG. 7. Similarly, the hole nanopatterns in the set of nanopatterns of operation 901 can be defined in accordance with the method of FIG. 8. Alternatively, the LES and/or hole nanopatterns in the set of nanopatterns of operation 901 may be obtained from other means, such as from a set of nanopatterns developed during layout generation according to a set of nanopattern rules.

The method continues with an operation 903 for defining a design space for each chip level of interest. The design space for a given chip level is defined by a set of layout characteristics. For example, in a chip level defined according to the dynamic array architecture (in which layout shapes are defined as linear shapes placed in a parallel relationship), the design space of interest may include layout characteristics such as LES size, linear layout shape width (perpendicular to routing direction), and space between adjacent linear layout shapes (perpendicular to routing direction). In another example, in a chip level defined according to the dynamic array architecture (in which contact/vias are placed according to a grid), the design space of interest may include layout characteristics such as pitch (i.e., perpendicular spacing between adjacent gridlines), and contact/via size. It should be understood that the design space for a given chip level can be defined by essentially any set of layout characteristics that could potentially affect the manufacturability of the layout associated with the given chip level. Thus, the design space is defined as a set of layout parameters and corresponding value ranges that affect manufacturability of a layout. In one embodiment, the design space for a given chip level includes each layout characteristic that is considered critical with respect to lithographic patterning of the layout associated with the given chip level.

From the operation 903, the method proceeds with an operation 905 in which layouts are created for each nanopattern in the set of nanopatterns for each chip level of interest as defined in operation 901. The layouts for each nanopattern are created in operation 905 so as to cover the design space defined in operation 903 for the chip level associated with the nanopattern. For example, consider that a set of nanopatterns for a linear gate electrode level of a chip is defined in operation 901 to include an LES Nanopattern 1. A design space for the linear gate electrode level is defined in operation 903 to include the parameters of LES size, linear layout shape width (perpendicular to routing direction), and space between adjacent linear layout shapes (perpendicular to routing direction). Then, in operation 905, a layout is created for LES Nanopattern 1 for each combination of LES size, linear layout shape width, and space between adjacent linear layout shapes. So, if the design space includes five different values for LES size, three different values for linear layout shape width, and six different values for space between adjacent linear layout shapes, then there would be ninety (5*3*6=90) different layouts for LES Nanopattern 1, with each layout representing a different combination of LES size, linear layout shape width, and space between adjacent linear layout shapes. It should be appreciated that the design space for a given chip level can be defined in essentially any manner. For example, if one LES size, one linear layout shape width, and one space between adjacent linear layout shapes is of interest in a given chip level, then the design space for the given chip level includes one point.

Following operation 905, the method includes an operation 907 for optimizing each of the layouts that cover the design space for each nanopattern in each set of nanopatterns. As previously mentioned, each set of nanopatterns and its corresponding design space is chip level specific. In the operation 907, each nanopattern layout (regardless of whether it is an LES nanopattern or a hole nanopattern) can be independently optimized with respect to any of a number of manufacturing process settings. Examples of manufacturing process setting optimizations that can be performed on a given nanopattern layout includes, but is not limited to: 1) lithography settings, 2) OPC (optical proximity correction) settings, 3) mask settings, 4) MPC (mask proximity correction) settings, 5) wafer settings, 6) process settings, and/or 7) PCT (process compensation technique) settings.

Examples of lithography settings may include optical medium (air or immersion); light wavelength; and/or stepper settings, such as illuminator shape (annular, quadrapole, dipole), numerical aperture, polarization (none, horizontal, vertical, circular), among others. OPC settings refer to adjustments that are applied to layout features to compensate for expected optical interactions during the lithography process. Examples of mask settings may include mask type (binary mask, attenuated phase shift mask, alternating phase shift mask), among others. MPC settings refer to adjustments that are applied to mask features in order to obtain a desired pattern on the mask. OPC is performed on the layout. MPC is similar to OPC, but MPC is performed on the mask. Wafer settings refer to properties of the wafer such as photoresist type used. Process settings refer to settings associated with various fabrication processes. For example, processing settings for an etching process may include temperature, pressure, chemistry, reactant flow rates, radiofrequency (RF) power, direct current (DC) bias, among others. Process settings for a chemical mechanical process (CMP) may include down-force, rotation speed, slurry composition, among others.

It should be appreciated that lithography, OPC, mask, MPC, wafer, and PCT settings apply to a given chip level, as the given chip level will be exposed to these settings in its entirety at a given time. Therefore, it should be understood that the layouts corresponding to the set of nanopatterns for a given level are optimized in a collective manner at a given point in the design space, as the occurrence of each nanopattern layout within the given level at the given point in the design space will be subjected to the same manufacturing process settings. However, it should be understood that where appropriate some optimizations such as OPC may be independently performed on individual nanopattern layouts.

During optimization of a given nanopattern layout, a simulated aerial image of the as-fabricated nanopattern layout can be generated using a simulation tool. Then, the simulated aerial image of the as-fabricated nanopattern layout can be dimensionally compared to the as-drawn nanopattern layout to determine if the differences between the as-fabricated and as-drawn nanopattern layout are acceptable/optimized. Thus, following completion of operation 907, a given set of nanopatterns corresponding to a particular chip level will have their respective nanopattern layouts optimized for manufacturability in a collective manner at each point in the defined design space. Following operation 907, the method concludes with an operation 909 for recording the optimized layouts covering the design space for each nanopattern in each set of nanopatterns. The recording of operation 909 may include storing the optimized layouts and corresponding process settings in an electronic format, i.e., digital format, on an electronic storage medium that can be read by a computer system, i.e., on a computer readable storage medium.

Figure 10:
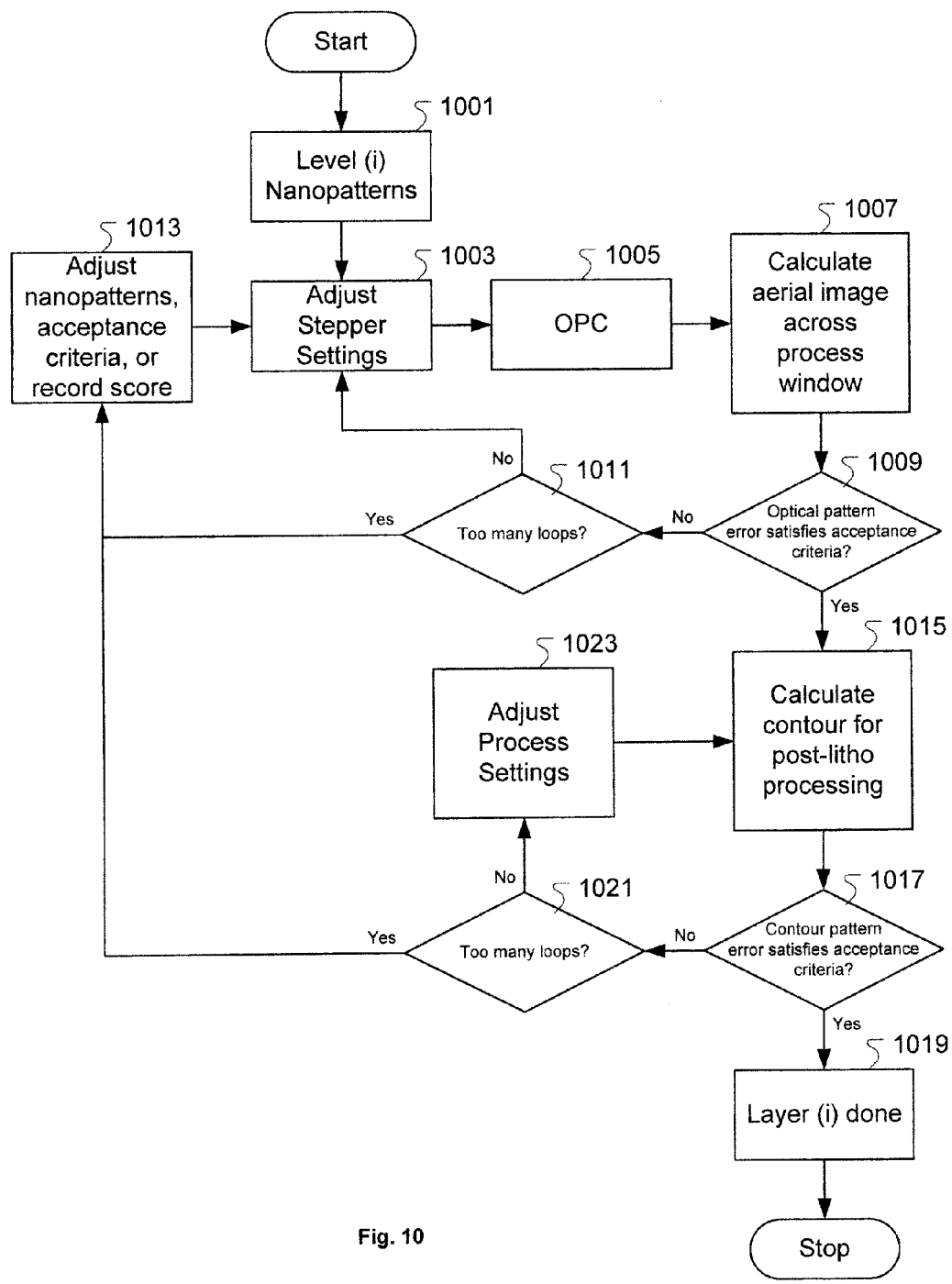
FIG. 10 shows a flowchart of a method for performing nanopattern co-optimization, in accordance with one embodiment of the present invention.

FIG. 10 shows a flowchart of a method for performing nanopattern co-optimization, in accordance with one embodiment of the present invention. The method of FIG. 10 is used to co-optimize nanopatterns associated with a given chip level (i) at a given point in design space. In one embodiment, the method of FIG. 10 may be used to perform operation 907 of the method of FIG. 9. In an operation 1001, a set of nanopattern layouts for a chip level (i) is obtained. Operation 1001 may include performing the methods of FIG. 7 or FIG. 8. An operation 1003 is then performed to adjust stepper settings. In one embodiment, stepper settings include illuminator shape (for example, annular, quadrapole, dipole), NA (numerical aperture), polarization (none, horizontal, vertical, circular), among others. The method also includes an operation 1005 for performing OPC on each nanopattern layout in the set of nanopattern layouts.

From the operation 1005, the method proceeds with an operation 1007 for calculating (i.e., simulating) an aerial image of each nanopattern layout across the process window. An operation 1009 is then performed to compare the simulated aerial images of the various nanopattern layouts with their corresponding as-drawn layouts to determine whether the optical pattern error satisfies acceptance criteria. In one embodiment, the optical pattern error is represented as an RMS (root mean square) of dimensional differences between the simulated aerial images of the various nanopattern layouts and their corresponding as-drawn layouts. If the optical pattern error does not satisfy the acceptance criteria, then the method proceeds with an operation 1011 for determining whether too many loops have been made through the negative pathway of operation 1009, i.e., for determining whether the optical pattern error has been too large too many times. If the number of loops through the negative pathway of operation 1009 does not exceed a control value, the method reverts back to operation 1003 in which adjusted stepper settings are applied, and if necessary in operation 1005, a revised OPC solution is applied to the failing nanopattern layouts.

However, if the number of loops through the negative pathway of operation 1009 exceeds the control value, the method proceeds with an operation 1013 for adjusting either the problematic nanopattern layouts or the optical pattern error acceptance criteria, or for simply recording the optical pattern error score associated with the nanopatterns of level (i) and the point in design space under consideration. In one embodiment, the optical pattern error score represents the number of nanopattern faults within the set of nanopatterns of chip level (i). In one embodiment, a nanopattern fault is counted when the optical pattern error of a given nanopattern exceeds the acceptance criteria too many times, wherein the optical pattern error is based on the dimensional difference between the simulated aerial image of the given nanopattern and the corresponding as-drawn layout of the given nanopattern. Following the operation 1013, the method proceeds again with operation 1003.

With reference back to operation 1009, if the optical pattern error does satisfy the acceptance criteria, then the method proceeds with an operation 1015 for calculating (i.e., simulating) a contour of each as-fabricated nanopattern layout based on post-litho processing. The calculation of the contours in operation 1015 are based on a set of process settings. For example, process setting for an etching operation may include temperature, pressure, chemistry, flow rates, RF power, DC bias, among others. In another example, process settings for CMP may include down-force, rotation speeds, slurry composition, among others.

From the operation 1015, the method proceeds with an operation 1017 for determining whether the calculated (simulated) contours of the various as-fabricated nanopattern layouts satisfy contour acceptance criteria. If the nanopattern contours do not satisfy the acceptance criteria, then the method proceeds with an operation 1021 for determining whether too many loops have been made through the negative pathway of operation 1017, i.e., for determining whether the nanopattern contours have failed to meet the acceptance criteria too many times. If the number of loops through the negative pathway of operation 1017 does not exceed a control value, the method proceeds with an operation 1023 in which one or more process settings are adjusted in an attempt to improve the simulated nanopattern contours. Then, the method reverts from operation 1023 back to operation 1015 for re-calculating the nanopattern contours.

If the number of loops through the negative pathway of operation 1021 exceeds the control value, the method proceeds to the operation 1013 for adjusting either the problematic nanopattern layouts or the optical pattern error acceptance criteria, or for simply recording the optical pattern error score associated with the nanopatterns of level (i) and the point in design space under consideration. If operation 1017 determines that the calculated nanopattern contours do satisfy the acceptance criteria, then the co-optimization of the nanopatterns for chip level (i) is complete as indicated in operation 1019, and the method concludes. The adjusted stepper settings and OPC corrections for each nanopattern layout can be recorded in a digital format on a computer readable storage medium.

It should be understood that in the method of FIG. 10, the weighting of nanopatterns for a given chip level (i) may not be all the same. For example, some nanopatterns may affect the choice of settings more than others. For example, a nanopattern used in a memory cell may have a smaller allowed optical pattern error than a less used nanopattern.

FIG. 11A shows an exemplary set of results generated by performing the method of FIG. 10 on a set of nanopatterns for a given chip level for each of a number of points in design space. The example of FIG. 11A may correspond to a chip level defined by linear-shaped layout features placed in a parallel relationship to each other. The design space in the example is defined by LES size and pitch, where LES size is defined as the perpendicular distance between facing ends of linear-shaped layout features that are placed end-to-end in the layout, and where pitch is defined as the perpendicular distance between centerlines of adjacently placed linear-shaped layout features. In the example of FIG. 11A, the linear-shaped layout features may be defined to have a constant width, thereby allowing the pitch to simultaneously represent both design space parameters of linear-shaped layout feature width and spacing between adjacently placed linear-shaped layout features.

The design space table of FIG. 11A shows the quality response from the simulated lithography and fabrication processes for the set of nanopatterns of the given chip level. The numbers shown in the design space table represent a number of defects or other fault types within the set of nanopatterns based on the simulated lithography and fabrication processes. Therefore, lower numbers in the design space table represent better results. Nanopattern fidelity is good where the number of defects/faults is zero. It one embodiment, it may be desirable to allow for a design space buffer of zero defects/faults around a chosen point in the design space. For example, based on the results shown in FIG. 11A, a design point corresponding to a normalized gap of 1.0 and a normalized pitch of 1.0 may be chosen based on zero simulated defect/faults at the chosen design point, with a design space buffer of zero defects/faults around the chosen design point.

It should be understood that a given design space table, such as that shown in FIG. 11A, will correspond to a given set of process settings. In other words, each nanopattern in the set of nanopatterns is simulated based on the same process settings at each point in the design space to generate the results shown in the design space table. As previously discussed, the method of FIG. 10 provides an operation 1023 for adjusting the process settings based on the simulated fabrication process results. Therefore, when the process settings are adjusted in the operation 1023, the fabrication process for the entire set of nanopatterns of the given chip level are re-simulated to generate a new set of results for the design space table. For example, FIG. 11B shows the design space table of FIG. 11A for the same chip level and set of nanopatterns, but based on different process settings. FIG. 11B indicates that the adjusted process settings caused the no-fault region of the design space to shift toward smaller feature sizes. Based on the results of FIG. 11B, a design point corresponding to a normalized gap of 0.95 and a normalized pitch of 0.95 may be chosen based on zero simulated defects/faults at the chosen design point, with a design space buffer of zero defects/faults around the chosen design point. Therefore, as compared to the result of FIG. 11A, the adjusted process settings of FIG. 11B provides for a 10% decrease in layout area for the portion of the given chip level that is defined based on the co-optimized nanopatterns. Therefore, if the layout size of other related chip levels can be similarly reduced by 10%, a chip layout area required for the corresponding circuit can be reduced by 10%.

It should be appreciated that the discussion with regard to FIGS. 11A and 11B is based on hypothetical results and is intended to illustrate one embodiment by which the results obtained through the nanopattern co-optimization method of FIG. 10 can be conveyed and used to make decisions with regard to lithographic settings, fabrication process settings, and/or design point selection. It should be understood that the results obtained through the nanopattern co-optimization method of FIG. 10 can be conveyed and analyzed in other ways in other embodiments.

Figure 12:
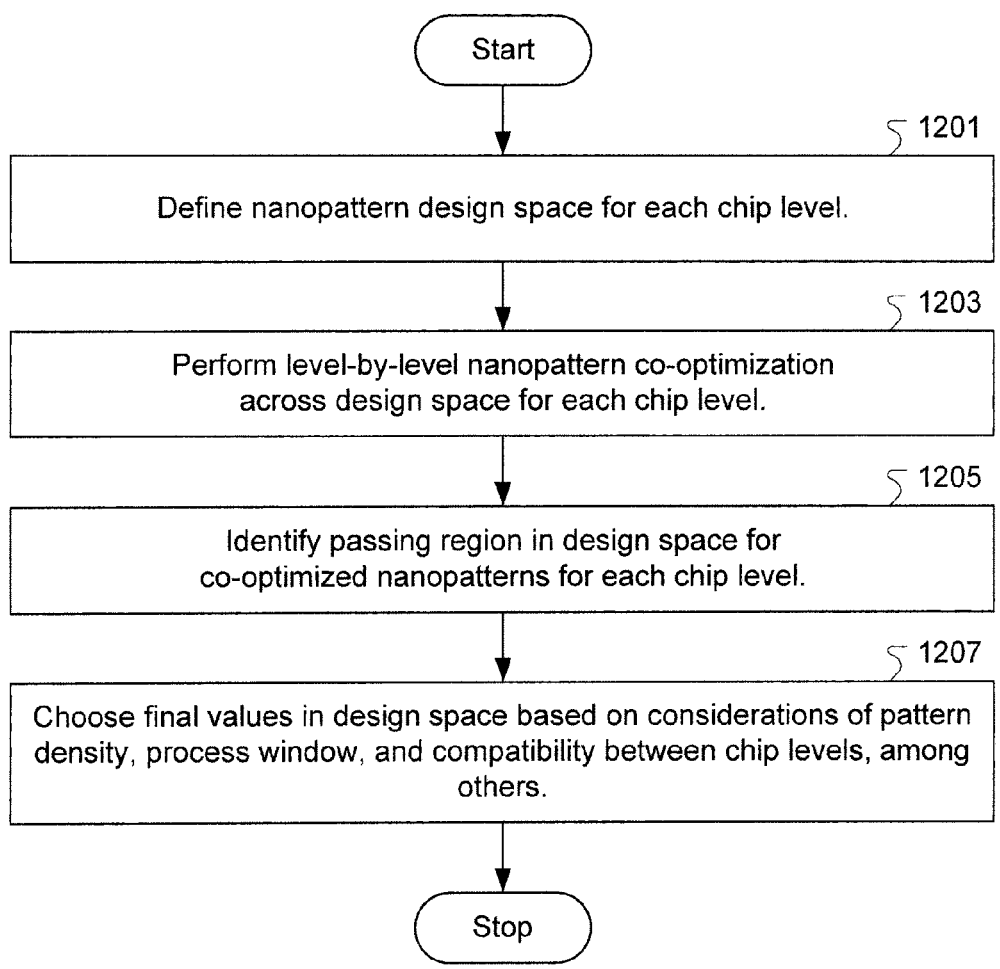
FIG. 12 shows a flowchart for evaluating a nanopattern design space, in accordance with one embodiment of the present invention.

Using the layer-by-layer nanopattern co-optimization method of FIG. 10, it is possible to evaluate an entire design space. FIG. 12 shows a flowchart for evaluating a nanopattern design space, in accordance with one embodiment of the present invention. In an operation 1201, a nanopattern design space is defined for each chip level. In an operation 1203, level-by-level nanopattern co-optimization is performed across the design space for each chip level. In one embodiment, operation 1203 is performed according to the method of FIG. 10 for each point in the design space for each chip level. The method also includes an operation 1205 for identifying a passing region in the design space for the co-optimized nanopatterns for each chip level. With reference to FIGS. 11A and 11B, in one embodiment, the passing region in the design space may be defined by those design points having zero defects/faults. In another embodiment, the passing region in the design space may be defined by those design points that have zero defects/faults and that are not located next to a design point having more that zero defects/faults. The method further includes an operation 1207 for selecting final values (i.e., final design points) in the design spaces for the various chip levels based on considerations such as pattern density, process window, and compatibility between chip levels, among others. For example, selection of pitch for an interconnect level may be affected by selection of pitch for a contact or via level. The method can further include an operation for defining a circuit layout using the sets of nanopattern layouts at the selected final design points for the number of chip levels. Also, the defined circuit layout can be recorded in a digital format on a computer readable storage medium.

Figure 13:
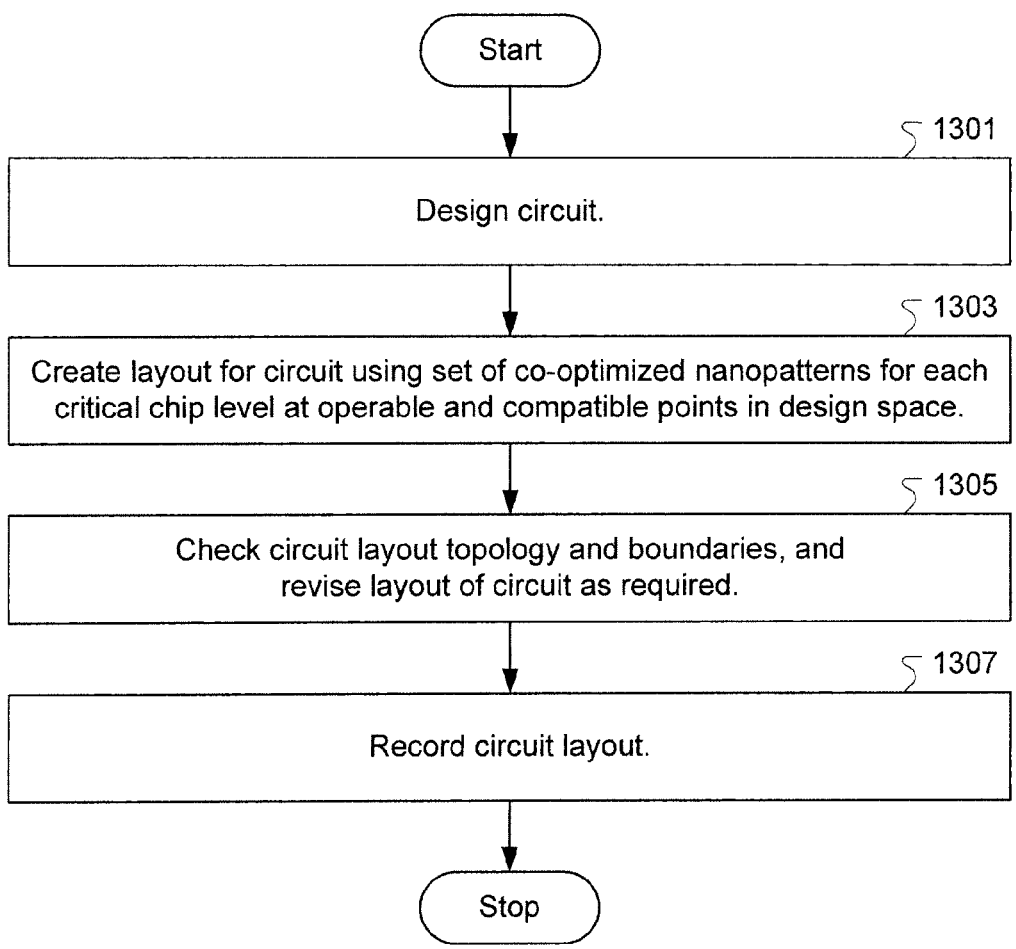
FIG. 13 shows a flowchart of a method for designing a nanopattern based circuit optimized for manufacturability, in accordance with one embodiment of the present invention.

FIG. 13 shows a flowchart of a method for designing a nanopattern based circuit optimized for manufacturability, in accordance with one embodiment of the present invention. The method includes an operation 1301 for designing a circuit. The circuit design may take the form of an electrical schematic, netlist, register transfer level (RTL) description, or any other format suitable for representing an electronic circuit. An operation 1303 is then performed to create a layout for the circuit using a set of co-optimized nanopatterns for each critical chip level. Also, the circuit layout for a given chip level is defined at an operable and compatible point in design space for the given chip level, where operable refers to an ability to successfully manufacture the layout and nanopatterns therein, and where compatible refers to a compatible relationship between design points for various interfacing chip levels.

In one embodiment, the circuit that is designed and laid out in operations 1301 and 1303 defines a cell. In this embodiment, operation 1303 may include an operation for creating a symbolic layout of elemental circuits within the cell using the set of co-optimized nanopatterns for each chip level of the cell. Then, an operation can be performed to create a real cell layout from the symbolic layout of elemental circuits at the chosen point in design space.

The method further includes an operation 1305 for checking the circuit layout topology and circuit boundaries. For example, the circuit layout topology may be checked against a set of design rules developed for a given manufacturing facility. Also, the layout features near the boundary of the circuit or cell may be checked for compatibility with a layout environment in which the circuit or cell may be placed on the chip. In one embodiment, the checking of operation 1305 is done on a level-by-level basis. Also, in operation 1305, if it is determined that the circuit layout needs to be adjusted, then the circuit layout is revised as necessary followed by a re-checking of the circuit layout topology and circuit boundaries. In one embodiment, revision of the circuit layout in operation 1305 may include, but is not limited to, substitution of one nanopattern for another, insertion of a new nanopattern, or development and insertion of a new nanopattern. In one embodiment, each nanopattern utilized in the circuit layout is subjected to the nanopattern co-optimization process to ensure manufacturability of the nanopattern. The method also includes an operation for recording the final circuit layout in a format that can be stored and retrieved. For example, the final circuit layout can be recorded in a layout data file, such as a GDS II (Graphic Data System) database file, or OASIS (Open Artwork System Interchange Standard) database file, among others.

It should be understood that a circuit layout defined using co-optimized nanopatterns may correspond to a portion of a given chip level, when the chip is considered as a whole. Other portions of the given chip level may include layouts that are not defined according to the co-optimized nanopatterns. Because the given chip level as a whole is subjected to the manufacturing processes associated with co-optimization of the nanopatterns, it is prudent to evaluate the other portions of the given chip level using the lithographic and fabrication processes defined for the co-optimized nanopatterns to ensure chip-wide manufacturability. In one embodiment, one set of design rules can be developed specifically for chip layout portions defined according to the co-optimized nanopatterns, and another set of design rules can be developed for other chip layout portions that are not defined according to the co-optimized nanopatterns. Therefore, the design space for the layout portions defined using the co-optimized nanopatterns can be established/controlled independently from the design space of the other chip layout portions that are not defined according to the co-optimized nanopatterns.

Dynamic Array Architecture

The dynamic array architecture represents a semiconductor device design paradigm in which linear-shaped layout features are defined along a regular-spaced virtual grate (or regular-spaced virtual grid) in a number of levels of a cell, i.e., in a number of levels of a semiconductor chip. The virtual grate is defined by a set of equally spaced, parallel virtual lines extending across a given level in a given chip area. The virtual grid is defined by a first set of equally spaced, parallel virtual lines extending across a given level in a given chip area in a first direction, and by a second set of equally spaced, parallel virtual lines extending across the given level in the given chip area in a second direction, where the second direction is perpendicular to the first direction. In one embodiment, the virtual grate of a given level is oriented to be substantially perpendicular to the virtual grate of an adjacent level. However, in other embodiments, the virtual grate of a given level is oriented to be either perpendicular or parallel to the virtual grate of an adjacent level.

In one embodiment, each linear-shaped layout feature of a given level is substantially centered upon one of the virtual lines of the virtual grate associated with the given level. A linear-shaped layout feature is considered to be substantially centered upon a particular line of a virtual grate when a deviation in alignment between of the centerline of the linear-shaped layout feature and the particular line of the virtual grate is sufficiently small so as to not reduce a manufacturing process window from what would be achievable with a true alignment between of the centerline of the linear-shaped layout feature and the line of the virtual grate.

In one embodiment, the above-mentioned manufacturing process window is defined by a lithographic domain of focus and exposure that yields an acceptable fidelity of the layout feature. In one embodiment, the fidelity of a layout feature is defined by a characteristic dimension of the layout feature. Also, it should be understood that the centerline of a given linear-shaped layout feature is defined as a virtual line that passes through the cross-sectional centroid of the linear-shaped layout feature at all points along its length, wherein the cross-sectional centroid of the linear-shaped layout feature at any given point along its length is the centroid of its vertical cross-section area at the given point.

In another embodiment, some linear-shaped layout features in a given level may not be centered upon a virtual line of the virtual grate associated with the given level. However, in this embodiment, the linear-shaped layout features remain parallel to the virtual lines of the virtual grate, and hence parallel to the other linear-shaped layout features in the given level. Therefore, it should be understood that the various linear-shaped layout features defined in a layout of a given level are oriented to extend across the given level in a parallel manner.

Also, in the dynamic array architecture, each linear-shaped layout feature is defined to be devoid of a substantial change in direction along its length. The lack of substantial change in direction of a linear-shaped layout feature is considered relative to the line of the virtual grate along which the linear-shaped layout feature is defined. In one embodiment, a substantial change in direction of a linear-shaped layout feature exists when the width of the linear-shaped layout feature at any point thereon changes by more than 50% of the nominal width of the linear-shaped layout feature along its entire length. In another embodiment, a substantial change in direction of a linear-shaped layout feature exists when the width of the linear-shaped layout feature changes from any first location on the linear-shaped layout feature to any second location on the linear-shaped layout feature by more that 50% of the linear-shaped layout feature width at the first location. Therefore, it should be appreciated that the dynamic array architecture specifically avoids the use of non-linear-shaped layout features, wherein a non-linear-shaped layout feature includes one or more bends within a plane of the associated level.

In the dynamic array architecture, variations in a vertical cross-section shape of an as-fabricated linear-shaped layout feature can be tolerated to an extent, so long as the variation in the vertical cross-section shape is predictable from a manufacturing perspective and does not adversely impact the manufacture of the given linear-shaped layout feature or its neighboring layout features. In this regard, the vertical cross-section shape corresponds to a cut of the as-fabricated linear-shaped layout feature in a plane perpendicular to the centerline of the linear-shaped layout feature. It should be appreciated that variation in the vertical cross-section of an as-fabricated linear-shaped layout feature along its length can correspond to a variation in width along its length. Therefore, the dynamic array architecture also accommodates variation in the width of an as-fabricated linear-shaped layout feature along its length, so long as the width variation is predictable from a manufacturing perspective and does not adversely impact the manufacture of the linear-shaped layout feature or its neighboring layout features.

Additionally, different linear-shaped layout features within a given level can be designed to have the same width or different widths. Also, the widths of a number of linear-shaped layout features defined along adjacent lines of a given virtual grate can be designed such that the number of linear-shaped layout features contact each other so as to form a single linear-shaped layout feature having a width equal to the sum of the widths of the number of linear-shaped layout features.

Within a given level defined according to the dynamic array architecture, proximate ends of adjacent, co-aligned linear-shaped layout features may be separated from each other by a substantially uniform gap. More specifically, adjacent ends of linear-shaped layout features defined along a common line of a virtual grate are separated by an end gap, and such end gaps within the level associated with the virtual grate may be defined to span a substantially uniform distance. Additionally, in one embodiment, a size of the end gaps is minimized within a manufacturing process capability so as to optimize filling of a given level with linear-shaped layout features.

Also, in the dynamic array architecture, a level can be defined to have any number of virtual grate lines occupied by any number of linear-shaped layout features. In one example, a given level can be defined such that all lines of its virtual grate are occupied by at least one linear-shaped layout feature. In another example, a given level can be defined such that some lines of its virtual grate are occupied by at least one linear-shaped layout feature, and other lines of its virtual grate are vacant, i.e., not occupied by any linear-shaped layout features. Furthermore, in a given level, any number of successively adjacent virtual grate lines can be left vacant. Also, the occupancy versus vacancy of virtual grate lines by linear-shaped layout features in a given level may be defined according to a pattern or repeating pattern across the given level.

Additionally, within the dynamic array architecture, vias and contacts are defined to interconnect a number of the linear-shaped layout features in various levels so as to form a number of functional electronic devices, e.g., transistors, and electronic circuits. Layout features for the vias and contacts can be aligned to virtual grid, wherein a specification of this virtual grid is a function of the specifications of the virtual grates associated with the various levels to which the vias and contacts will connect. Thus, a number of the linear-shaped layout features in various levels form functional components of an electronic circuit. Additionally, some of the linear-shaped layout features within various levels may be nonfunctional with respect to an electronic circuit, but are manufactured nonetheless so as to reinforce manufacturing of neighboring linear-shaped layout features. It should be understood that the dynamic array architecture is defined to enable accurate prediction of semiconductor device manufacturability with a high probability.

In view of the foregoing, it should be understood that the dynamic array architecture is defined by placement of linear-shaped layout features on a regular-spaced grate (or regular-spaced grid) in a number of levels of a cell, such that the linear-shaped layout features in a given level of the cell are oriented to be substantially parallel with each other in their traversal direction across the cell. Also, in the dynamic array architecture, prior to PCT processing, each linear-shaped layout feature is defined to be devoid of a substantial change in direction relative to its traversal direction across the cell.

It should be understood that the co-optimized nanopatterns as disclosed herein can be defined in a layout that is stored in a tangible form, such as in a digital format on a computer readable medium. For example, the layout including the co-optimized nanopatterns as disclosed herein can be stored in a layout data file of one or more cells, selectable from one or more libraries of cells. The layout data file can be formatted as a GDS II (Graphic Data System) database file, an OASIS (Open Artwork System Interchange Standard) database file, or any other type of data file format suitable for storing and communicating semiconductor device layouts. Also, multi-level layouts utilizing the co-optimized nanopatterns can be included within a multi-level layout of a larger semiconductor device. The multi-level layout of the larger semiconductor device can also be stored in the form of a layout data file, such as those identified above.

Also, the invention described herein can be embodied as computer readable code on a computer readable medium. For example, the computer readable code can include the layout data file within which one or more layouts including the co-optimized nanopatterns are stored. The computer readable code can also include program instructions for selecting one or more layout libraries and/or cells that include a layout having co-optimized nanopatterns defined therein. The layout libraries and/or cells can also be stored in a digital format on a computer readable medium.

The computer readable medium mentioned herein is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

It should be further understood that the co-optimized nanopatterns as disclosed herein can be manufactured as part of a semiconductor device or chip. In the fabrication of semiconductor devices such as integrated circuits, memory cells, and the like, a series of manufacturing operations are performed to define features on a semiconductor wafer. The wafer includes integrated circuit devices in the form of multi-level structures defined on a silicon substrate. At a substrate level, transistor devices with diffusion regions are formed. In subsequent levels, interconnect metallization lines are patterned and electrically connected to the transistor devices to define a desired integrated circuit device. Also, patterned conductive layers are insulated from other conductive layers by dielectric materials.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for defining a set of layout feature nanopatterns, comprising:
   identifying a layout portion of interest for a given chip level;
   defining a lithographic window of influence for a given layout feature nanopattern;
   scanning the lithographic window of influence over the identified layout portion of interest;

identifying each layout feature nanopattern within the lithographic window of influence as the lithographic window of influence is scanned over the identified layout portion of interest;

adding each identified layout feature nanopattern to the set of layout feature nanopatterns when not already present within the set of layout feature nanopatterns; and recording the set of layout feature nanopatterns in a digital format on a computer readable storage medium.

2. A method for defining a set of layout feature nanopatterns as recited in claim 1, wherein each layout feature nanopattern is a line end spacing nanopattern.

3. A method for defining a set of layout feature nanopatterns as recited in claim 1, wherein each layout feature nanopattern is a hole nanopattern.

4. A method for defining a set of layout feature nanopatterns as recited in claim 1, wherein the lithographic window of influence is defined as a layout area within which lithographic activity can potentially influence lithographic resolution of a layout shape positioned substantially near a center of the lithographic window of influence.

5. A method for defining a set of layout feature nanopatterns as recited in claim 1, wherein the lithographic window of influence for a given lithographic process is circular shaped and is defined by a radius of two to three times a wavelength of light used in the given lithographic process.

6. A method for defining a set of layout feature nanopatterns as recited in claim 1, wherein the lithographic window of influence when centered about a particular layout shape is truncated by an interposed layout shape which acts as a lithographic barrier for the particular layout shape.

7. A method for defining a set of layout feature nanopatterns as recited in claim 1, wherein scanning the lithographic window of influence includes successively centering the lithographic window of influence about each instance of a particular type of layout feature within the identified layout portion of interest.

8. A method for defining a set of layout feature nanopatterns as recited in claim 7, wherein a given identified layout feature nanopattern is defined by relative placements of the particular type of layout feature within the lithographic window of influence when the lithographic window of influence is centered about any given instance of the particular type of layout feature.

9. A method for defining a set of layout feature nanopatterns as recited in claim 1, further comprising:

representing each identified layout feature nanopattern symbolically without regard to specific dimensional characteristics of the identified layout portion of interest.

10. A method for defining a set of layout feature nanopatterns as recited in claim 1, wherein the layout portion of interest is defined according a dynamic array architecture in which linear-shaped layout features are defined along a regular-spaced virtual placement system.

11. A method for defining a set of layout feature nanopatterns as recited in claim 10, wherein the virtual placement system is defined as a virtual grate defined by a set of equally spaced, parallel virtual lines extending across the layout portion of interest.

12. A method for defining a set of layout feature nanopatterns as recited in claim 10, wherein the virtual placement system is defined as a virtual grid defined by a first set of equally spaced, parallel virtual lines extending across the layout portion of interest in a first direction, and by a second set of equally spaced, parallel virtual lines extending across the layout portion of interest in a second direction perpendicular to the first direction.

13. A method for defining a set of layout feature nanopatterns as recited in claim 10, wherein each linear-shaped layout feature has a rectangular cross-section when viewed in an as-drawn state.

14. A method for creating a library of optimized nanopatterns, comprising:

defining a set of layout feature nanopatterns, wherein a given layout feature nanopattern is defined by relative placements of a particular type of layout feature within a lithographic window of influence;

defining a design space as a set of layout parameters and corresponding value ranges that affect manufacturability of a layout;

creating layouts for the set of nanopatterns such that the created layouts cover the design space;

optimizing the layouts for the set of nanopatterns; and recording the optimized layouts for the set of nanopatterns in a digital format on a computer readable storage medium.

15. A method for creating a library of optimized nanopatterns as recited in claim 14, wherein the lithographic window of influence is defined as a layout area within which lithographic activity can potentially influence lithographic resolution of a layout shape positioned substantially near a center of the lithographic window of influence.

16. A method for creating a library of optimized nanopatterns as recited in claim 14, wherein the set of layout parameters that define the design space include each layout parameter critical to lithographic manufacturability of the layout.

17. A method for creating a library of optimized nanopatterns as recited in claim 14, wherein the design space is defined for a dynamic array architecture in which linear-shaped layout features are defined along a regular-spaced virtual placement system, and wherein the set of layout parameters that define the design space include a line end spacing size, a linear layout feature width, and a perpendicular spacing size between adjacently placed linear layout features.

18. A method for creating a library of optimized nanopatterns as recited in claim 14, wherein the set of layout parameters that define the design space include an interlevel conductor pitch and an interlevel conductor size, wherein the interlevel conductor is a contact structure, a via structure, or a combination thereof.

19. A method for creating a library of optimized nanopatterns as recited in claim 14, wherein the layouts created for the set of nanopatterns include at least one layout defined according to each unique combination of values for the set of layout parameters that define the design space.

20. A method for creating a library of optimized nanopatterns as recited in claim 14, wherein each layout for the set of nanopatterns is optimized with respect to manufacturing process settings including lithography settings, optical proximity correction settings, mask settings, mask proximity correction settings, wafer settings, process settings, process compensation technique settings, or combination thereof.

21. A method for creating a library of optimized nanopatterns as recited in claim 14, wherein optimization with respect to global manufacturing process settings is uniformly applied across all layouts within the set of nanopatterns, and wherein optimization with respect to local manufacturing process settings is independently applied to individual layouts within the set of nanopatterns.

22. A method for performing nanopattern co-optimization, comprising:
- (a) obtaining a set of nanopattern layouts for a chip level;
- (b) adjusting stepper settings;
- (c) performing optical proximity correction on each nanopattern layout in the set of nanopattern layouts;
- (d) simulating an as-fabricated aerial image of each nanopattern layout across a process window;
- (e) comparing a simulated as-fabricated aerial image of each nanopattern layout to its corresponding as-drawn nanopattern layout to determine whether or not a resulting optical pattern error satisfies an acceptance criteria;
- (f1) if the resulting optical pattern error satisfies the acceptance criteria, then calculating a contour for the simulated as-fabricated aerial image of each nanopattern layout;
- (g) determining whether or not the calculated contour for the simulated as-fabricated aerial image of each nanopattern layout satisfies a contour acceptance criteria; and
- (h1) if the calculated contour for the simulated as-fabricated aerial image of each nanopattern layout satisfies the contour acceptance criteria, then recording the adjusted stepper settings and optical proximity corrections for each nanopattern layout in the set of nanopattern layouts in a digital format on a computer readable storage medium.

23. A method for performing nanopattern co-optimization as recited in claim 22, wherein a given nanopattern layout is defined by relative placements of a particular type of layout feature within a lithographic window of influence defined as a layout area within which lithographic activity can potentially influence lithographic resolution of a layout shape positioned substantially near a center of the lithographic window of influence.

24. A method for performing nanopattern co-optimization as recited in claim 22, wherein stepper settings include illuminator shape, numerical aperture, polarization, or combination thereof.

25. A method for performing nanopattern co-optimization as recited in claim 22, wherein the optical pattern error is represented as a root mean square of dimensional differences between the simulated as-fabricated aerial image of each nanopattern layout and its corresponding as-drawn nanopattern layout.

26. A method for performing nanopattern co-optimization as recited in claim 22, wherein the method is implemented to co-optimize nanopatterns associated with the chip level at a given point in a design space defined as a set of layout parameters and corresponding value ranges that affect manufacturability of a layout.

27. A method for performing nanopattern co-optimization as recited in claim 22, further comprising:
- (f2) if the resulting optical pattern error does not satisfy the acceptance criteria, then determining whether or not the resulting optical pattern has failed to satisfy the acceptance criteria too many times;
- (f2a) if the resulting optical pattern has failed to satisfy the acceptance criteria too many times, then adjusting one or more problematic nanopattern layouts, adjusting optical pattern error acceptance criteria, or combination thereof; and
- (f2b) if the resulting optical pattern has not failed to satisfy the acceptance criteria too many times, then reverting back to operation (b) to further adjust stepper settings.

28. A method for performing nanopattern co-optimization as recited in claim 22, further comprising:
- (h2) if the calculated contour for the simulated as-fabricated aerial image of each nanopattern layout does not satisfy the contour acceptance criteria, then determining whether or not the calculated contour for the simulated as-fabricated aerial image of each nanopattern layout has failed to satisfy the contour acceptance criteria too many times;
- (h2a) if the calculated contour for the simulated as-fabricated aerial image of each nanopattern layout has failed to satisfy the contour acceptance criteria too many times, then adjusting one or more problematic nanopattern layouts, adjusting optical pattern error acceptance criteria, or combination thereof; and
- (h2b) if the calculated contour for the simulated as-fabricated aerial image of each nanopattern layout has not failed to satisfy the contour acceptance criteria too many times, then adjusting one or more process settings and reverting back to operation (f1) to re-calculate the contour for the simulated as-fabricated aerial image of each nanopattern layout.

29. A method for designing a portion of a semiconductor chip using nanopattern layouts, comprising:
- defining a design space for a number of chip levels, wherein each of the number of chip levels is characterized by a corresponding set of nanopattern layouts;
- performing chip level-by-chip level nanopattern layout co-optimization across the design space for the number of chip levels;
- identifying a passing region in the design space for the set of nanopattern layouts for each of the number of chip levels;
- selecting final design points in the design space from the passing region for each of the number of chip levels;
- defining a circuit layout using the sets of nanopattern layouts at the selected final design points for the number of chip levels; and
- recording the defined circuit layout in a digital format on a computer readable storage medium.

30. A method for designing a portion of a semiconductor chip using nanopattern layouts as recited in claim 29, wherein the passing region in the nanopattern design space is defined by design points having zero nanopattern layout defects when evaluated in a simulated as-fabricated state.

31. A method for designing a portion of a semiconductor chip using nanopattern layouts as recited in claim 29, wherein the final design points are selected based on layout pattern density, process window, compatibility between chip level final design points, or combination thereof.

32. A semiconductor chip, comprising:
- a chip level having a portion thereof defined to include electrically conductive structures defined in accordance with one or more nanopatterns,
- wherein each of the one or more nanopatterns is defined by relative placements of the electrically conductive structures within a lithographic window of influence,
- wherein the lithographic window of influence is defined as an area within which lithographic activity can potentially influence lithographic resolution of layout shapes corresponding to the electrically conductive structures, and
- wherein each of the one or more nanopatterns is optimized with respect to manufacturing process settings.

33. A semiconductor chip as recited in claim 32, wherein each of the one or more nanopatterns is a line end spacing nanopattern.

34. A semiconductor chip as recited in claim 32, wherein each of the one or more nanopatterns is a hole nanopattern.

35. A semiconductor chip as recited in claim 32, wherein the portion of the chip level is defined according to a dynamic array architecture in which linear-shaped layout features are defined along either a virtual grate or a virtual grid,
  wherein the virtual grate is defined by a set of equally spaced, parallel virtual lines extending across the portion of the chip level, and
  wherein the virtual grid is defined by a first set of equally spaced, parallel virtual lines extending across the portion of the chip level in a first direction, and by a second set of equally spaced, parallel virtual lines extending across the portion of the chip level in a second direction perpendicular to the first direction.

36. A semiconductor chip as recited in claim 35, wherein each linear-shaped layout feature has a rectangular cross-section when viewed in an as-drawn state.

37. A semiconductor chip as recited in claim 32, wherein the manufacturing process settings include lithography settings, optical proximity correction settings, mask settings, mask proximity correction settings, wafer settings, process settings, process compensation technique settings, or combination thereof.

* * * * *